(12) United States Patent
Otani et al.

(10) Patent No.: US 6,351,469 B1
(45) Date of Patent: Feb. 26, 2002

(54) SOUND/DATA SHARING COMMUNICATIONS SYSTEM

(75) Inventors: Keiichi Otani, Kanagawa; Masaharu Matsumoto, Tokyo; Koji Yano, Osaka; Atsuo Serikawa, Tokyo; Takaya Yamamoto, Kanagawa, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/038,333

(22) Filed: Mar. 11, 1998

(30) Foreign Application Priority Data

Sep. 8, 1997 (JP) .............................. 9-242292

(51) Int. Cl.[7] .............................................. C11D 13/00
(52) U.S. Cl. ..................................................... 370/459
(58) Field of Search ................................ 370/396, 459, 370/498, 389, 398, 376, 377, 378, 356, 424, 383, 349, 312; 379/201, 265, 309, 88.16, 242, 198, 246, 334, 269; 348/12, 14, 13; 455/5.1, 528

(56) References Cited

U.S. PATENT DOCUMENTS

| | | | | |
|---|---|---|---|---|
| 4,788,680 A | * | 11/1988 | Kikuch et al. ............... 370/376 |
| 5,374,952 A | * | 12/1994 | Flohr ........................... 348/12 |
| 5,487,063 A | * | 1/1996 | Kakuma et al. ............ 370/396 |
| 5,512,937 A | * | 4/1996 | Beierle ......................... 348/14 |
| 5,818,818 A | * | 10/1998 | Soumiya et al. ............ 370/252 |
| 5,862,451 A | * | 1/1999 | Grau ........................... 455/5.1 |
| 5,892,759 A | * | 4/1999 | Taketsugu ................... 370/349 |
| 6,111,882 A | * | 8/2000 | Yamamoto .................. 370/399 |

FOREIGN PATENT DOCUMENTS

| | | |
|---|---|---|
| JP | 58134549 | 8/1983 |
| JP | 6232758 | 2/1987 |

* cited by examiner

*Primary Examiner*—Wellington Chin
*Assistant Examiner*—Prenell Jones
(74) *Attorney, Agent, or Firm*—Helfgott & Karas, PC

(57) ABSTRACT

A TDMA in a CATV center and a CAU in a subscriber home communicate a B-ch idle/busy map indicating the idle/busy state of a B channel in synchronization with each other, so that the allocation of the B channel dedicated to sound and the C channel dedicated to data in a transmission frame can be dynamically changed according to the contents of the B-ch idle/busy map. Consequently, it becomes possible to effectively use a transmission bandwidth up to its maximum.

54 Claims, 38 Drawing Sheets

| TRANSMISSION METHOD | TRANSMISSION MEDIUM | | OPTICAL FIBER/COAXIAL CABLE |
|---|---|---|---|
| | USED FREQUENCY BANDWIDTH DIGITAL TRANSMISSION SPEED | UPSTREAM | 1.5MHz BANDWIDTH  2.048Mbps |
| | | DOWNSTREAM | 6MHz BANDWIDTH  8.192Mbps |
| | AVAILABLE RF FREQUENCY | UPSTREAM | ONE ARBITRARY FREQUENCY FROM 30 TO 48 MHz |
| | | DOWNSTREAM | ONE ARBITRARY CHANNEL FROM 222 TO 550 MHz |
| | ACCESS METHOD | UPSTREAM | TDMA |
| | | DOWNSTREAM | TDM |
| MODULATION METHOD | | UPSTREAM | QPSK (1 FREQUENCY, 1.024Mbaud) |
| | | DOWNSTREAM | QPSK (1 FREQUENCY, 4.096Mbaud) |

FIG. 6

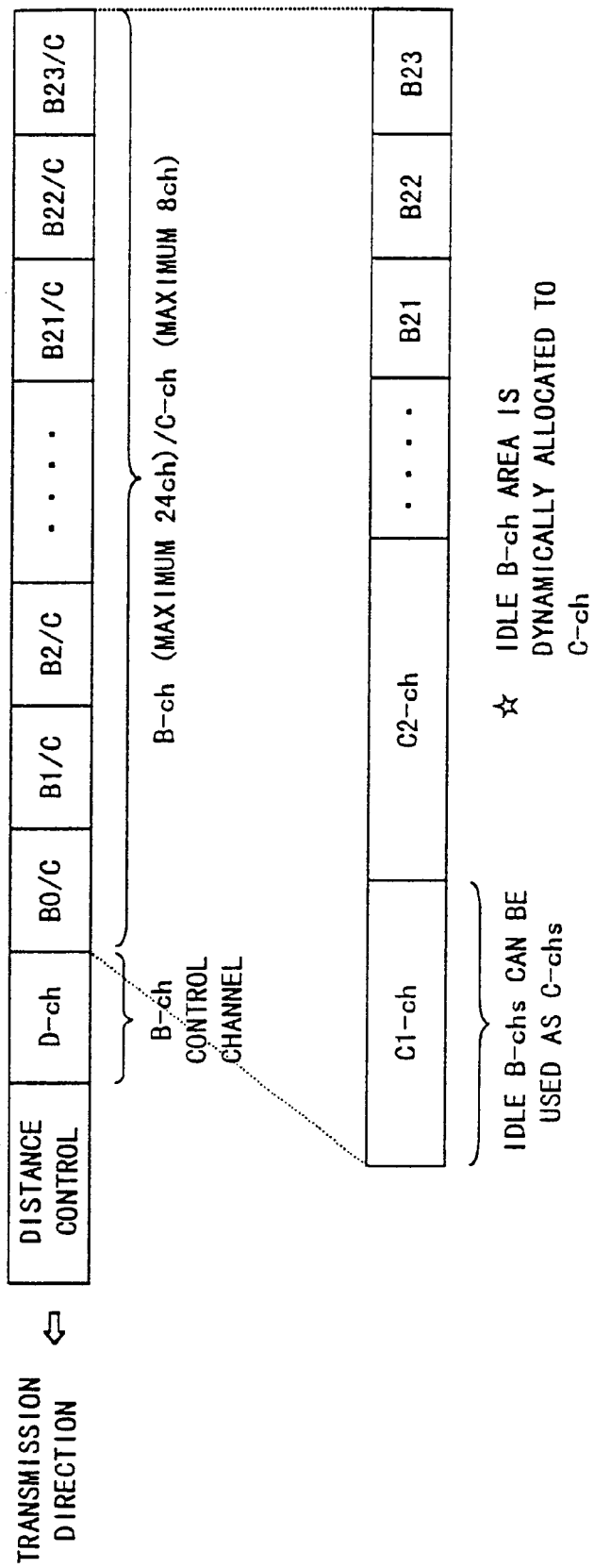
F I G. 8

FIG. 9

| MF | M-ch | | B/C | B/C | ..... | B/C | B/C | B/C |
|----|------|----|-----|-----|-------|-----|-----|-----|
| F | Dack | Null | B/C | B/C | ..... | B/C | B/C | B/C |
| F | D-ch | | B/C | B/C | ..... | B/C | B/C | B/C |
| F | D-ch | | B/C | B/C | ..... | B/C | B/C | B/C |
| F | B-ch IDLE/BUSY MAP | | B/C | B/C | ..... | B/C | B/C | B/C |
| F | C-ch/C-ack | | B/C | B/C | ..... | B/C | B/C | B/C |
| F | C-ch/C-ack | | B/C | B/C | ..... | B/C | B/C | B/C |
| | | | | | | | | |
| F | C-ch/C-ack | | B/C | | | | B/C | B/C |

C-ACK CHANNEL AND C-ch ARE ALTERNATELY ARRANGED IN AREA ENCLOSED BY THICK LINE (a) C-ACK CHANNEL  (b) C CHANNEL

| HEADER | CRC |

| HEADER | DATA | CRC |

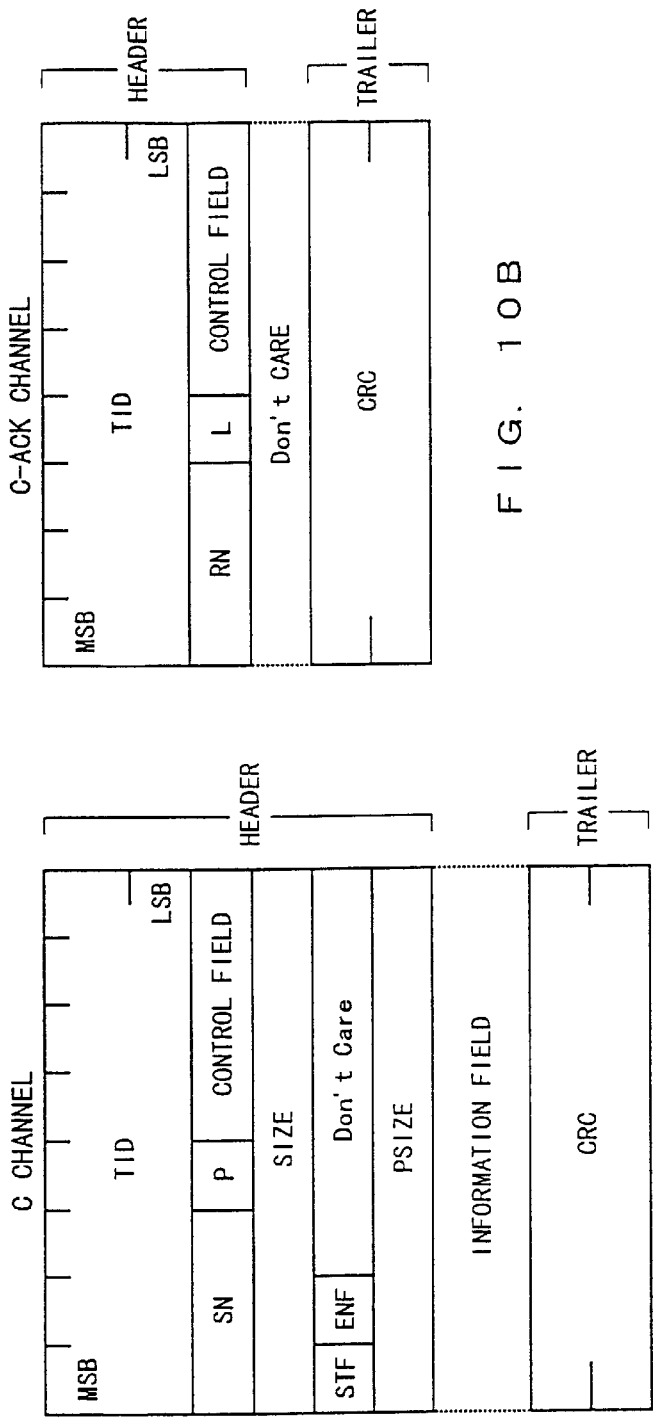

EXAMPLE IN WHICH ALL B-chs ARE USED

EXAMPLE IN WHICH 48 B-chs ARE IDLE

D0 : B-ch IDLE / BUSY MAP CHANGE INFORMATION FOR DOWNSTREAM
Un : B-ch IDLE / BUSY MAP CHANGE INFORMATION FOR UPSTREAM RF
   CHANNEL "n" (n = 1 ~ 4)
CRC : CYCLIC REDUNDANCY CHECK

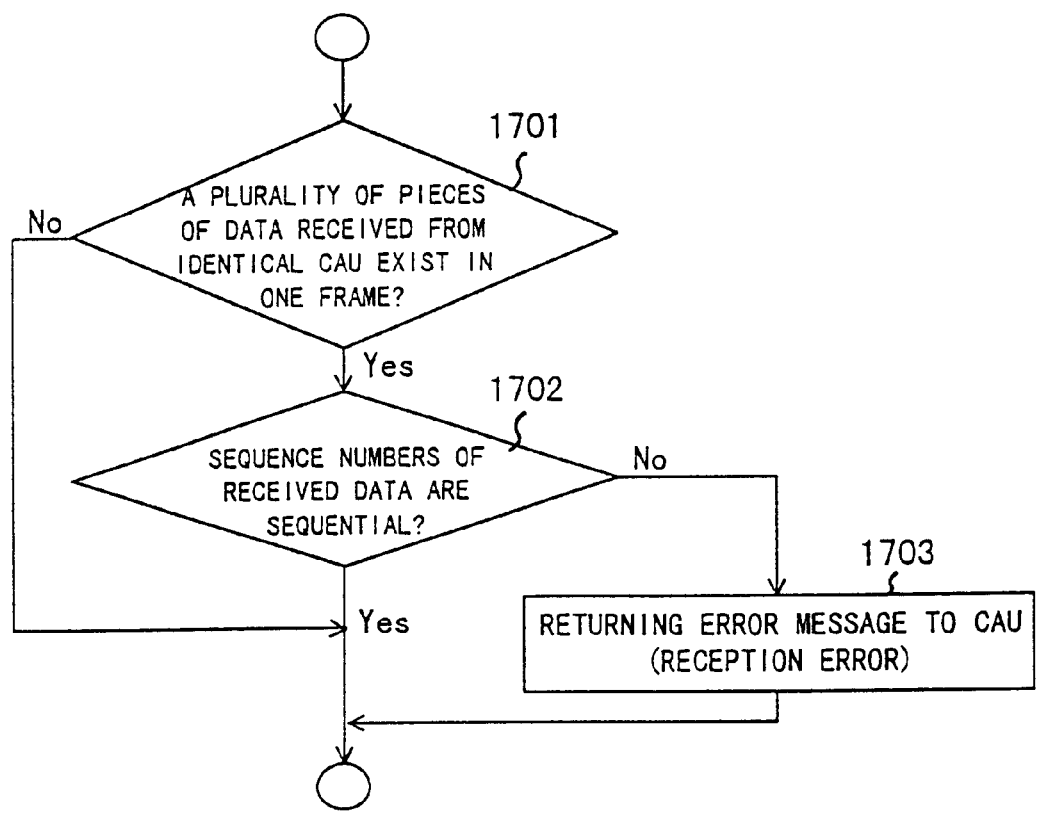
F I G. 1 7

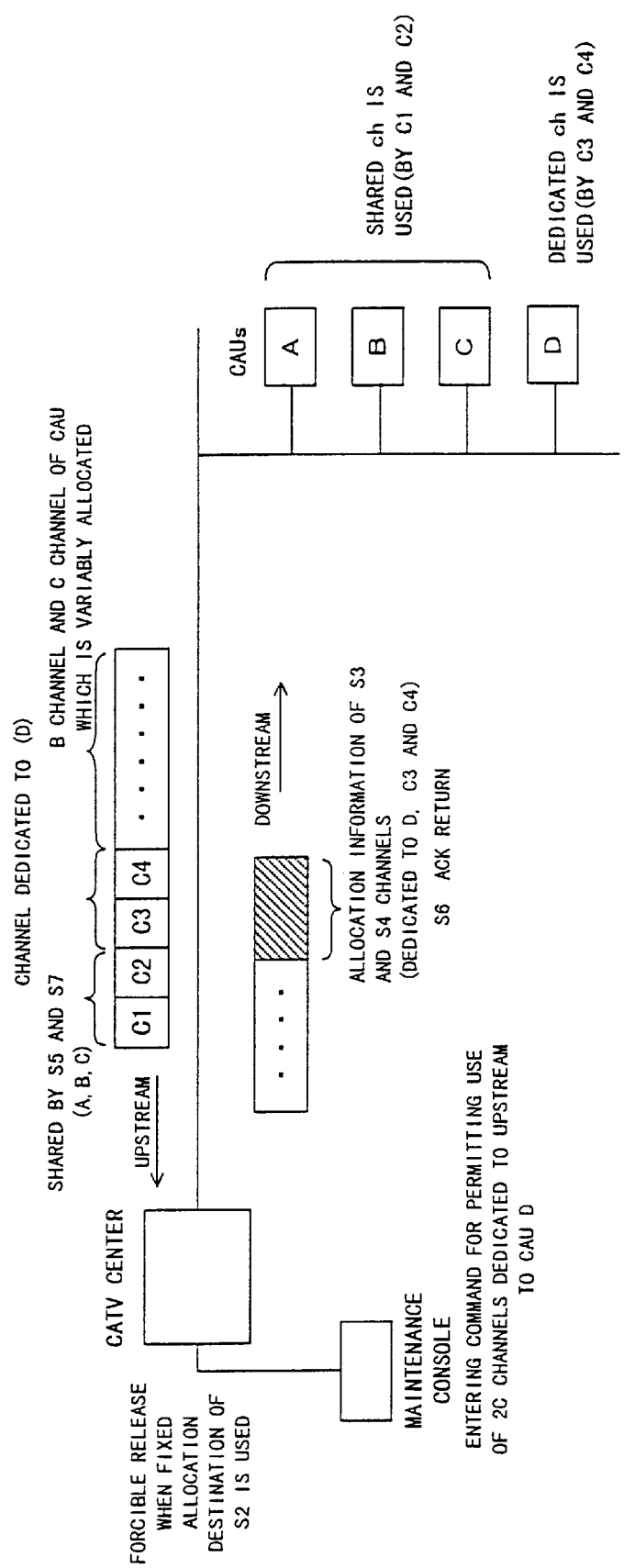
F I G. 18

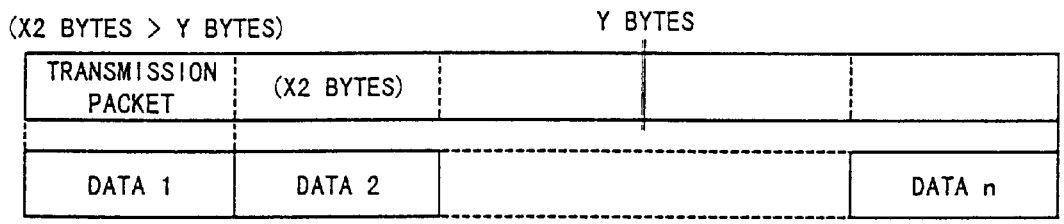
F I G. 2 6 A
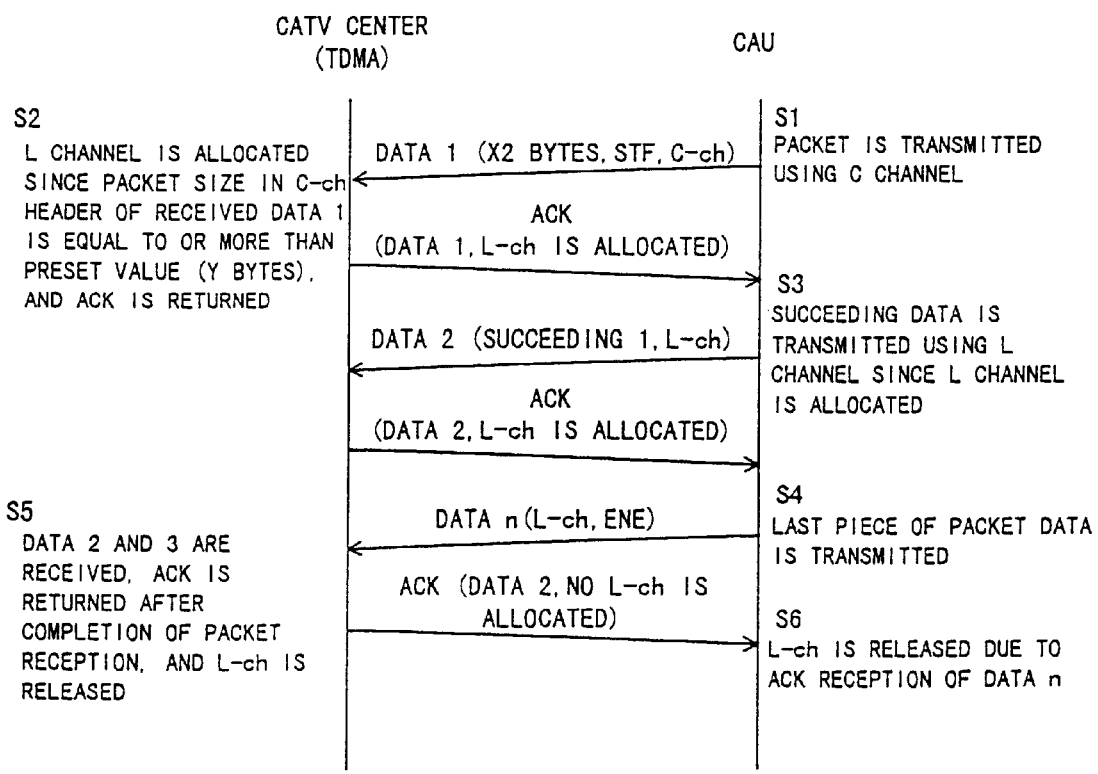
F I G. 2 6 B

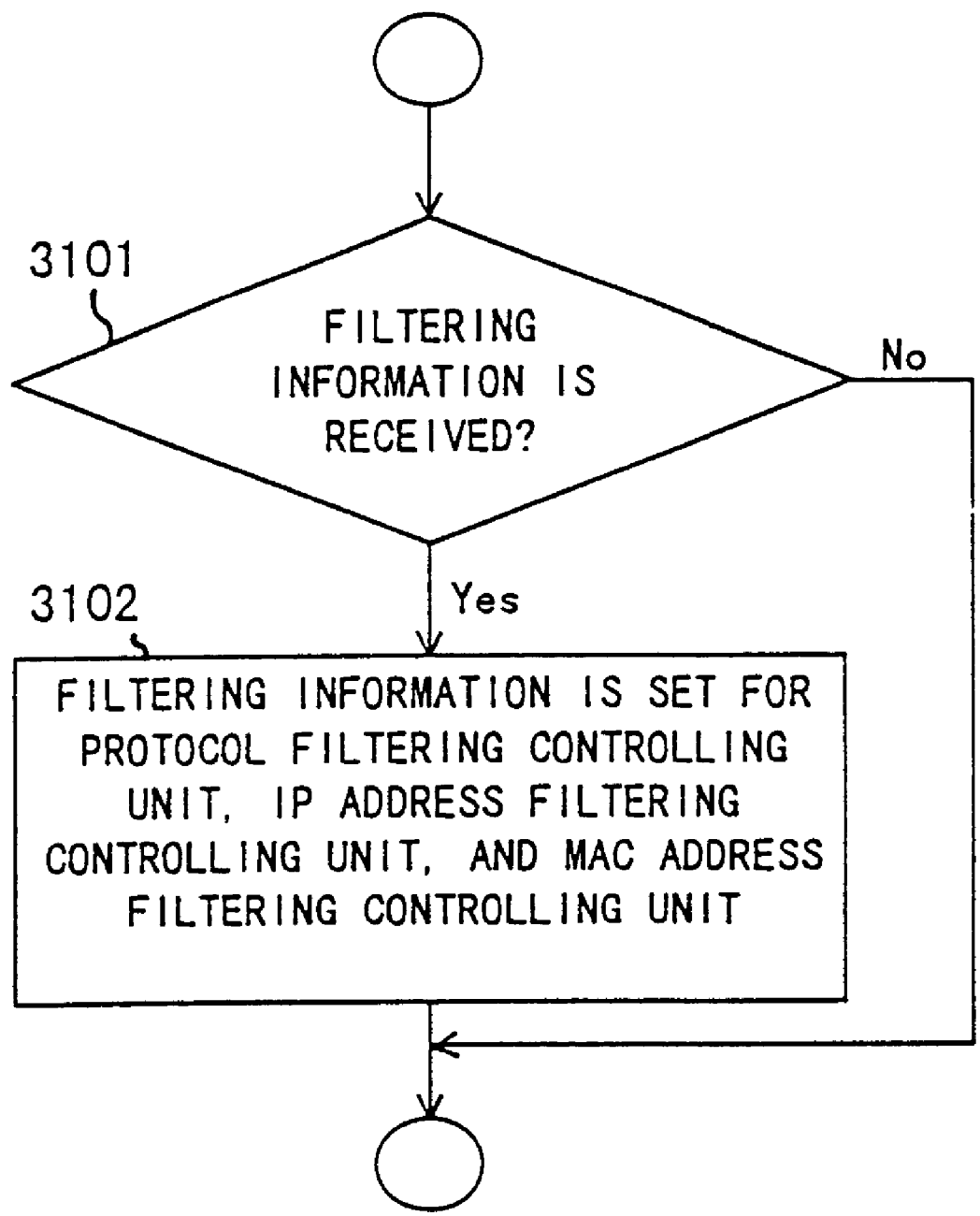
F I G. 3 1

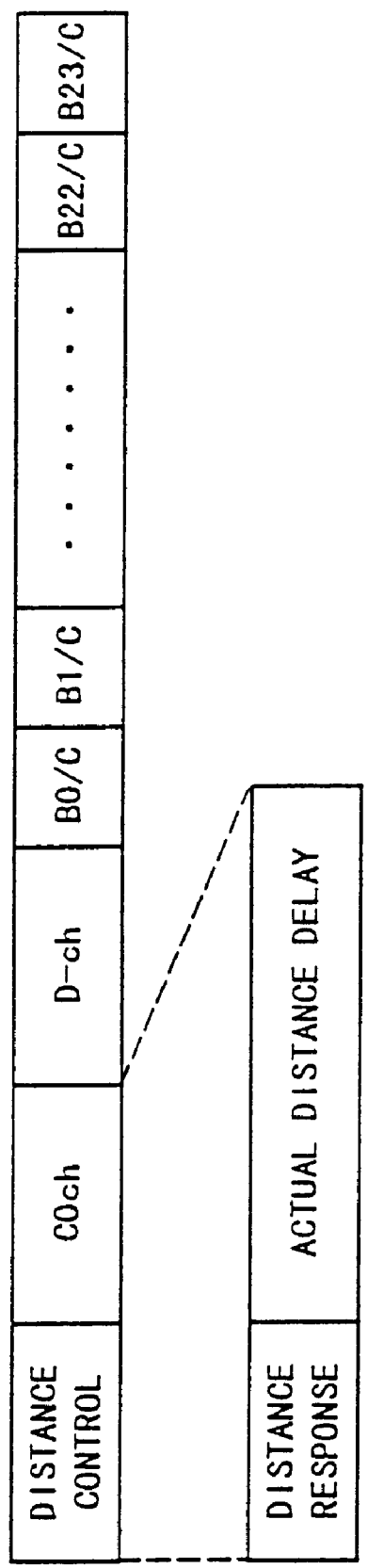
F I G. 38
C0 CHANNEL CAN BE USED ONLY WHEN DISTANCE IS NO MEASURED

SOUND/DATA SHARING COMMUNICATIONS SYSTEM

BACKGROUND OF THE INVENTION

1. Field of the Invention

The present invention relates to a communication technique for performing a bidirectional communication via a network having a 1-to-n configuration, such as a CATV network, etc., and more particularly to a communication technique with which a communication channel is shared by sound and data.

2. Description of the Related Art

In recent years, a communication system for simultaneously implementing a bidirectional service such as a telephone service, a data communication service, etc. by using a CATV network having an existing 1-to-n broadcasting type configuration has been developed.

In such a communication system, particularly in a data communication service, it is expected that a communication channel is used as efficiently as possible and a faster communication is implemented.

Furthermore, there is the demand for the capability for providing data communication services of various communication qualities according to the requirements of service subscribers or service providers, such as the capability for setting each data communication service class by ensuring each communication speed, etc.

With a conventional bidirectional communication system, communication channels are allocated fixedly to respective sound and data in advance and the respective communications are made, when the sound and data are simultaneously transmitted.

This conventional system, however, has the problem that the communication channel allocated to the sound is not fully utilized and the communication channel cannot be effectively used if there is almost no traffic for the sound transmission due to the traffic's concentration of the data transmission.

In a communication system using a network whose number of terminals to be connected is large such as a CATV network, etc., a communication channel must be effectively used in order to use a transmission bandwidth as efficient as possible because the above described concentration of the traffic can occur with a great possibility.

The above described conventional system has another problem in that it is impossible to provide a flexible communication service whose communication quality is set depending on a requirement of a service subscriber or a service provider, for example, a communication service whose communication speed is set depending on a requirement of a service subscriber, or a communication service whose communication speed is set to be different depending on a type of data to be transmitted.

SUMMARY OF THE INVENTION

The present invention was developed due to the above described background, and aims at allowing a communication channel to be shared by sound and data in order to efficiently use a transmission bandwidth, and allowing the communication channel to be dynamically allocated for sound transmission and data transmission in a communications system using a network whose number of terminals to be connected is large such as a CATV network, etc.

Furthermore, the present invention aims at allowing a communication channel to be allocated fixedly to a particular terminal in order to set a communication speed depending on a requirement of a subscriber, a priority process for setting a communication speed depending on a data type to be performed, and a transmission of unnecessary data to be restricted for improving transmission efficiency, etc., in such a communication system.

The present invention assumes a communication system which provides a bidirectional communication service simultaneously with a broadcasting type communication service from a center device to a plurality of terminals by using a 1-to-multiple broadcasting network configured between the center device and the plurality of terminals.

According to the present invention, the following control process is basically performed.

First of all, an idle/busy state of a first medium signal is detected in a center device.

Next, the detected idle/busy state is managed as first medium idle/busy information in the center device.

The first medium idle/busy information is then notified from the center device to the terminal.

Next, the first media idle/busy information that the center device and the terminal respectively store are updated in the center device and the terminal in synchronization with each other.

Then, in the center device and the terminal, an idle communication channel among the communication channels to be allocated to a first medium signal is allocated to a second medium signal based on the first medium idle/busy information that the center device and the terminal respectively store.

The transmission frame including a group of communication channels to which the first and second medium signals are allocated is communicated between the center device and the terminal.

As described above, according to the present invention, the center device and the terminal communicate the first medium idle/busy information in synchronization, so that the allocation of the communication channels to the first and second medium signals can be dynamically changed in a transmission frame based on the contents of the first medium idle/busy information. Consequently, a transmission bandwidth can be effectively used up to its maximum.

BRIEF DESCRIPTION OF THE DRAWINGS

One skilled in the art can easily understand additional features and objects of this invention from the description of the preferred embodiments and some of the attached drawings. In the drawings:

FIG. 6 is a schematic diagram showing the structure of an interface of a CATV transmission line according to the first preferred embodiment;

FIG. 8 is a schematic diagram showing an upstream transmission frame at the time of C-ch variable allocation according to the first preferred embodiment;

FIG. 9 exemplifies a format of a downstream transmission frame;

FIGS. 10A and 10B show the formats of a header of a C-ch;

FIG. 17 is an operational flowchart of the third preferred embodiment (receiving side);

FIG. 18 is a schematic diagram explaining the operations of the fourth preferred embodiment;

FIGS. 26A and 26B show the sequence of the ninth preferred embodiment (when a long packet is transmitted);

FIG. 31 is an operational flowchart showing the filtering process according to the twelfth preferred embodiment (CAU device/No.1);

FIG. 38 shows the format of an upstream transmission frame according to the fifteenth preferred embodiment.

DESCRIPTION OF THE PREFERRED EMBODIMENT

Explanation about the Principle

Figure 1:
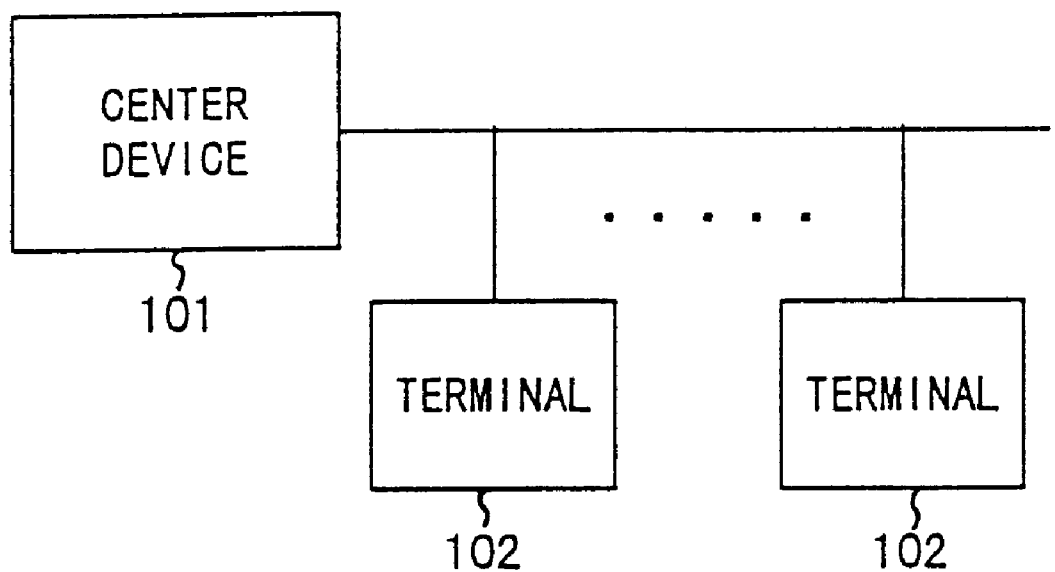
FIG. 1 is a block diagram according to the present invention (No.1)
Figure 2:
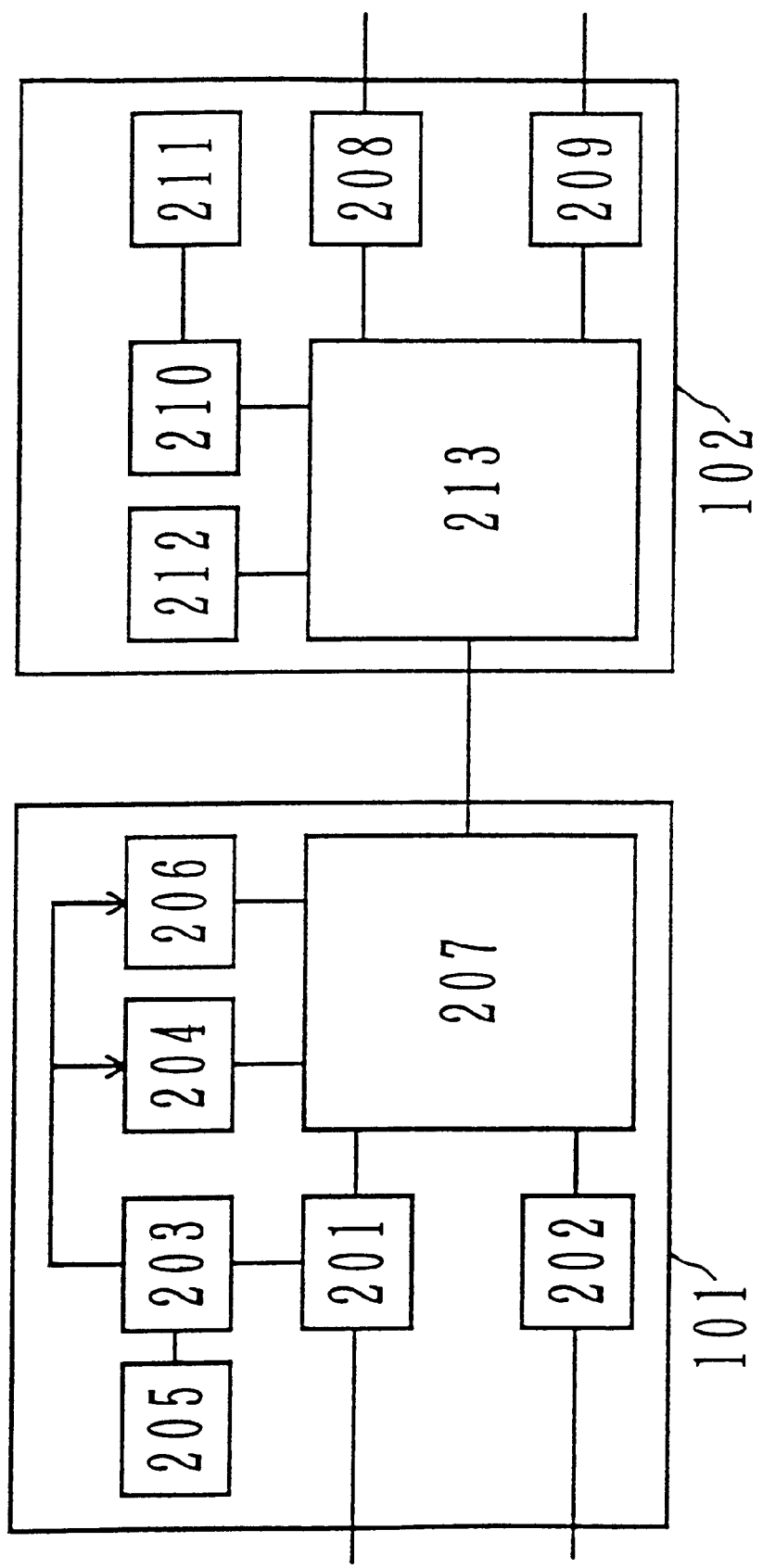
FIG. 2 is a block diagram according to the present invention (No.2)

FIGS. 1 and 2 are block diagrams according to the present invention.

The present invention assumes a communication system for providing a bidirectional communication service simultaneously with a broadcasting type communication service from a center device 101 to a plurality of terminals 102 by using a 1-to-multiple broadcasting type network configured between the center device 101 (a CATV center 301) and the plurality of terminals 102 (a CAU device 305).

The first embodiment of the present invention has the following configuration.

A center device 101 comprises a center-side first medium terminating unit 201, a center-side second medium terminating unit 202, a first medium idle/busy information managing unit 203, a first medium idle/busy information notifying unit 204, a center-side first medium idle/busy information synchronously updating unit 205, a center-side channel managing unit 206, and a center-side frame communicating unit 207.

The center-side first medium terminating unit 201 (a sound interface 409) terminates a first medium signal (a sound signal).

The center-side second medium terminating unit 202 (data interface 410) terminates a second medium signal (data signal).

The first medium idle/busy information managing unit 203 (a channel managing unit 408) detects the idle/busy state of the first medium signal in the center-side first medium terminating unit 201, and manages that state as the first medium idle/busy information.

The first medium idle/busy information notifying unit 204 (the channel managing unit 408) notifies the terminal 102 of the first medium idle/busy information.

The center-side first medium idle/busy information synchronously updating unit 205 (the channel managing unit 408, a frame assembling unit 403, and a frame disassembling unit 404) updates the first medium idle/busy information that the center device 101 itself stores in synchronization with the plurality of terminals 102 according to the first medium idle/busy information that the first medium idle/busy information notifying unit 204 notifies.

The center-side channel managing unit 206 (the channel managing unit 408) allocates to the second medium signal an idle communication channel among the communications channels to be allocated to the first medium signal based on the first medium idle/busy information that the center device 101 itself stores.

The center-side frame communicating unit 207 (the frame assembling unit 403 and the frame disassembling unit 404) communicates a transmission frame including a group of communication channels to which the first and second medium signals are allocated by the center-side channel managing unit 206 to the terminal 102.

The terminal 102 comprises a terminal-side first medium terminating unit 208, a terminal-side second medium terminating unit 209, a first medium idle/busy information receiving unit 210, a terminal-side first medium idle/busy information synchronously updating unit 211, a terminal-side channel managing unit 212, and a terminal-side frame communicating unit 213.

The terminal-side first medium terminating unit 208 (an analog TEL interface 510) terminates the first medium signal.

The terminal-side second medium terminating unit 209 (a LAN interface 511) terminates a second medium signal.

The first medium idle/busy information receiving unit 210 (a frame disassembling unit 505 and a channel managing unit 507) receives the first medium idle/busy information from the center device 101.

The terminal-side first medium idle/busy information synchronously updating unit 211 (the channel managing unit 507, a frame assembling unit 504, and the frame disassembling unit 505) updates the first medium idle/busy information that the terminal 102 itself stores in synchronization with the center device 101 according to the first medium idle/busy information that the first medium idle/busy information receiving unit 210 receives.

The terminal-side channel managing unit 212 (the channel managing unit 507) allocates to the second medium signal an idle communication channel among the communication channels to be allocated to the first medium signal based on the first medium idle/busy information that the terminal 102 itself stores.

The terminal-side frame communicating unit 213 (the frame assembling unit 504 and the frame disassembling unit 505) communicates a transmission frame including a group of communication channels to which the first and second medium signals are allocated by the terminal-side channel managing unit 212 to the center device 101.

With the above described configuration of the first embodiment of the present invention, the center device 101 and the terminal 102 communicate the first medium idle/busy information in synchronization with each other. Since the allocation of communication channels to the first and second medium signals in a transmission frame can be dynamically changed according to the contents of the first medium idle/busy information, the transmission bandwidth can be effectively used up to its maximum.

The second embodiment according to the present invention has the following configuration based on the configuration of the first embodiment of the present invention.

A center device 101 comprises a center-side error detection code adding unit, a center-side error detecting unit, and a center-side response signal returning unit.

The center-side error detection code adding unit (frame assembling unit 403) adds an error detection code to a transmission frame to be transmitted to a terminal 102.

The center-side error detecting unit (an error detection code controlling unit 419) detects a transmission error of the transmission frame based on the error detection code of the transmission frame received from the terminal 102.

The center-side response signal returning unit (an ACK returning unit 420) returns a response signal to the terminal at the transmitting source of the received transmission frame based on the result of the detection of the transmission error.

The terminal 102 comprises a terminal-side error detection code adding unit, a terminal-side error detecting unit, and a terminal-side response signal returning unit.

The terminal-side error detection code adding unit (a frame assembling unit 504) adds an error detection code to the transmission frame transmitted to the center device 101.

The terminal-side error detecting unit (an error detection code controlling unit 512) detects a transmission error of the transmission frame based on the error detection code of the transmission frame received from the center device 101.

The terminal-side response signal returning unit (an ACK returning unit 513) returns a response signal to the center device 101 at the transmitting source of the received transmission frame based on the result of the detection of the transmission error.

With the above described configuration of the second embodiment according to the present invention, transmission is confirmed by returning response signals in both of the upstream and downstream directions, thereby providing a data communication service with high reliability.

The third embodiment of the present invention has only the configuration for returning a response signal from a center device to a terminal in the configuration according to the second embodiment of the present invention.

With the above described configuration of the third embodiment according to the present invention, transmission is not confirmed by returning a response signal in the downstream direction where no collision of transmission frames occurs (in the direction from the center device to the terminal), thereby providing a high-speed data communication service in the downstream direction.

The fourth embodiment of the present invention has the following configuration based on the configuration according to the first embodiment of the present invention.

Namely, a center-side channel managing unit 206 comprises a center-side channel order managing unit (a channel order managing unit 413) for allocating communication channels sequentially from a channel at a first end (for example, the last channel) of a transmission frame to a first medium signal, and from a channel at a second end (for example, the first channel) of the transmission frame to a second medium signal based on the first medium idle/busy information that the center device 101 itself stores.

Additionally, the terminal-side channel managing unit 212 comprises a terminal-side channel order managing unit (a channel managing unit 507) for allocating communication channels sequentially from a communication channel at a first end of the transmission frame to the first medium signal, and from a communication channel at a second end of the transmission frame to the second medium signal based on the first medium idle/busy information that the plurality of terminals 102 themselves store.

With the above described configuration according to the fourth embodiment of the present invention, the communication channels of first and second medium signals are allocated form the different positions in a transmission frame, so that the frequency of recombining communication channels of the first and second medium signals becomes low. As a result, the processing can be simplified and the processing speed can be improved.

The fifth embodiment of the present invention has the following configuration based on the configuration according to the first embodiment of the present invention. A center device 101 comprises a center-side frame transmission order controlling unit and a frame reception order controlling unit.

The center-side frame transmission order controlling unit (a frame order controlling unit 421) allocates a plurality of communication channels in a transmission frame to signals which are obtained by dividing a second medium signal and respectively assigned with sequence numbers.

The center-side frame reception order controlling unit (the frame order controlling unit 421) extracts the signals obtained by dividing the second medium signal and the respectively assigned sequence numbers from the plurality of communication channels in a received transmission frame, and restructures the second medium signal based on the extracted sequence numbers.

A terminal 102 comprises a terminal-side frame transmission order controlling unit and a terminal-side frame reception order controlling unit.

The terminal-side frame transmission order controlling unit (a frame order controlling unit 518) allocates a plurality of communication channels in a transmission frame to signals which are obtained by dividing a second medium signal and respectively assigned with sequence numbers.

The terminal-side frame reception order controlling unit (the frame order controlling unit 518) extracts the signals obtained by dividing the second medium signal and the respectively assigned sequence numbers from the plurality of communication channels in a received transmission frame, and restructures the second medium signal based on the extracted sequence numbers.

With the configuration according to the fifth embodiment of the present invention, a faster data transmission can be implemented by using a plurality of communication channels between the center device 101 and the terminal 102.

The sixth embodiment of the present invention has the following configuration based on the configuration according to the first embodiment of the present invention.

A center device 101 comprises a fixed allocation controlling unit, a fixed channel allocation information notifying unit, a fixed channel first medium idle/busy information setting unit, and a center-side fixed channel communicating unit.

The fixed allocation controlling unit (a maintenance console 314 and a fixed allocation controlling unit 425) allocates a particular communication channel in a transmission frame to a particular terminal 102 as a fixed channel.

The fixed channel allocation information notifying unit (the fixed allocation controlling unit 425) notifies the particular terminal 102 of the allocation information about a fixed channel allocated by the fixed allocation controlling unit.

The fixed channel first medium idle/busy information setting unit (fixed allocation controlling unit 425) sets the information indicating in-use as the first medium idle/busy information corresponding to the fixed channel.

The center-side fixed channel communicating unit (the frame assembling unit 403 and the frame disassembling unit 404) communicates the second medium signal by using the fixed channel based on the allocation information of the fixed channel to the terminal 102.

The terminal 102 comprises a fixed channel allocation information receiving unit and a terminal-side fixed channel communicating unit.

The fixed channel allocation information receiving unit (the frame disassembling unit 505 and the channel managing unit 507) receives the allocation information of a fixed channel from the center device.

The terminal-side fixed channel communicating unit (the frame assembling unit 504 and the frame disassembling unit 505) communicates the second medium signal by using the fixed channel based on the allocation information of the fixed channel received by the fixed channel allocation information receiving unit to the center device 101.

With the above described configuration according to the sixth embodiment of the present invention, a data communication can be made between a terminal and a center device by allocating a communication channel fixedly to the terminal, so that the transmission rate of the terminal can be guaranteed.

In the configuration according to the sixth embodiment of the present invention, the fixed allocation controlling unit may forcibly release a communication on a particular communication channel when the particular communication channel is used by the first medium signal at the time of allocation of a fixed channel.

Also in the configuration according to the sixth embodiment of the present invention, the fixed allocation controlling unit instructs a switch for switching all communication channels of the first medium signal to block all the communication channels, and allocates a fixed channel after the completion of blocking all the channels.

With this process, a fault such as a communication disconnection due to a forcible release of communication channels of the first medium signal, etc. can be prevented.

In the above described configuration according to the sixth embodiment of the present invention, the fixed allocation controlling unit may allocate a particular communication channel fixedly in a transmission frame to a plurality of particular terminals as a fixed channel, which can be shared by the plurality of particular terminals 102.

As a result, the transmission rates of the plurality of terminals 102 can be guaranteed.

Furthermore, in the above described configuration according to the sixth embodiment of the present invention, the center-side fixed channel communicating unit and the terminal-side fixed channel communicating unit may communicate the second medium signal using a fixed channel without communicating a response signal if the fixed allocation controlling unit allocates a particular communication channel fixedly in a transmission frame to one particular terminal 102 as a fixed channel.

Consequently a faster data transmission can be implemented between a center device and a terminal.

The seventh embodiment of the present invention has the following configuration based on the configuration according to the sixth embodiment of the present invention.

A center device 101 further comprises a channel attribute controlling unit (a channel attribute controlling unit 424) for presetting either of a first medium/second medium sharing attribute or a second medium dedicated attribute for each communication channel in a transmission frame. The fixed allocation controlling unit allocates a communication channel as a fixed channel for which the second medium dedicated attribute is preset when a fixed channel is allocated.

With the above described seventh configuration of the seventh embodiment according to the present invention, it is not required to forcibly release a communication channel of a first medium signal and to block the communication channel of the first medium signal when a fixed channel is allocated, thereby simplifying the allocation process of the fixed channel and avoiding a fault during operations.

The eighth embodiment of the present invention has the following configuration based on the first embodiment of the present invention.

A center device 101 further comprises a received second medium signal length detecting unit and a second medium dedicated channel allocating unit.

The received second medium signal length detecting unit (a received packet length determining unit 418) detects the length of the second medium signal extracted from the transmission frame received from a terminal 102.

The second medium dedicated channel allocating unit (an L-ch managing unit 416) allocates a plurality of idle communication channels among the communication channels to be allocated to the first medium signal as the channel dedicated to the second medium signal based on the first medium idle/busy information that the center device 101 and the terminal 102 respectively store in the center device 101 and the terminal 102, if the signal length detected by the received second medium signal length detecting unit is equal to or longer than a predetermined length.

The center device 101 and the terminal 102 then communicate the second medium signal whose length is equal to or longer than the predetermined length by using the channel dedicated to the second medium signal.

With the above described configuration of the eighth embodiment according to the present invention, a packet whose data length is long, etc. can be transmitted by using a dedicated channel, thereby implementing a more efficient data transmission.

With the above described configuration of the eighth embodiment of the present invention, the center device 101 and the terminal 102 may communicate the second medium signal whose length is equal to or longer than the predetermined length by using the channel dedicated to the second medium signal without communicating a response signal.

As a result, a faster data transmission can be implemented.

The ninth embodiment of the present invention has the following configuration based on the configuration of the first embodiment according to the present invention.

That is, a center device 101 comprises a priority assigning unit (a priority controlling unit 423) for assigning a priority according to a predetermined decision standard to the second medium signal to be transmitted to a terminal 102, and the priority controlling unit (a priority controlling unit 423) for transmitting the second medium signal to the terminal 102 according to the assigned priority.

Here, the predetermined decision standard is network address information of the terminal 102, upper protocol information of packet data which is the second medium signal, or intermediate protocol information of the packet data which is the second medium signal.

With the above described configuration according to the ninth embodiment of the present invention, a packet directed to a network address whose priority is high is preferentially transmitted, thereby controlling the transmission rate of the destination terminal 102 whose priority is high so that it becomes higher than the transmission rates of other terminals even in a congested state. Consequently, a service class based on a speed guarantee can be set for a downstream transmission rate of each subscriber, and a quality of service (QOS) can be implemented.

Additionally, a packet of an upper protocol, whose priority is high, is preferentially transmitted, thereby controlling the transmission rate of the upper protocol communication whose priority is high so that it becomes higher than the transmission rate of another upper protocol communication even in a congested state. As a result, a service such as to make a faster Web access, etc. can be implemented, for example, by assigning a priority in order to preferentially transmit an HTTP.

Furthermore, a packet of an intermediate protocol, whose priority is high, is preferentially transmitted, thereby controlling the transmission rate of the intermediate protocol communication so that it becomes higher than the transmission rate of another intermediate protocol communication even in a congested state. Consequently, a service such as to provide a high-speed data transmission to a company user can be implemented, for example, by assigning a priority in order to preferentially transmit an IPX packet used by a number of company users, etc.

The tenth embodiment of the present invention has the following configuration based on the configuration of the first embodiment according to the present invention.

A center device 101 comprises a filtering setting unit (a filtering notifying unit 422) for setting filtering information to a terminal 102 according to a predetermined decision standard for the second medium signal to be transmitted to the center device 101.

The terminal 102 comprises a filtering controlling unit (a filtering controlling unit 519) for performing a filtering process for the second medium signal to be transmitted to the center device 101 according to the filtering information set by the filtering setting unit.

Here, the predetermined decision standard is intermediate protocol information of packet data which is the second medium signal, network address information of the terminal 102, or physical address information of the terminal.

With the above described configuration according to the tenth embodiment of the present invention, a packet in an upstream direction is filtered according to the intermediate protocol at the terminal 102, thereby reducing traffic of a packet of an unnecessary type in the upstream direction.

Additionally, an upstream packet is filtered, for example, by the terminal 102 according to transmitting source network address information, so that the traffic of a packet at an unnecessary transmitting source in the upstream direction can be reduced. Furthermore, use of a network address other than the network address that a common carrier assigns to a subscriber can be restricted. Still further, when a print server, etc. is connected to the terminal 102, a packet blocked by the terminal 102 can be prevented from being transmitted to the side of the center device 101.

Still further, the filtering process is performed according to physical network address information, thereby speeding up the filtering process.

The eleventh embodiment of the present invention has the following configuration based on the configuration according to the first embodiment of the present invention.

A terminal 102 comprises a transmission sequence number assigning unit (a packet consecutive transmission number assigning unit 516) for assigning transmission sequence numbers for identifying a plurality of consecutive transmission frames together with the second medium signal to communication channels in the plurality of consecutive transmission frames to be transmitted to the center device 101.

The center device 101 further comprises a second medium signal consecutively receiving unit (the frame disassembling unit 404) for extracting the transmission sequence numbers together with the second medium signal from the communication channels in the transmission frame received from the terminal 102, and consecutively receiving the second medium signal from the communication channels in the plurality of consecutive transmission frames according to the extracted transmission sequence numbers.

The center device 101 further comprises a per-multiple-frames response signal returning unit (the frame disassembling unit 404 and the ACK returning unit 420) for returning a response signal to the terminal 102 each time it consecutively receives the second medium signal from the communication channel in the plurality of consecutive transmission frames.

With the above described configuration according to the eleventh embodiment of the present invention, transmission confirmation using a response signal by the terminal is made each time a predetermined number of packets of the second medium signal are transmitted. Packets, etc. are consecutively transmitted, thereby improving both the reliability implemented by confirming a transmission using a response signal and the upstream transmission efficiency during between confirmations.

The twelfth embodiment of the present invention has the following configuration based on the configuration according to the eleventh embodiment of the present invention.

A per-multiple-frames response signal returning unit returns a response signal to the terminal 102 including a next reception sequence number (RN) which is the transmission sequence number corresponding to the transmission frame to be received next by the center device 101 each time the second medium signal is consecutively received from the communication channels in a plurality of consecutive transmission frames.

A collision detecting unit (a collision detecting unit 514) arranged in the terminal 102 makes a comparison between a transmission sequence number (SN) that the terminal 102 itself assigns and a next reception sequence number (RN) included in the response signal received from the center device 101, thereby detecting the collision of transmission frames directed from the terminal 102 to the center device 101.

A consecutive frame transmission number reducing unit (a packet consecutive transmission number assigning unit 516) arranged in the terminal 102 reduces the number of consecutive transmission frames of the transmission frames to be consecutively transmitted from the terminal 102 to the center device 101 based on the result of collision detection.

With the above described configuration according to the twelfth embodiment of the present invention, a traffic increase at the time of collision occurrence is restricted, thereby achieving optimal transmission efficiency according to a traffic state.

The thirteenth embodiment of the preset invention has the following configuration based on the configuration according to the eleventh embodiment of the present invention.

A per-multiple-frames response signal returning unit returns to a terminal 102 a response signal including a next reception sequence number which is the transmission sequence number corresponding to the transmission frame to be received next by the center device 101 each time the second medium signal is consecutively received from the communication channels in a plurality of consecutive transmission frames.

A collision recovery detecting unit (a collision recovery detecting unit 515) arranged in the terminal 102 detects the recovery of a collision of transmission frames that the terminal 102 transmits to the center device 101 by making a comparison between a transmission sequence number that the terminal 102 itself assigns and a next reception sequence number included in the response signal received from the center device 101.

A consecutive frame transmission number increasing unit arranged in the terminal 102 (a packet consecutive transmission number assigning unit 516) increases the number of consecutive transmission frames of the transmission frames that the terminal 102 consecutively transmits to the center device 101 based on the result of the detection of the collision recovery.

With the configuration according to the thirteenth embodiment of the present invention, traffic at the time of collision recovery is restored, so that optimal transmission efficiency can be achieved according to a traffic state.

The fourteenth embodiment of the present invention has the following configuration based on the configuration according to the first embodiment of the present invention.

A center device 101 further comprises a distance control timing controlling unit for controlling frame timing at which a distance is controlled (a distance control timing controlling unit 417).

A center-side channel managing unit 206 allocates a communication channel of the second medium signal to an empty window area for controlling a distance in a transmission frame at frame timing other than the frame timing at which a distance is controlled.

With the above described configuration according to the fourteenth embodiment of the present invention, the communication channel of the second medium signal can be allocated to the field for controlling a distance at the frame timing at which a distance is not controlled, thereby improving the upstream transmission efficiency.

The fifteenth embodiment of the present invention has the following configuration based on the configuration according to the first embodiment of the present invention.

A center device 101 comprises a center-side protocol determining unit (a protocol determining unit 429) for determining the protocol of the second medium signal to be transmitted.

A terminal 102 comprises a terminal-side protocol determining unit (a protocol determining unit 521) for determining the protocol of the second medium signal to be transmitted.

The center device 101 and the terminal 102 switch between the presence and absence of a return of a response signal based on the result of the above described determination of the protocol.

With the above described configuration according to the fifteenth embodiment of the present invention, reliability is improved by confirming a transmission using an ACK for the protocol for which the reliability is required (such as a TCP, etc.), while a transmission rate can be improved not by confirming a transmission using a response signal for the protocol for which the faster transmission rate is required (such as a UDP).

DETAILED DESCRIPTION OF THE PREFERRED EMBODIMENTS

Provided below are the explanations about the details of the respective preferred embodiments according to the present invention, by referring to the drawings.

First Preferred Embodiment According to the Present Invention

System Configuration

Figure 3:
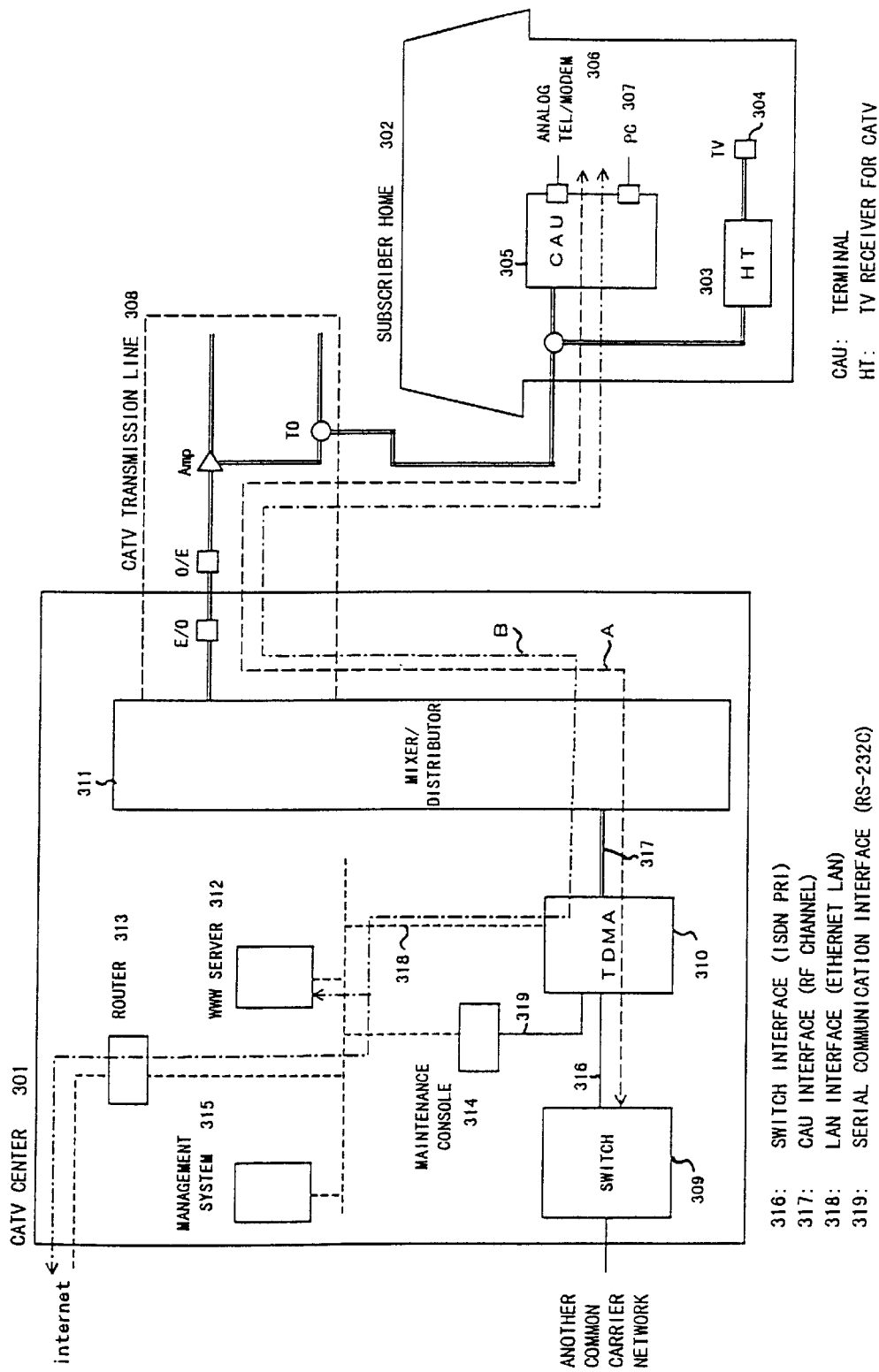
FIG. 3 is a schematic diagram showing the configuration of a system according to the first preferred embodiment.

FIG. 3 is a schematic diagram showing the system configuration of the first preferred embodiment.

A CATV center 301 and each of a plurality of subscriber homes 302 are connected by a CATV transmission line 308.

The CATV transmission line 308 led into each of the plurality of subscriber homes 302 is connected to a CAU 305 (a cable unit) which is a terminal, and an HT 303 (Home Terminal) which is a TV receiver for CATV.

To the CAU 305, an analog telephone set or a modem 306 for implementing a telephone service is connected, or a LAN interface of a PC 307 (Personal Computer) for implementing a data communication service is directly connected.

To the HT 303, a home television receiver 304 for receiving television broadcasting is connected.

The CATV transmission line 308 is composed of an electro-optic converter (E/O), an opto-electric converter (O/E), an amplifier (Amp), a TO, etc.

The CATV center 301 is composed of not only television broadcasting facilities which are not shown in this figure (these facilities are not related to the present invention), but also a mixer/distributor 311 for terminating the CATV transmission line 308; a TDMA 310 (Time-Division Multiplexer) for distributing a telephone service (represented by a dashed line A) and a data communication service (represented by a line-one-dash-line B); a switch 309 for switching a telephone service channel between another common carrier and the CATV center 301; a WWW (World Wide Web) server 312, which is connected to a LAN interface 318, for implementing a home page service in a data communication service; a router 313, which is connected to the LAN interface 318, for routing communication packets of the data communication service between the LAN interface 318 and the Internet; a maintenance console 314 for maintenance, which is connected to the LAN interface 318 and to the TDMA 310 via a serial communication interface (RS-232C) 319; and a management system 315, which is connected to the LAN interface 318, for managing the entire CATV network managed by the CATV center 301, etc.

The telephone service represented by the dashed line A is provided on a route: another common carrier—the switch 309—a switch interface (ISDN PRI: Integrated Services Digital Network Primary Rate) 316—the TDMA 310, a CAU interface (an RF channel)—the CAU 305—the analog telephone set or the modem 306.

In the meantime, the data communication service represented by the line-one-dash-line B is provided on a route: the Internet router 313—the LAN interface 318—the TDMA 310—the CAU interface (the RF channel)—the CAU 305—the PC 307.

Figure 4:
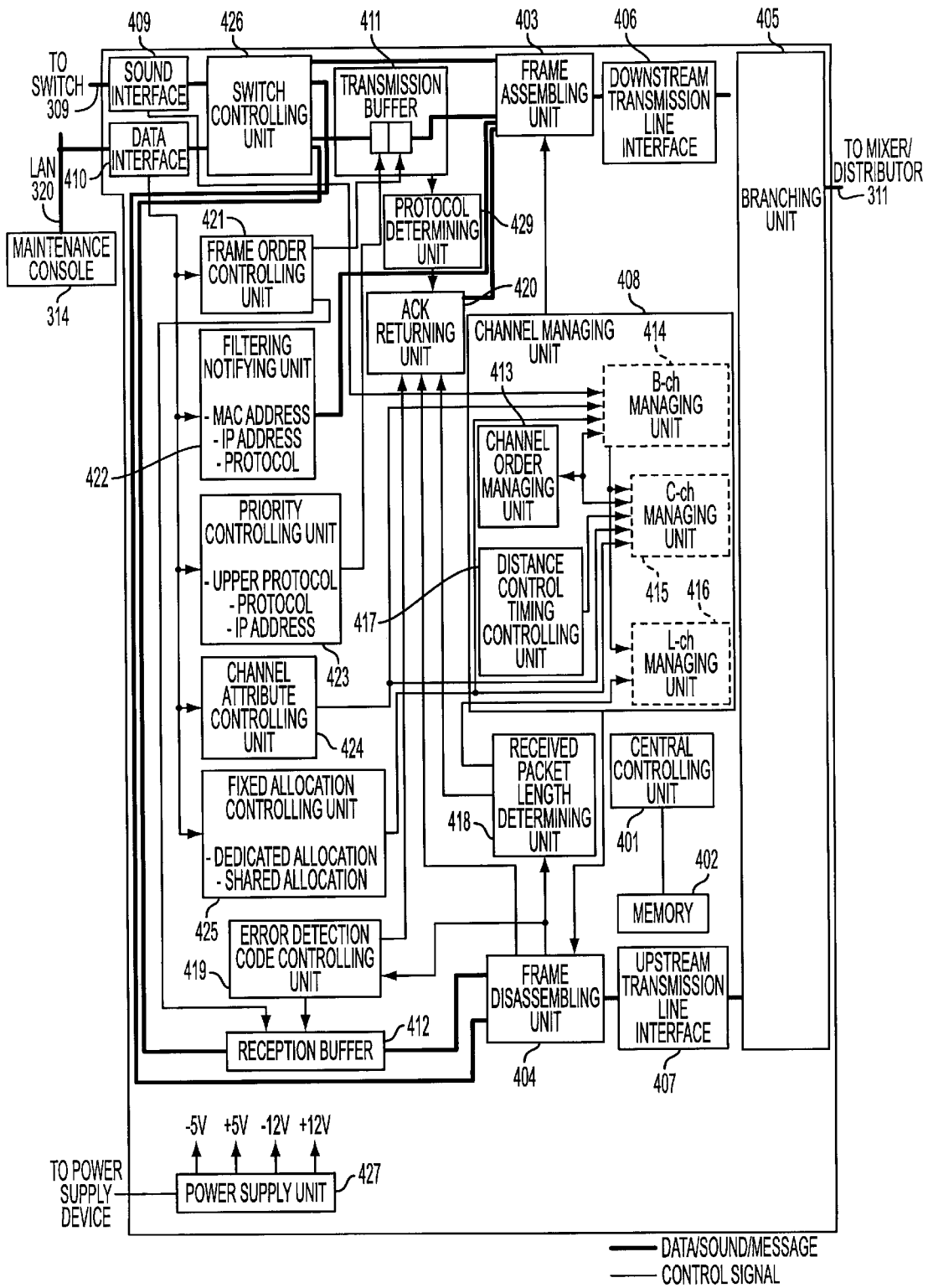
FIG. 4 is a schematic diagram showing the configuration of a TDMA device.

FIG. 4 is a schematic diagram showing the details of the configuration of the TDMA 310 shown in FIG. 3.

A central controlling unit 401 executes a system program for controlling the entire TDMA 310. A memory 402 stores the system program and various types of operation data.

A frame assembling unit 403 assembles a transmission frame from the sound transmitted from a sound interface 409 via a switch controlling unit 426 and the data transmitted from a transmission buffer 411 according to an instruction issued from a channel managing unit 408, and transmits the assembled transmission frame to a downstream transmission line interface 406.

A frame disassembling unit 404 disassembles the transmission frame transmitted from an upstream transmission line interface 407 into the sound and data according to an instruction issued from the channel managing unit 408, and transmits the disassembled sound and data to a sound interface 409 and a reception buffer 412 via the switch controlling unit 426.

A branching unit 405 converts a digital signal transmitted from the frame assembling unit 403 via the downstream transmission line interface 406 into an RF signal by performing a modulation process, and outputs the RF signal to the mixer/distributor 311 with a 6 MHz bandwidth and at a 4 Mbps transmission rate. The mixer/distributor 311 mixes the RF signal with 6 MHz bandwidth, which is received from the TDMA 310 and an analog television signal with 6 MHz bandwidth etc. within a frequency bandwidth of an identical transmission line, and transmits the mixed signal to the CATV transmission line 308. In the meantime, the branching unit 405 converts the RF signal transmitted from the mixer/distributor 311 into a digital signal by performing a demodulation process, and transmits the digital signal to the frame disassembling unit 404 via the upstream transmission line interface 407.

The channel managing unit 408 manages and stores the use state of sound/data in a transmission frame. A channel order managing unit 413, a B-ch managing unit 414, a C-ch managing unit 415, an L-ch managing unit 416, and a distance control timing controlling unit 417, which are included in the channel managing unit 408, will be described later.

The sound interface 409 transmits/receives sound between itself and the switch 309 shown in FIG. 3, and between the sound interface 409 itself and the frame assembling unit 403/frame disassembling unit 404 via the switch controlling unit 426.

The data interface 410 transmits/receives data between itself and the WWW server 312/router 313/maintenance console 314, which are connected to the LAN interface 318 and shown in FIG. 3, and between the frame assembling unit 403/frame disassembling unit 404 and the data interface 410 itself via the switch controlling unit 426 and the transmission buffer 411/reception buffer 412.

The transmission buffer 411 converts the speed of data transmission to a subscriber home 302 between the data interface 410 via the switch controlling unit 426 and the frame assembling unit 403.

The reception buffer 412 converts the speed of data reception from the subscriber home 302 between the frame disassembling unit 404 and the data interface 410 via the switch controlling unit 426.

A received packet length determining unit 418, an error detection code controlling unit 419, an ACK returning unit 420, a frame order controlling unit 421, a filtering notifying unit 422, a priority controlling unit 423, a channel attribute controlling unit 424, and a fixed allocation controlling unit 425 will be described later.

A power supply unit 427 supplies power from a power supply device which is not shown in this figure to the TDMA 310.

Figure 5:
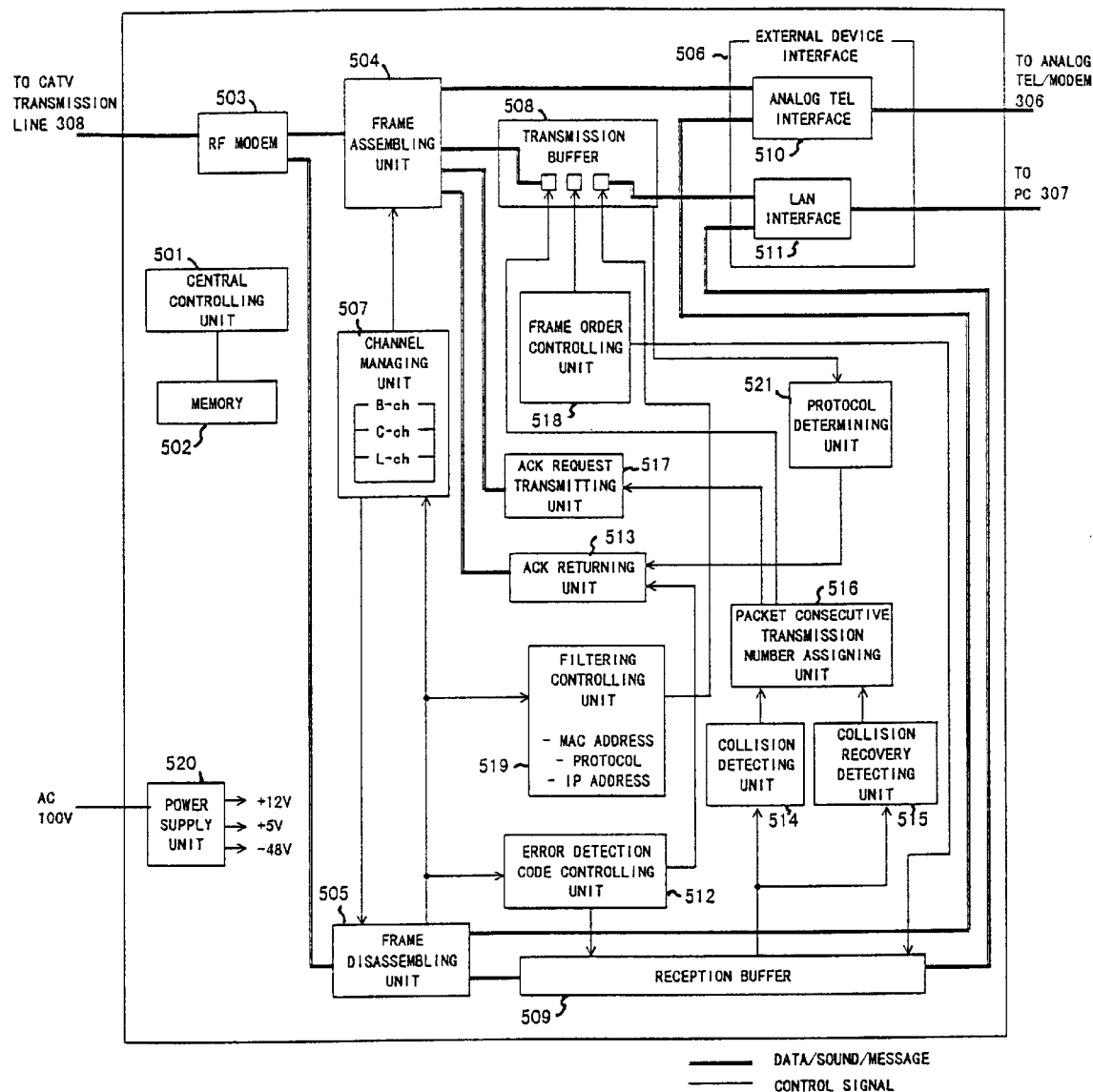
FIG. 5 is a schematic diagram showing the configuration of a CAU device.

FIG. 5 is a schematic diagram showing the details of the configuration of the CAU 305 in a subscriber home 302 of FIG. 3.

A central controlling unit 501 executes a system program for controlling the entire CAU 305. A memory 502 stores the system program and various types of operation data.

An RF modem 503 converts an RF signal transmitted from the CATV transmission line 308 into a digital signal having a multi-frame structure (refer to FIG. 9 to be described later) at a 8.192 Mbps transmission rate (refer to FIG. 6) by demodulating the RF signal, and transmits the demodulated digital signal to the frame disassembling unit 505. An RF modem 503 converts the digital signal transmitted from the frame assembling unit 504 into an RF signal by modulating the digital signal, and outputs the RF signal to the CATV transmission line 308.

The frame assembling unit 504 assembles a transmission frame from the sound and data transmitted from the analog TEL interface 510 in an external device interface 506 and the transmission buffer 508 according to an instruction issued from the channel managing unit 507, and transmits the assembled transmission frame to the RF modem 503.

The frame disassembling unit 505 disassembles the transmission frame having the multi-frame structure, which is transmitted from the RF modem 503, into sound and data, and transmits the sound and data to the analog TEL interface 510 in the external device interface 506 and to the reception buffer 509.

The analog TEL interface 510 in the external device interface 506 transmits, receives, and relays the sound between itself and the analog telephone set or the modem 306, and between the analog TEL interface 510 itself and the frame assembling unit 504/frame disassembling unit 505.

A LAN interface 511 in the external device interface 506 transmits/receives data between itself and the frame assembling unit 504/frame disassembling unit 505 via the PC 307 and the transmission buffer 508/reception buffer 509.

The channel managing unit 507 manages and stores the use state of the sound and data of a transmission frame.

The transmission buffer 508 converts the speed of data transmission to the CATV center 301 between the LAN interface 511 in the external device interface 506 and the frame assembling unit 504.

The reception buffer 509 converts the speed of data reception from the CATV center 301 between the frame disassembling unit 505 and the LAN interface 511 in the external device interface 506.

An error detection code controlling unit 512, an ACK returning unit 513, a collision detecting unit 514, a collision recovery detecting unit 515, a packet consecutive transmission number assigning unit 516, an ACK request transmitting unit 517, a frame order controlling unit 518, and a filtering controlling unit 519 will be described later.

A power supply unit 520 supplies power at AC 100V to the CAU 305.

Structure of Interface of CATV Transmission Line 308

FIG. 6 shows the structure of the interface of the CATV transmission line 308 shown in FIG. 3.

In this figure, an upstream indicates a CATV transmission line in the direction from a subscriber home 302 to a CATV center 301, while a downstream indicates a CATV transmission line 308 in the direction from the CATV center 301 to the subscriber home 302.

Figure 7:
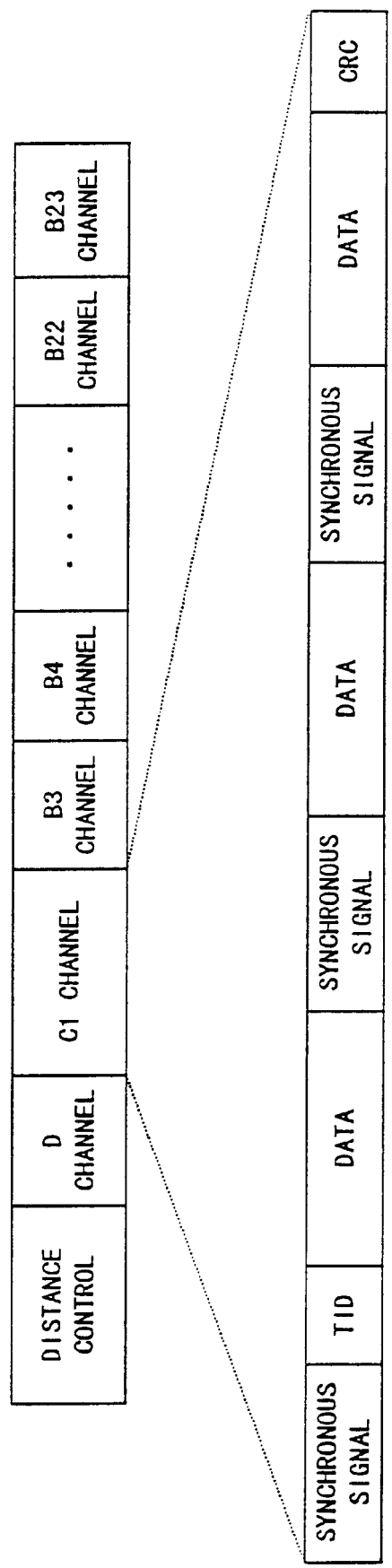
FIG. 7 exemplifies a format of an upstream transmission frame.

FIG. 7 exemplifies the format of an upstream transmission frame transmitted over the CATV transmission line.

The upstream transmission frame has a single-frame structure. Each frame is composed of a distance control channel, a channel D for sound control, shared B/C channel. Since the B channel can store 8-bit sound and its frame cycle is 125 microseconds, the transmission rate of the sound becomes 64 Kbps. This sound is used by the analog telephone set or the modem 306 to be connected to the CAU 305 in the subscriber home 302. The C channel transmits the data communicated by the PC 307.

In the first preferred embodiment, idle three (3-octet) B channels among the B channels (B0, B1, B2, ... B23) can be put together, and one C channel (C1, C2, ...) can be allocated to the idle three channels as shown in FIG. 8.

Each C channel has the format shown in FIG. 7: (synchronization signal-TID) (synchronization signal-data) (synchronization signal-data) ... (CRC). The CRC is a cyclic redundancy code for detecting an error. Here, the synchronization signals are a data pattern for extracting data from a received signal without fail. The TID is a terminal identifier for identifying the PC 307 connected to the CAU 305.

FIG. 9 exemplifies the format of a downstream transmission frame transmitted over the CATV transmission line 308.

The downstream transmission frame has a multi-frame structure.

In the multi-frame structure, the first frame is composed of a multi-frame synchronization flag MF, a maintenance channel M-ch, and shared B/C channels. The second frame is composed of a frame synchronization flag F, a D channel response channel Dack, a null area Null, and shared B/C channels. The third and fourth frames are composed of a frame synchronization flag F, a D channel D-ch, and shared B/C channels. The fifth frame is composed of a frame synchronization flag F, a B-ch idle/busy map channel relating to the present invention, and shared B/C channels. Each of the sixth and subsequent frames is composed of a frame synchronization flag F, a fixed C channel C-ch or a fixed C channel response channel C-ack, and shared B/C channels.

The fixed or shared C-ch is composed of a header, data field, and a CRC field as shown in FIG. 9(b). The data field transmits the data communicated by the PC 307, and its details are shown in FIG. 10A. An information field shown in FIG. 10A corresponds to the data field shown in FIG. 9(b). The fixed or shared C-ack is composed of a header and a CRC field as shown in FIG. 9(a). It transmits the response to the C-ch received by a receiving device side. Its details are shown in FIG. 10B.

Figure 11A:
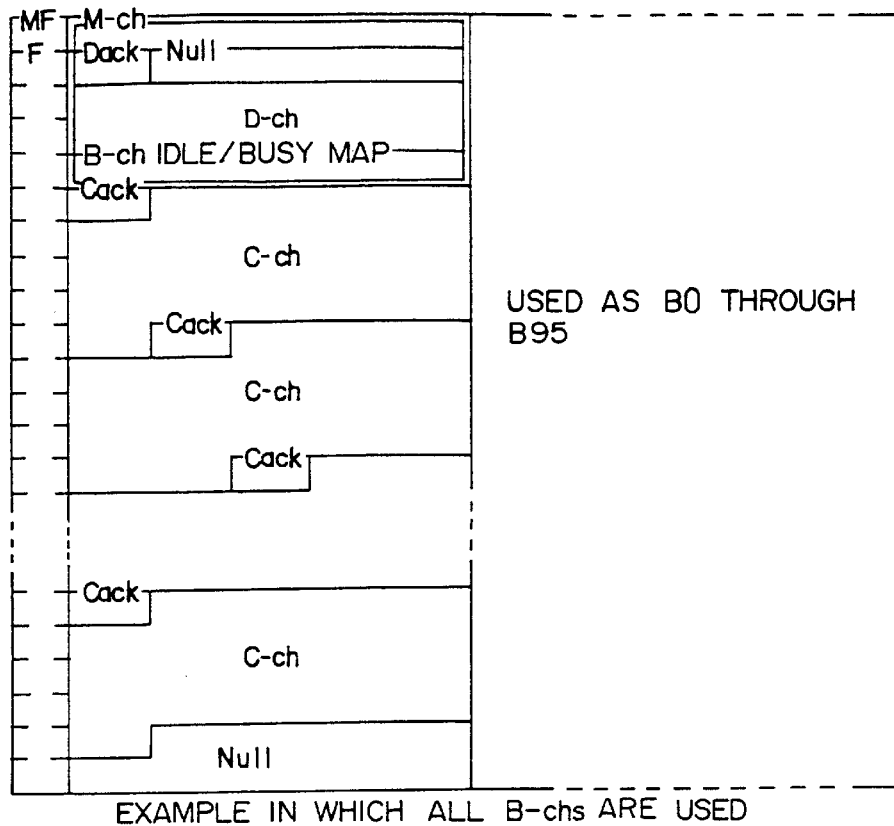
FIGS. 11A and 11B are schematic diagram showing the structures of a downstream transmission frame according to the first preferred embodiment (at the time of C-ch variable allocation)
Figure 11B:
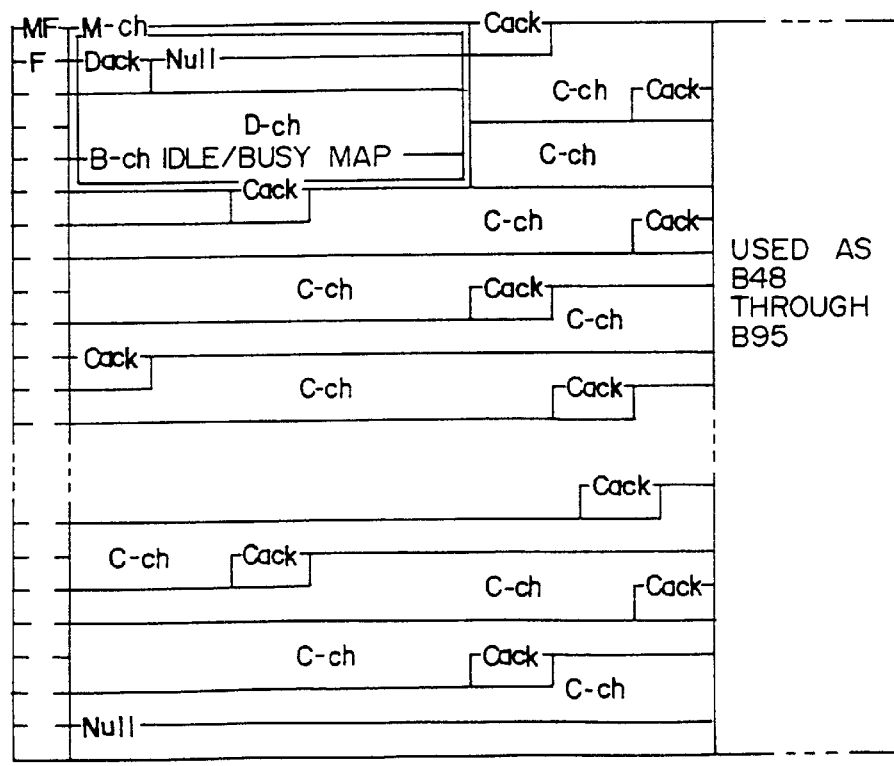

In the first preferred embodiment, the area enclosed by a double line as shown in FIG. 9, or FIG. 11A and FIG. 11B includes the M-ch in the first frame, the Dack and Null in the second frame, the D-ch in the third and fourth frames, the B-ch idle/busy map channel in the fifth frame, and each of these frames is fixedly allocated. In the meantime, B channels (B0, B1, B2, ... , B94) or the C-ch/C-ack are variably allocated in addition to the fixed C-ch/C-ack in the areas other than the area enclosed by the double line, as shown in FIG. 9, or FIG. 11A and FIG. 11B. Note that the C-ch and the C-ack are allocated so that they are sure to appear in turn.

FIG. 11A exemplifies the multi-frame format when all of B channels B0 through B95 are being used. In this case, C-ch and C-ack are allocated only to fixed areas.

FIG. 11B exemplifies the multi-frame format when half of the B-channels B48 through B95 are being used. In this case, C-ch/C-ack is dynamically allocated also to the areas corresponding to the channels B0 through B48.

Control Process Using a B-ch Idle/Busy Map

The control process for dynamically allocating a B channel or a C channel (C-ch/C-ack) to a variable areas is synchronously performed by the TDMA device 310 in the CATV center 301 and the CAU 305 using the B-ch idle/busy map inserted into every multi-frame (the fifth frame in every multi-frame) in the downstream transmission frames directing from the CATV center 301 to the CAU 305.

Figure 12A:
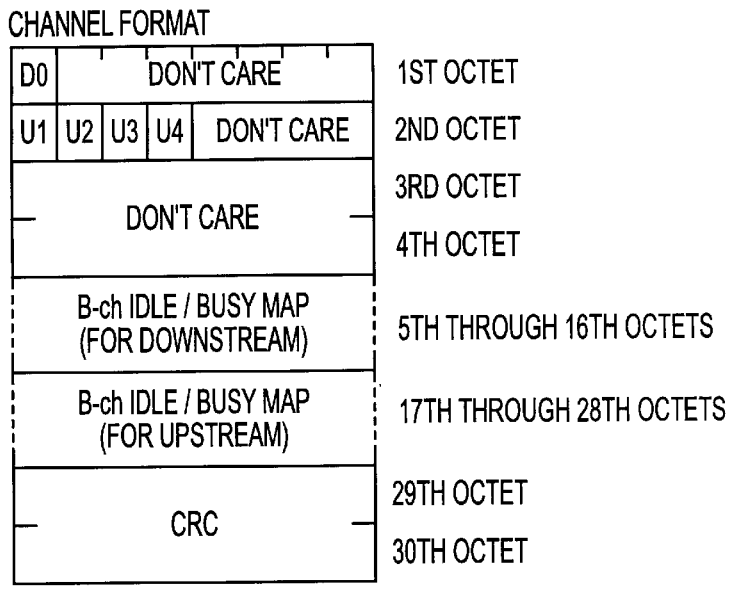
FIGS. 12A, 12B, and 12C exemplify the frame formats of a B-ch idle/busy map channel.
Figure 12B:
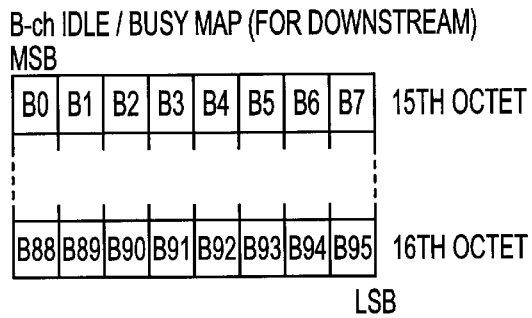
Figure 12C:
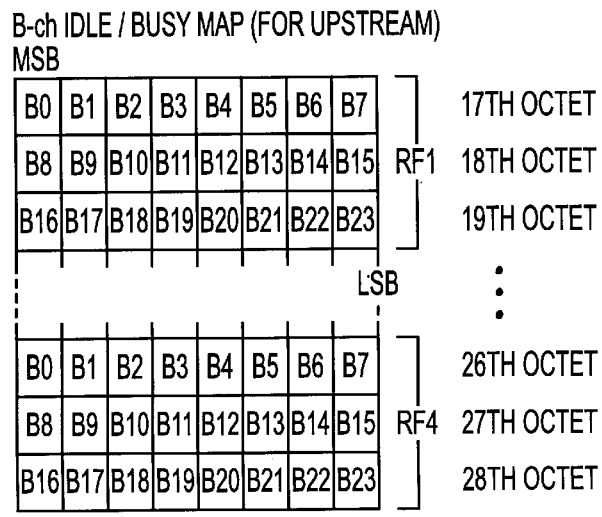

As shown in FIG. 9, the B-ch idle/busy map channel is allocated to the first half of the fifth frame in each multi-frame in a downstream transmission frame as shown in FIG. 9. FIGS. 12A, 12B, and 12C exemplify the frame formats of the B-ch idle/busy map channel.

As shown in FIG. 12A, the B-ch idle/busy map channel is composed of 30-octet data.

In the first octet shown in FIG. 12A, downstream B-ch idle/busy map change information D0 is assigned to the seventh bit (MSB), and the 6th to 0th bits are unused (Don't care).

In the second octet shown in FIG. 12A, the B-ch idle/busy map change information for an upstream RF channel 1 U1 is assigned to the seventh bit (MSB). The B-ch idle/busy map change information for an upstream RF channel 2 U2, the B-ch idle/busy map change information for an upstream RF channel 3 U3, and the B-ch idle/busy map change information for an upstream RF channel 4 U4 are respectively assigned to the sixth, fifth, and the fourth bits. The third through 0th bits are unused.

The third and fourth octets shown in FIG. 12A are unused.

The B-ch idle/busy maps (for downstream) are allocated to the 5th through 16th octets of FIG. 12A, as shown in FIG. 12B. To each of the bits in the respective octets, the state of being idle/busy (idle/busy state) of the respective B channels B0 through B95 is assigned as 1 or 0.

To the 17th to 28th octets shown in FIG. 12A, a B-ch idle/busy map (for upstream) is allocated as shown in FIG. 12C. That is, to each of the bits in the respective 17th to 19th octets, the idle/busy state of the respective B channels B0 through B23 to be allocated to the upstream RF channel 1 (RF1) is assigned as 1 or 0. To each of the bits in the respective 20th to 22nd octets, the idle/busy state of the respective B channels B0 through B23 (corresponding to the channels B24 through B47 in a downstream transmission frame) to be allocated to the upstream RF channel 2 (RF2) is assigned as 1 or 0. To each of the bits in the respective 23rd through 25th octets, the idle/busy state of the respective B channels B0 through B23 (corresponding to the channels B48 through B71 in the downstream transmission frame) to be allocated to the upstream RF channel 3 (RF3) are assigned as 1 or 0. To each of the bits in the respective 26th to 28th octets, the idle/busy state of the respective B channels B0 through B23 (corresponding to the channels B72 through B23 in the downstream transmission frame) is assigned as 1 or 0.

Because the upstream transmission frame is divided into four RF channels and allocated in order to effectively use a frequency bandwidth as described above, the B-ch idle/busy map (for an upstream) is divided into four and also the B-ch idle/busy map change information is divided into four as shown as U1 through U4 of FIG. 12A.

Figure 13:
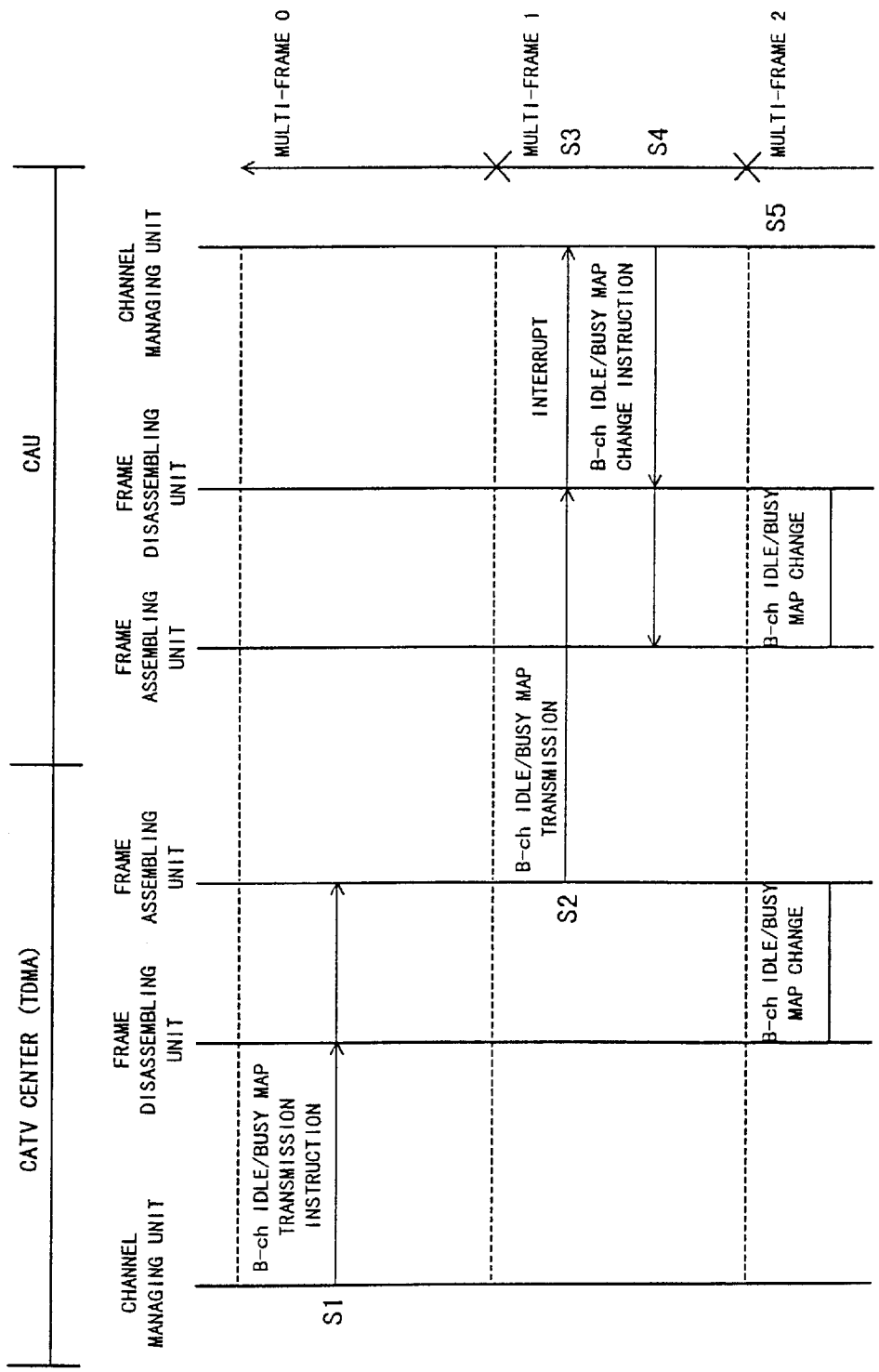
FIG. 13 shows a change sequence of a B-ch idle/busy map.

FIG. 13 is a schematic diagram showing the change sequence of a B-ch idle/busy map to be transferred from the TDMA 310 in the CATV center 301 to the CAU 305 in the subscriber home 302.

The B-ch idle/busy map is changed in units of 3 multi-frame.

First of all, the channel managing unit 408 in the TDMA 310, which is shown in FIG. 4, detects whether or not the idle/busy state of the B channel changes in the first multi-frame (multi-frame 0) in a control cycle whose unit is 3 multi-frame. When detecting the change, the channel managing unit 408 issues an instruction for transmitting a B-ch idle/busy map to the frame assembling unit 403 and the frame disassembling unit 404 (S1 of FIG. 13). The frame assembling unit 403 and the frame disassembling unit 404 do not change the B-ch idle/busy maps that the units themselves respectively store at this time.

The frame assembling unit 403 in the TDMA 310 transmits the B-ch idle/busy map to the CAU 305 in each subscriber home 302 by using the B-ch idle/busy map channel in the downstream transmission frame having the multi-frame structure shown in FIGS. 9 and 12B in the second multi-frame (multi-frame 1) in the control cycle whose unit is 3 multi-frame (S2 of FIG. 13).

The frame disassembling unit 505 in the CAU 305 extracts the format data shown in FIG. 12A from the B-ch idle/busy map channel in the downstream transmission frame, and transfers the extracted format data to the channel managing unit 507 in the CAU 305 (S3 of FIG. 13).

The channel managing unit 507 in the CAU 305 determines whether or not each B-ch idle/busy map shown in FIGS. 12B and 12C changes by determining each B-ch idle/busy map change information D0 and U1 through U4 in the format data which is received from the frame disassembling unit 505 and shown in FIG. 12A. The channel managing unit 507 notifies the frame assembling unit 504 and the frame disassembling unit 505 in the CAU 305 of the changed B-ch idle/busy map (S4 of FIG. 13).

The frame assembling unit 403/frame disassembling unit 404 in the TDMA 310, and the frame assembling unit 504/the frame disassembling unit 505 in each CAU 305 synchronously change the B-ch idle/busy map notified from the channel managing unit 408 or the channel managing unit 507 in the third multi-frame (multi-frame 2) in the control cycle whose unit is 3 multi-frame (S5 of FIG. 13).

As a result, the TDMA 310 in the CATV center 301 and the CAU 305 in each subscriber home 302 can dynamically change the allocation of the B and C channels without failing to lose sound and data.

Figure 14:
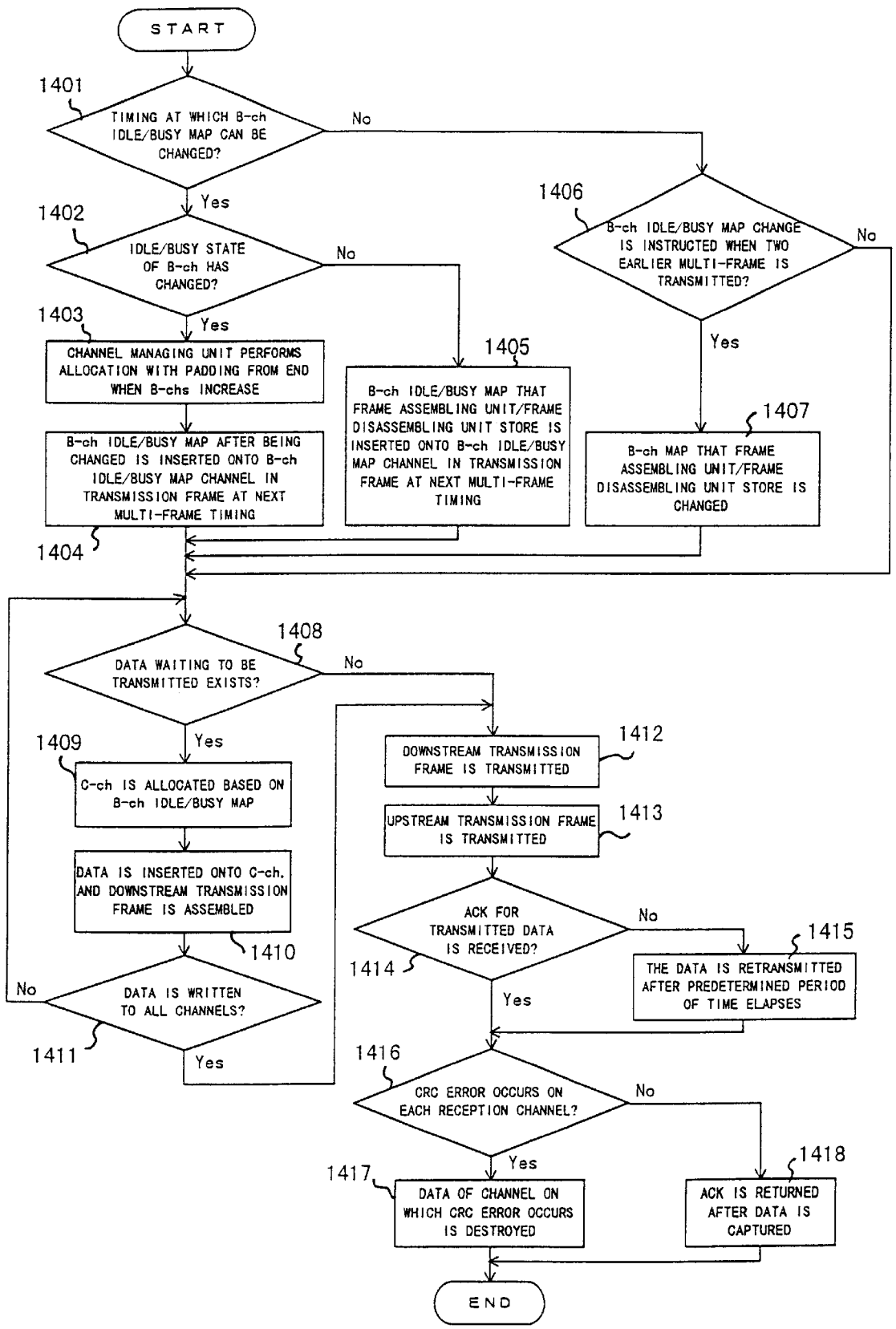
FIG. 14 is an operational flowchart of the first preferred embodiment (CATV center)

FIG. 14 is an operational flowchart of the control process that the respective components of the TDMA device 310 perform in cooperation.

First of all, the channel managing unit 408 determines whether or not a current multi-frame timing is timing at which the B-ch idle/busy map can be changed, that is, whether or not the current multi-frame timing is the first multi-frame (multi-frame 0) timing in the control cycle whose unit is 3 multi-frame, which is shown in FIG. 13 (step 1401).

If the current multi-frame timing is the timing at which the B-ch idle/busy map can be changed, the channel managing unit 408 determines whether or not the idle/busy state of the B channel changes by monitoring the processing state of the sound interface 409 (step 1402).

If the channel managing unit 408 determines that the idle/busy state of the B channel changes, it controls the allocation of the B channel so that each B channel being used is sequentially padded and allocated from the end of each transmission frame (refer to FIG. 9) (steps 1402 to 1403). This control process is performed by the channel order managing unit 413 and the B-ch managing unit 414 in the channel managing unit 408 shown in FIG. 4.

Next, the channel managing unit 408 instructs the frame assembling unit 403 to transmit the B-ch idle/busy map at the next multi-frame timing, namely, at the second multi-frame (multi-frame 1) timing in the control cycle whose unit is 3 multi-frame, which is shown in FIG. 13. Note that this transmission instruction is notified also to the frame disassembling unit 404 (refer to S1 of FIG. 13). As a result, the frame assembling unit 403 transmits the changed B-ch idle/busy map to the CAU 305 in each subscriber home 302 using the B-ch idle/busy map channel in the downstream transmission frame having the multi-frame structure shown in FIGS. 9 and 12B at the next multi-frame timing (step 1404 and S2 of FIG. 13). In this case, the frame assembling unit 403 assigns 1 to the bit corresponding to the changed B-ch idle/busy map in each B-ch idle/busy map change information D0 or U1 through U4 in the B-ch idle/busy map channel format.

If the channel managing unit 408 determines that the idle/busy state of the B channel does not change, it does not instruct the frame assembling unit 403 to transmit a new B-ch idle/busy map. Consequently, the frame assembling unit 403 transmits the unchanged B-ch idle/busy map that the frame assembling unit 403 itself stores to the CAU 305 in each subscriber home 302 at the next multi-frame timing by using the B-ch idle/busy map channel in the downstream transmission frame having the multi-frame structure shown in FIGS. 9 and 12B (steps 1402 to 1405). In this case, all of the bits in each B-ch idle/busy map change information D0 or U1 through U4 in the B-ch idle/busy map channel format remain to be 0.

If the channel managing unit 408 determines that the current multi-frame is not the timing at which the B-ch idle/busy map can be changed as a result of the determination process performed by the channel managing unit 408 in step 1401, that is, if the channel managing unit 408 determines that the current multi-frame timing is not the first multi-frame (multi-frame 0) timing in the control cycle whose unit is 3 multi-frame, which is shown in FIG. 13, the unit further determines whether or not it issues the instruction for changing/transmitting the B-ch idle/busy map when the two earlier multi-frame is transmitted, that is, whether or not the two earlier multi-frame timing is the first multi-frame timing (multi-frame 0) in the control cycle whose unit is 3 multi-frame, and whether or not the B-ch idle/busy map changes at this timing (steps 1401 to 1406).

If the channel managing unit 408 determines that it issues the instruction for changing/transmitting the B-ch idle/busy map when the two earlier multi-frame is transmitted, it instructs the frame assembling unit 403 and the frame disassembling unit 404 to change the B-ch idle/busy map. As a result, the frame assembling unit 403 and the frame disassembling unit 404 update the B-ch idle/busy maps that they themselves store to the map notified from the channel managing unit 408 at the two earlier multi-frame timing (steps 1406 to 1407 and S5 of FIG. 13). Thereafter, the frame assembling unit 403 and the frame disassembling unit 404 can assemble/disassemble the B channel/C channel for a transmission frame based on the dynamically changed B-ch idle/busy map.

After the operations performed in steps 1404, 1405, or 1407, or after it is determined that the B-ch idle/busy map is not instructed to be changed or transmitted at the time of transmission of the two earlier multi-frame in the determination process in step 1406, the frame assembling unit 403 and the frame disassembling unit 404 perform a series of operations to be described below (steps 1408 through 1418).

First of all, the frame assembling unit 403 determines whether or not the data waiting to be transmitted exists in the transmission buffer 411 (step 1408).

If the frame assembling unit 403 determines that the data waiting to be transmitted exists, it sequentially inserts the data in the transmission buffer 411 onto a C channel (C-ch) while controlling the allocation of the C channel (C-ch) based on the state of the B-ch idle/busy map set by the channel managing unit 408, and assembles a downstream transmission frame (refer to FIG. 9) (steps 1408 to 1409 to 1410).

At this time, the frame assembling unit 403 performs its operation so that the C-ch is padded and allocated from the start of each transmission frame (refer to FIG. 9) based on the control from the channel order managing unit 413 and the C-ch managing unit 415 in the channel managing unit 408.

As described above, a B channel is padded and allocated from the end of each transmission frame and a C channel is padded and allocated from the start of each transmission frame, so that the frequency of recombination of the B and C channels can be lowered.

The frame assembling unit 403 repeatedly performs the above described operation for inserting a C-ch until it determines that data is written to all channels that can be allocated in a current frame or until there is no data waiting to be transmitted in the transmission buffer 411 (steps 1404 through 1411). Then, the frame assembling unit 403 transmits the generated downstream transmission frame to the downstream transmission line interface 406 (steps 1408 through 1412 or steps 1411 to 1412).

Next, the frame disassembling unit 404 receives an upstream transmission frame from the upstream transmission line interface 407 (step 1413).

The frame disassembling unit 404 then determines whether or not an ACK which is a response to each transmitted data by monitoring the transmission state of the data in the frame assembling unit 403 (step 1414).

If the frame disassembling unit 404 does not receive an ACK responding to data within a predetermined time period after each data is transmitted, it retransmits the data (step 1415).

If the frame disassembling unit 404 receives the ACK for the data in a predetermined time period after each data is transmitted, the error detection code controlling unit 419 determines whether or not a transmission error occurs in each reception C-ch in an upstream transmission frame by detecting a CRC (refer to FIG. 7) in each C-ch in each upstream transmission frame (step 1416).

If the error detection code controlling unit 419 detects a transmission error, it destroys the data of the C-ch and does not transmit the data to the reception buffer 412 (steps 1416 to 1417). Since C-ack is not returned to the CAU 305 in this case, the CAU 305 retransmits the same data (refer to step 1516 of FIG. 15 which will be described later).

If the error detection code controlling unit 419 does not detect a transmission error, it captures the data of the C-ch and transmits it to the reception buffer 412, and at the same time, it notifies the ACK returning unit 420 that no transmission error is detected (refer to FIGS. 9(a) and 10B). The ACK returning unit 420 instructs the frame assembling unit 403 to transmit the C-ack (refer to FIGS. 9(a) and 10B) for the C-ch data (steps 1416 to 1418). As a result, the response indicating that the C-ch data has been properly received is returned from the TDMA 310 to the corresponding CAU 305.

Figure 15:
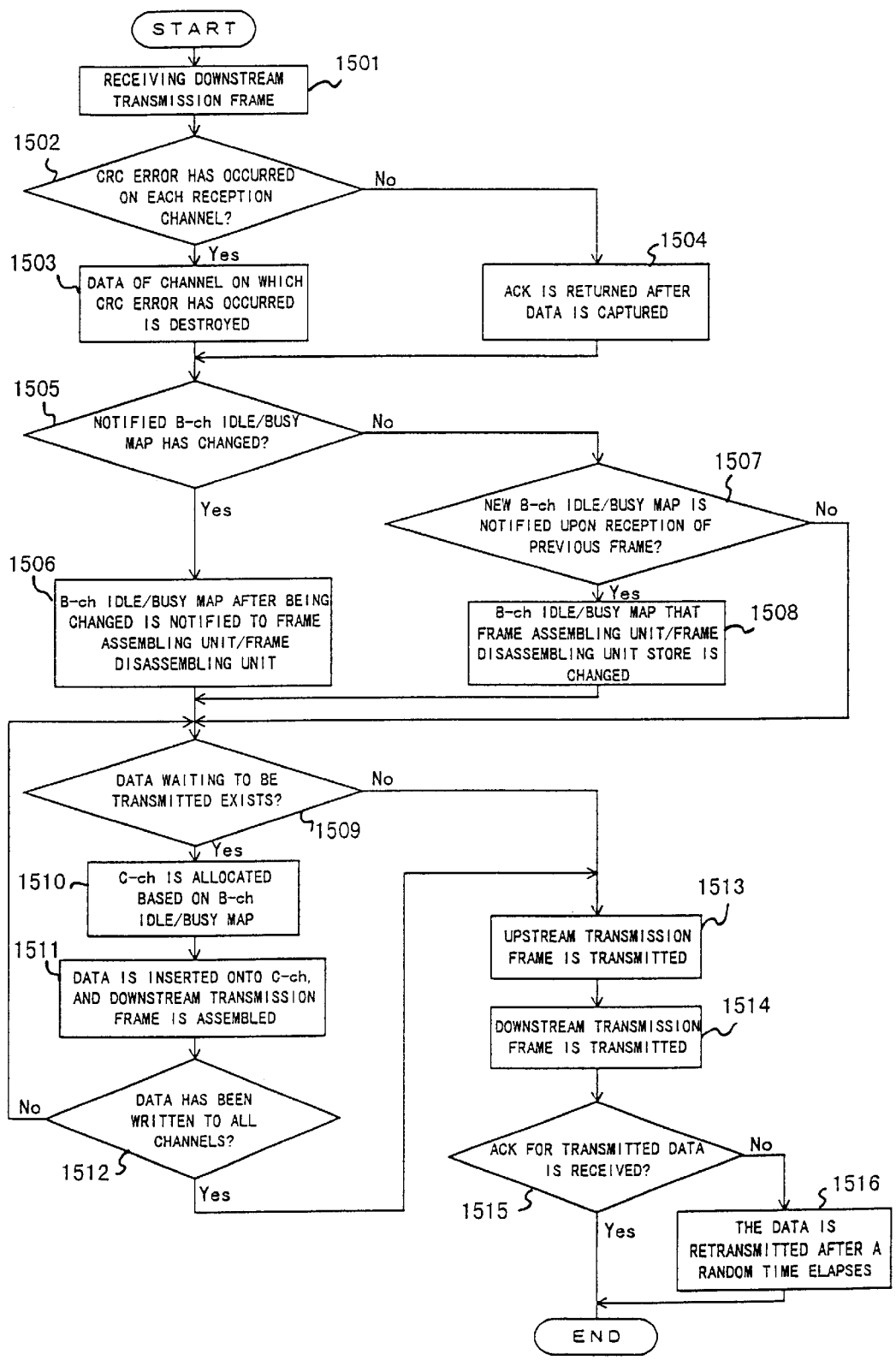
FIG. 15 is an operational flowchart of the first preferred embodiment (CAU device)

FIG. 15 is an operational flowchart showing the control process that the respective components in the CAU 305 in a subscriber home 302 perform in cooperation.

First of all, the frame disassembling unit 505 receives a downstream transmission frame (refer to FIG. 9) via an RF modem 503 (step 1501).

Next, the error detection code controlling unit 512 determines whether or not a transmission error occurs in each reception C-ch in the downstream transmission frame by detecting the CRC (refer to FIG. 9(b)) in each downstream transmission frame (step 1502).

If the error detection code controlling unit 512 detects a transmission error, it destroys the data of the C-ch and does not transmit the data to the reception buffer 509 (steps 1502 to 1503). Because C-ack is not returned to the TDMA 310 in this case, the TDMA 310 retransmits the same data (step 1415 of FIG. 14).

If the error detection code controlling unit 512 does not detect a transmission error, it captures the data of the C-ch and transmits it to the reception buffer 509. At the same time, the error detection code controlling unit 512 notifies the ACK returning unit 513 that no transmission error is detected. The ACK returning unit 513 instructs the frame assembling unit 504 to transmit the C-ack (refer to FIGS. 9(a) and 10B) for the data of the C-ch (steps 1502 to 1504). As a result, the response indicating that the data of the C-ch has been properly received is returned from the CAU 305 to the TDMA 310.

Next, the channel managing unit 507 determines whether or not each B-ch idle/busy map shown in FIGS. 12B and 12C changes by determining each B-ch idle/busy map change information D0 and U1 through U4 in the format data of the B-ch idle/busy map channel, which is shown in FIG. 12A and extracted by the frame disassembling unit 505 (step 1505 and S3 of FIG. 13).

If the channel managing unit 507 determines that any of the B-ch idle/busy maps changes, it notifies the frame assembling unit 504 and the frame disassembling unit 505 in the CAU 305 of the changed B-ch idle/busy map (steps 1505 to 1506 and S4 of FIG. 13).

If the channel managing unit 507 determines that no B-ch idle/busy maps change, it further determines whether or not it notifies the frame assembling unit 504 and the frame disassembling unit 505 of the B-ch idle/busy map which is newly changed upon reception of the previous multi-frame, that is, whether or not the previous multi-frame timing is the second multi-frame (multi-frame 1) timing in the control cycle whose unit is 3 multi-frame, and whether or not the B-ch idle/busy map changed at that timing is received (steps 1505 to 1507. Refer to FIG. 13).

If the channel managing unit 507 determines that it notifies the frame assembling unit 504 and the frame disassembling unit 505 of the B-ch idle/busy map which is newly changed upon reception of the previous multi-frame, it instructs the frame assembling unit 504 and the frame disassembling unit 505 to change the B-ch idle/busy map at the current multi-frame timing. As a result, the frame assembling unit 504 and the frame disassembling unit 505 update the B-ch idle/busy maps that the units themselves store to the B-ch idle/busy map notified from the channel managing unit 507 at the previous multi-frame timing (steps 1507 to 1508 and S5 of FIG. 13). Thereafter, the frame assembling unit 504 and the frame disassembling unit 505 can assemble/disassemble the B channel/C channel for a transmission frame based on the B-ch idle/busy map which is dynamically changed.

After the operation performed in step 1506 or 1508, or after it is determined that the B-ch idle/busy map which is newly changed upon receipt of the previous multi-frame is not notified to the frame assembling unit 504 and the frame disassembling unit 505 in the determination process performed in step 1507, the frame assembling unit 504 and the frame disassembling unit 505 perform a series of operations to be described below (steps 1509 through 1516).

First of all, the frame assembling unit 504 determines whether or not the data waiting to be transmitted exists in the transmission buffer 508 (step 1509).

If the frame assembling unit 504 determines that the data waiting to be transmitted exists, it sequentially inserts the data in the transmission buffer 508 into the C-ch and assembles an upstream transmission frame (refer to FIG. 7) while controlling the allocation of the C channel (C-ch) based on the setting state of the B-ch idle/busy map that the frame assembling unit 504 itself stores (steps 1509 to 1510 to 1511).

In this case, the frame assembling unit 504 performs the operation so that the C-ch is padded and allocated from the start of each transmission frame (refer to FIG. 8) according to the B-ch idle/busy map.

The frame assembling unit 504 repeatedly performs the above described operation for inserting a C-ch until it determines that the data is written to all of channels that can be allocated in a current frame or until it determines there is no data waiting to be transmitted in the transmission buffer 508 (steps 1509 through 1512). The frame assembling unit 504 then transmits the generated upstream transmission frame to the RF modem 503 (steps 1509 through 1513 or steps 1512 to 1513).

Next, the frame disassembling unit 505 receives a downstream transmission frame from the RF modem 503 (step 1514).

The frame disassembling unit 505 then determines whether or not it receives a response ACK for each transmitted data by monitoring the transmission state of the data in the frame assembling unit 504 (step 1515).

If the frame disassembling unit 505 does not receive the ACK for the data within a random time after each data is transmitted, it retransmits that data (step 1516).

Second Preferred Embodiment According to the Present Invention

According to the above described first preferred embodiment, the CAU 305 is configured so that error detection is made by the error detection code controlling unit 512 and the ACK returning unit 513 for each C-ch data transmitted from the TDMA 310. According to the second preferred embodiment, the CAU 305 can be configured so that an error detection is not made for the C-ch data transmitted from the TDMA 310 and an ACK is not returned from the CAU 305 to the TDMA 310. Accordingly, the TDMA 310 sequentially transmits data to each CAU 305 without making confirmation using an ACK.

The TDMA 310 and each CAU 305 are connected in a 1-to-n correspondence, no collision of downstream transmission frames occurs. Accordingly, for the data transmitted by using a downstream transmission frame, the reliability of the communication can be secured without making confirmation using an ACK. Note that retransmission control is made by an upper layer protocol (such as a TCP protocol) if a transmission error of data occurs.

Third Preferred Embodiment According to the Present Invention

The basic configuration of the third preferred embodiment is the same as that of the first preferred embodiment.

In the third preferred embodiment, the TDMA 310 or the CAU 305 can store a plurality of pieces of data from an identical terminal in the transmission buffer 411 or 508, in a plurality of channels C-ch in one transmission frame (a downstream transmission frame or an upstream transmission frame), and transmits the plurality of pieces of data at one frame timing, if there are a plurality of pieces of data waiting for to be transmitted from an identical terminal which is not shown in the drawings or PC 307 (hereinafter referred to as an identical terminal) in the transmission buffer 411 or 508, and if a plurality of channels C-ch can be allocated to one upstream transmission frame.

Figure 16:
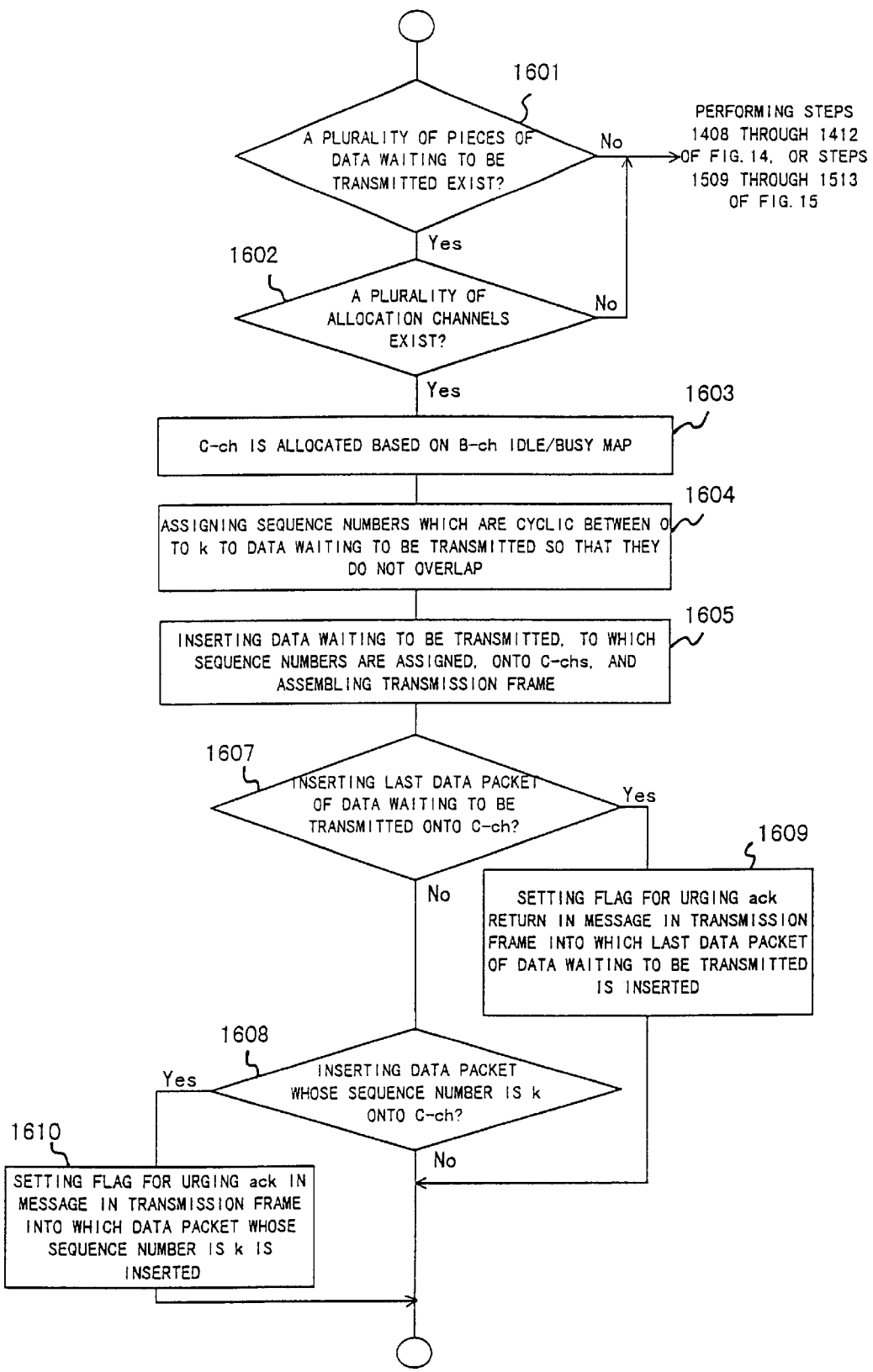
FIG. 16 is an operational flowchart of the third preferred embodiment (transmitting side)

FIG. 16 is an operational flowchart showing the principal part of the control process implemented by the device (the TDMA 310 or the CAU 305) on the transmitting side in the third preferred embodiment. This principal part replaces steps 1408 through 1411 of the operational flowchart shown in FIG. 14, or steps 1509 through 1512 of the operational flowchart shown in FIG. 15 according to the first preferred embodiment.

First of all, the frame assembling unit 403 or 504 determines whether or not there are a plurality of pieces of data waiting to be transmitted from an identical terminal in the transmission buffer 411 or 508 (step 1601).

If the frame assembling unit 403 or 504 determines that there are the plurality of pieces of data waiting to be transmitted from the identical terminal, it further determines whether or not there are a plurality of channels C-ch that the frame assembling unit 403 or 504 itself can allocate to a downstream or upstream transmission frame at the current frame timing based on the B-ch idle/busy map (step 1602).

If the frame assembling unit 403 or 504 determines that there are no plurality of pieces of data waiting to be transmitted from the identical terminal in step 1601, or if it determines that there are no plurality of channels C-ch that can be allocated to the upstream transmission frame at the current frame timing in step 1602, it performs the operations in steps 1408 through 1411 of the operational flowchart shown in FIG. 14 or the operations in steps 1509 through 1512 of the operational flowchart shown in FIG. 15 according to the first preferred embodiment, instead of performing the operations in steps 1603 through 1609 of FIG. 16.

If the frame assembling unit 403 or 504 determines that there are the plurality of channels C-ch that can be allocated to the downstream or upstream transmission frame at the current frame timing, it allocates the C-ch based on the B-ch idle/busy map that the frame assembling unit 403 or 504 itself stores (step 1603).

Next, the frame order controlling unit 421 or 518 assigns sequence numbers which are cyclic between 0 and k to the plurality of pieces of data waiting to be transmitted from the identical terminal and to be stored in the downstream or upstream transmission frame at the current frame timing in the transmission buffer 411 or 508, so that the sequence numbers do not overlap (step 1604).

Then, the frame assembling unit 403 or 504 assembles a downstream or upstream transmission frame at the current timing by inserting the plurality of pieces of data assigned sequence numbers waiting to be transmitted from the identical terminal in the transmission buffer 411 or 508 onto the C-ch in the downstream or upstream transmission frame allocated in step 1603 (step 1605).

The format of the C-ch in this case may be, for example, the format in the first preferred embodiment shown in FIG. 10B, and its sequence number in this case is stored in the SN field in the header shown in FIG. 10A.

The frame assembling unit 403 or 504 determines whether or not all of the plurality of pieces of data waiting to be transmitted from the identical terminal in the transmission buffer 411 or 508, have been inserted onto the plurality of channels C-ch in the downstream or upstream transmission frame at the current frame timing (step 1607).

The frame assembling unit 403 or 504 determines that the last piece of data among the plurality of pieces of data waiting to be transmitted from the identical terminal in the transmission buffer 411 or 508 has been inserted onto a C-ch in the downstream or upstream transmission frame, it sets a flag for urging an ACK return for the data (steps 1607 to 1609), and transmits the transmission frame to the downstream transmission line interface 406 or the RF modem 503 in step 1412 of FIG. 14 or step 1513 of FIG. 15. The above described flag is stored, for example, in the P field in the header shown in FIG. 10A.

If the frame assembling unit 403 or 504 determines that the last piece of data among the plurality of pieces of data waiting to be transmitted from the identical terminal in the transmission buffer 411 or 508 has not been inserted onto the C-ch in the downstream or upstream transmission frame at the current frame timing, it further determines whether or not the piece of data having the sequence number k waiting to be transmitted has been inserted onto the plurality of channels C-ch in the downstream or upstream transmission frame at the current frame timing (step 1608).

If the result of the determination made in step 1608 is YES, the frame assembling unit 403 or 504 sets the flag for urging an ACK return for the data (steps 1608 through 1610), and transmits the transmission frame to the downstream transmission line interface 406 or the RF modem 503 in step 1412 of FIG. 14 or step 1513 of FIG. 15.

If the result of the determination made in step 1608 is NO, the frame assembling unit 403 or 504 transmits a downstream or upstream transmission frame to the downstream transmission line interface 406 or the RF modem 503 in step 1412 of FIG. 14 or step 1513 of FIG. 15.

FIG. 17 is an operational flowchart showing the principal part of the control process implemented by a device on a receiving side (the CAU 305 or the TDMA 310) according to the third preferred embodiment. This is a group of operations inserted between steps 1514 and 1515 of the operational flowchart shown in FIG. 15, and between steps 1413 and 1414 of the operational flowchart shown in FIG. 14 according to the first preferred embodiment.

First of all, the frame order controlling unit 518 or 421 determines whether or not the plurality of channels C-ch from the identical terminal are included in the downstream or upstream transmission frame received by the frame disassembling unit 505 or 404 in step 1514 of FIG. 15 or in step 1413 of FIG. 14 (step 1701). This determination process is implemented as a process for determining a terminal identifier TID included in each C-ch in a downstream or upstream transmission frame.

If the frame order controlling unit 518 or 421 determines that the plurality of channels C-ch from the identical terminal are not included in the downstream or upstream transmission frame (the result of the determination made in step 1701 is NO), the frame disassembling unit 505 or 404 performs the operations in and after step 1515 of FIG. 15 or the operations in and after step 1414 of FIG. 14.

If the frame order controlling unit 518 or 421 determines that the plurality of channels C-ch from the identical terminal are included in the downstream or upstream transmission frame, it further determines whether or not the respective sequence numbers assigned to the plurality of channels C-ch are consecutive (steps 1701 to 1702).

If the frame order controlling unit 518 or 421 determines that the respective sequence numbers assigned to the plurality of channels C-ch in the downstream or upstream transmission frame are consecutive (the result of the determination made in step 1702 is YES), the frame disassembling unit 505 or 404 performs the operations in and after step 1515 of FIG. 15 or the operations in and after step 1414 of FIG. 14. As a result, the data of the plurality of channels C-ch in the downstream or upstream transmission frame are sequentially extracted and transmitted to the reception buffer 412. In this case, the error detection code controlling unit 512 or 419 instructs the ACK returning unit 513 or 420 to return an ACK using the C-ack only when the error detection code controlling unit 512 or 419 receives the data in which the flag for urging an ACK return (the P field in the header shown in FIG. 10A) is set and does not detect a transmission error.

If the frame order controlling unit 518 or 421 determines that the respective sequence numbers assigned to the plurality of channels C-ch in the downstream or upstream transmission frame are not consecutive, it generates error message data and writes the generated data to the transmission buffer 508 or 411. This error message data is returned to the corresponding TDMA 310 or CAU 305 via the frame assembling unit 504 or 403 (steps 1702 to 1703). Thereafter, the frame disassembling unit 505 or 404 performs the operations in and after step 1515 of FIG. 15 or the operations in and after step 1414 of FIG. 14.

Fourth Preferred Embodiment According to the Present Invention

The basic configuration of the fourth preferred embodiment is similar to that of the first preferred embodiment.

According to the fourth preferred embodiment, a particular CAU 305 connected to the TDMA 310 in the CATV center 301 can communicate data by using a dedicated C channel which is fixedly allocated.

Figure 19:
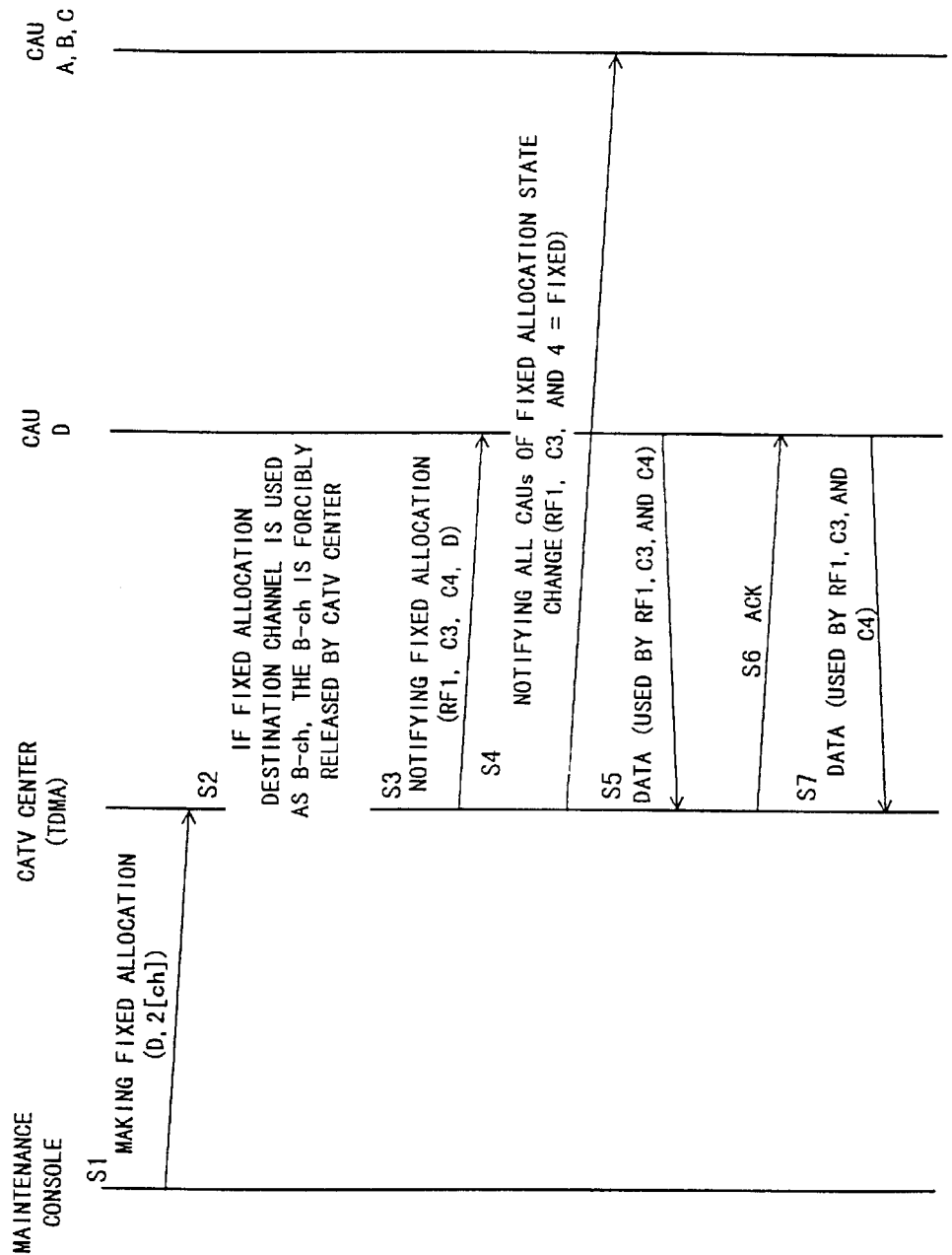
FIG. 19 shows the sequence of the fourth preferred embodiment.
Figure 20:
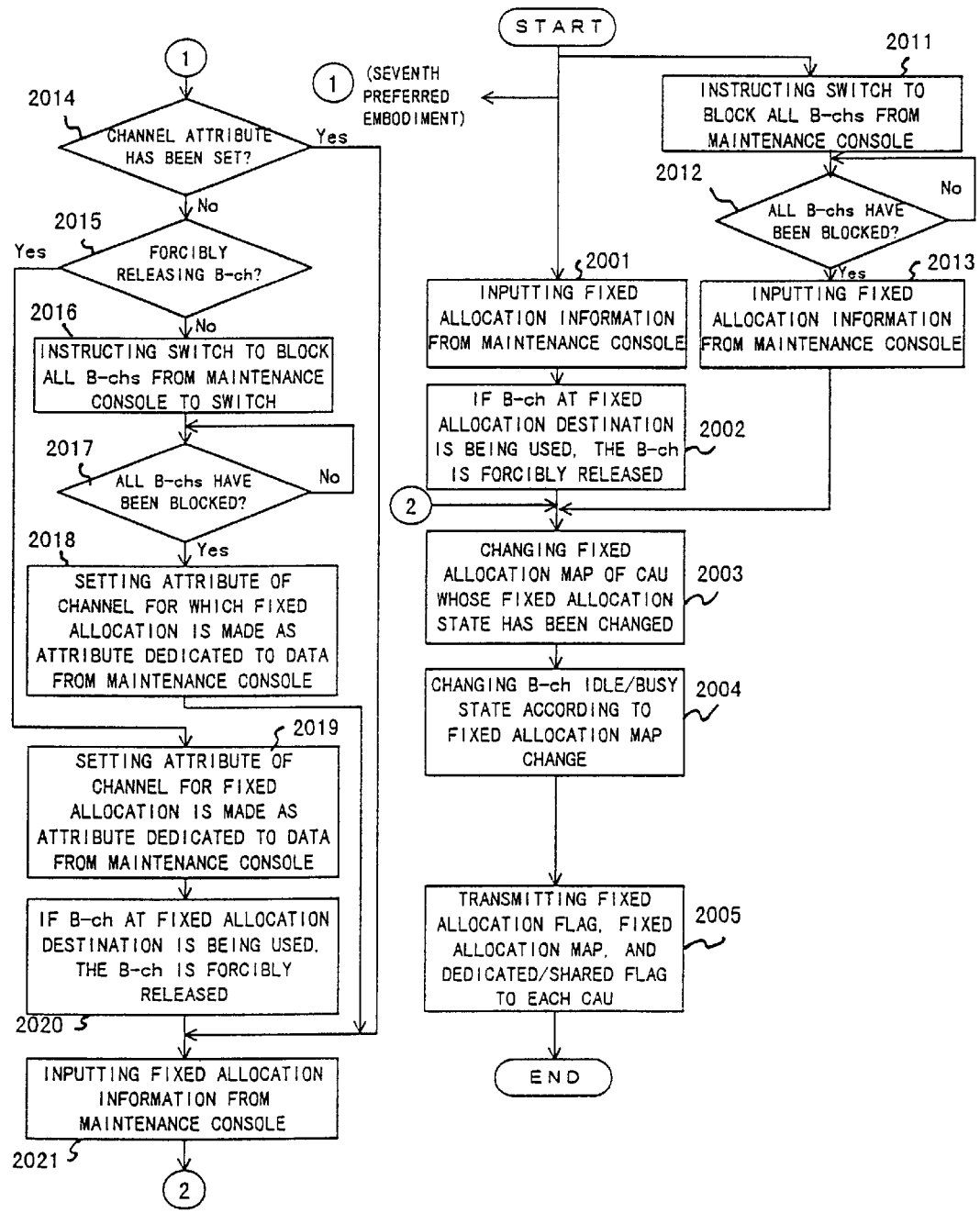
FIG. 20 is an operational flowchart of the fourth to eighth preferred embodiments (CATV center)
Figure 21:
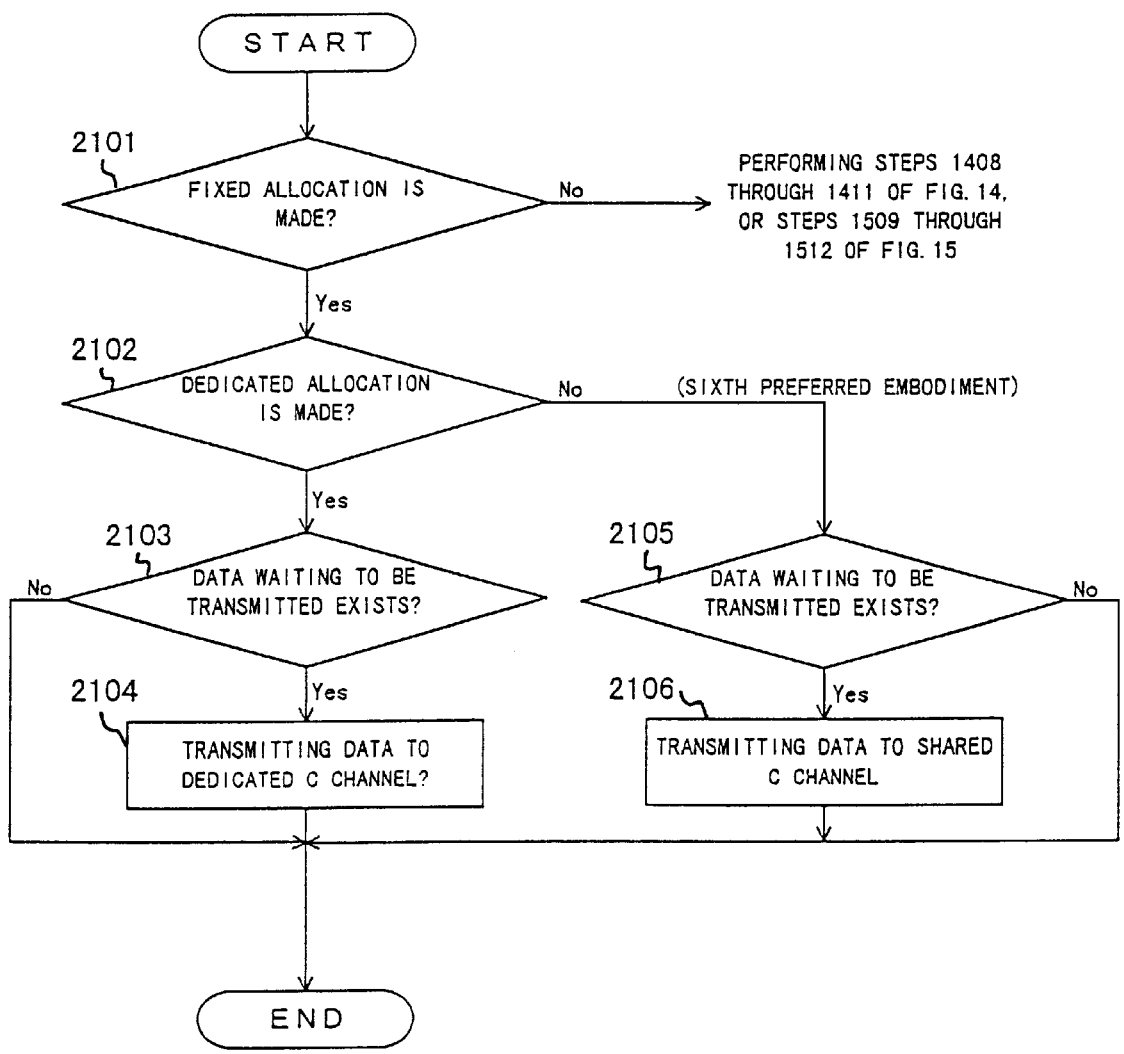
FIG. 21 is an operational flowchart of the fourth to eighth preferred embodiments (CAU device)

FIG. 18 is a schematic diagram explaining the operations performed in the fourth preferred embodiment; FIG. 19 shows the sequence of the fourth preferred embodiment; FIG. 20 is an operational flowchart showing the control process performed by the TDMA 310, according to the fourth preferred embodiment; and FIG. 21 is an operational flowchart showing the control process performed by the CAU 305, according to the fourth preferred embodiment.

Provided first is the explanation about the operations for fixedly allocating the dedicated C channel, which are performed by the TDMA 310.

First of all, the command for permitting the fixed allocation of the dedicated C channel is entered from the maintenance console 314 (shown in FIG. 3) to the TDMA 310 (S1 of FIGS. 18 and 19 and step 2001 of FIG. 20). In the examples shown in FIGS. 18 and 19, the command for permitting the fixed allocation of two upstream dedicated C channels is entered to the CAU 305(D).

If the B channel at the fixed allocation destination is being used, the fixed allocation controlling unit 425 instructs the channel managing unit 408 to forcibly release the B channel (step S2 of FIGS. 18 and 19 and step 2002 of FIG. 20).

The fixed allocation controlling unit 425 manages the terminal identifier TID (refer to FIGS. 7, 10A, etc.) of the CAU 305 at the fixed allocation destination as a fixed allocation flag, and at the same time, it manages the fixed allocation state of the communication channel in each CAU 305 as a fixed allocation map. The fixed allocation flag is a bitmap in which 1 bit is assigned to each CAU 305 connected to the TDMA 310. The bit of the CAU 305 for which the fixed allocation is made is set to 1, while the bit of the CAU 305 for which the fixed allocation is not made is set to 0. The fixed allocation map is a bitmap in which 1 bit is assigned to each shared B/C channel in the upstream transmission frame and each shared B/C channel in the downstream transmission frame. The bit of the channel for which the fixed allocation is made is set to 1, while the bit of the channel for which the fixed allocation is not made is set to 0.

The fixed allocation controlling unit 425 changes the fixed allocation flag of a specified CAU 305 according to an instruction issued from the maintenance console 314, and at the same time, it changes the fixed allocation map of the CAU 305 (step 2003 of FIG. 20). Simultaneously, the fixed allocation controlling unit 425 instructs the B-ch managing unit 414 and the C-ch managing unit 415 in the channel managing unit 408 to perform the fixed allocation.

Next, the fixed allocation controlling unit 425 instructs the channel managing unit 408 to change the B-ch idle/busy state according to the changed fixed allocation state (step 2004 of FIG. 20). Specifically, if a B-channel in an idle state is newly and fixedly allocated as a C channel, the instruction for changing the state of the B channel to a busy state is issued. The result of the change is reflected on the B-ch idle/busy map with the control process which performed by the channel managing unit 408, etc., and is shown as the operational flowchart of FIG. 14 according to the first preferred embodiment. The result is then notified to all CAUs connected to the TDMA 310 (refer to S4 of FIGS. 18 and 19, and FIG. 13). Consequently, the CAUs 305 other than the CAU 305 for which the fixed allocation is made recognize that the channel for which the fixed allocation is made is being used as a B channel. Therefore, they can perform the operations so as not to use the C channel for which the fixed allocation is made.

Additionally, the fixed allocation controlling unit 425 notifies the CAU 305 for which the fixed allocation is made of channel allocation information composed of the fixed allocation flag, the fixed allocation map, and the dedicated flag indicating that the channel for which the fixed allocation is made is dedicated (S3 of FIGS. 18 and 19 and step 2005 of FIG. 20). The above described notification is made, for example, by using a particular fixed C channel (a C channel C-ch other than the shared B/C channel shown in FIG. 9). In the examples shown in FIGS. 18 and 19, the channel allocation information indicating that the shared C3 and C4 channels of the upstream transmission frame in an RF1 bandwidth are allocated fixedly to a CAU 305(D), is notified to the CAU 305(D).

This channel allocation information is received and managed by the channel managing unit 507 in the CAU 305 via the frame disassembling unit 505 in the corresponding CAU 305.

FIG. 21 is an operational flowchart showing the principal part of the control process implemented by the device (the CAU 305 or the TDMA 310) on the transmitting side, according to the fourth preferred embodiment. This replaces the operations performed in steps 1509 through 1512 of the operational flowchart shown in FIG. 15, or the operations performed in steps 1408 through 1411 of the operational flowchart shown in FIG. 14 according to the first preferred embodiment.

First of all, the frame assembling unit 504 or 403 determines whether or not a C channel is allocated fixedly to the channel managing unit 507 or 408 (step 2101).

If the frame assembling unit 504 or 403 determines that the C channel is not allocated fixedly to the channel managing unit 507 or 408, it performs the operations in steps 1408 through 1411 of the operational flowchart shown in FIG. 14, or the operations in steps 1509 through 1512 of the operational flowchart shown in FIG. 15 according to the first preferred embodiment, instead of performing the operations in steps 2102 through 2106 shown in FIG. 21.

If the frame assembling unit 504 or 403 determines that the C channel is allocated fixedly to the channel managing unit 507 or 408, it determines whether the fixed allocation of the C channel is either dedicated (dedicated allocation) or shared (shared allocation) (step 2102).

The operations in steps 2105 and 2106, which are performed when the fixedly allocated channel is shared, will be later referred to in the explanation of the sixth preferred embodiment.

If the frame assembling unit 504 or 403 determines that the fixedly allocated channel is dedicated (dedicated allocation), it determines whether or not the data waiting to be transmitted exists in the transmission buffer 508 or 411 (step 2103).

If the frame assembling unit 504 or 403 determines that the data waiting to be transmitted exists, it ignores the setting state of the B-ch idle/busy map, inserts the data in the transmission buffer 508 or 411 onto the dedicated C channel which is fixedly allocated, and assembles an upstream or downstream transmission frame (step 2104).

The frame assembling unit 504 or 403 then transmits the assembled upstream or downstream transmission frame to the RF modem 503 or the downstream transmission line interface 406 in step 1513 of FIG. 15 or step 1412 of FIG. 14.

Fifth Preferred Embodiment According to the Present Invention

The basic configuration of the fifth preferred embodiment is similar to that of the fourth preferred embodiment.

The difference between the fifth and fourth preferred embodiments is not that the B channel being used at a fixed allocation destination is not forcibly released when fixed allocation is made, but that the fixed allocation is made after the instruction for blocking all B channels is issued to the switch 309 shown in FIG. 3 in advance.

Figure 22:
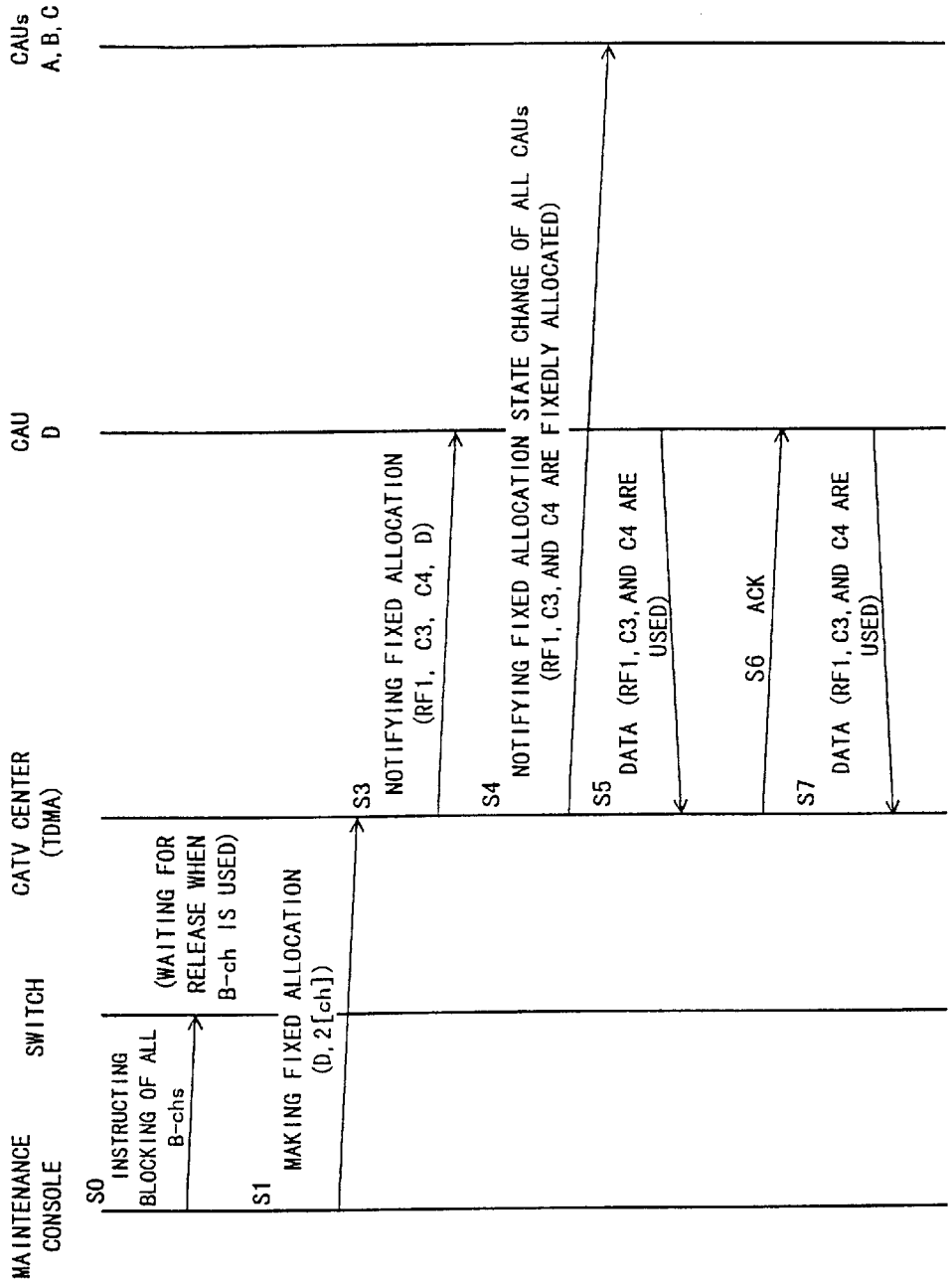
FIG. 22 shows the sequence of the fifth preferred embodiment.

FIG. 22 shows the sequence of the fifth preferred embodiment corresponding to that of the fourth preferred embodiment shown in FIG. 19. The differences between FIGS. 22 and 19 are that the instruction for blocking all B channels is issued from the maintenance console 314 (shown in FIG. 3) to the switch 309 before the command for permitting the fixed allocation of the C channel is entered from the maintenance console 314 (S0 of FIG. 22) at the CATV canter 301, and that the process for forcibly releasing the B channel being used (S2 of FIG. 19) is eliminated. Each of the operations performed in steps S1 and S3 through S7 of FIG. 22 are the same as those performed in steps S1 and S3 through S7 of FIG. 19.

The operations performed in steps 2011 through 2013 of FIG. 20 correspond to the control process of the fifth preferred embodiment, and are the operations performed instead of those in steps 2001 and 2002 according to the fourth preferred embodiment.

First of all, the instruction for blocking all B channels is issued from the maintenance console 314 (shown in FIG. 3) to the switch 309 (step 2011 and S0 of FIG. 22).

The maintenance console 314 waits for the completion of blocking all the B channels in the switch 309 (step 2012).

When the blocking of all the B channels is completed in the switch 309, the command for permitting the fixed allocation of the C channel is entered from the maintenance console 314 (step 2013 of FIG. 20 and S1 of FIG. 22).

Thereafter, the fixed allocation controlling unit 425 performs the process for changing the fixed allocation of the CAU 305 specified from the maintenance console 314, without performing the process for forcibly releasing the B channel being used at the fixed allocation destination (step 2003 of FIG. 20).

The operations in and after step 2003 according to the fifth preferred embodiment, which are shown in FIG. 20, are similar to those according to the fourth preferred embodiment.

According to the above described fifth preferred embodiment, a fault such as a communication disconnection caused by forcibly releasing a B channel being used can be prevented.

Sixth Preferred Embodiment According to the Present Invention

The basic configuration of the sixth preferred embodiment is similar to that of the fourth preferred embodiment.

The difference between the sixth and fourth preferred embodiments is that a predetermined C channel is allocated fixedly not only to a single CAU 305, but to a plurality of particular CAUs 305.

With this feature, the plurality of particular CAUs 305 can share the predetermined fixed C channel, and communicate data, thereby using a transmission line more efficiently.

The process for setting a fixed allocation flag and a fixed allocation map, which is performed by the TDMA 310 for the plurality of particular CAUs 305, is implemented by steps 2001 through 2005 of FIG. 20, which were referred to in the explanation of the fourth preferred embodiment.

In this case, the fixed allocation controlling unit 425 simultaneously assigns 1 to the bits corresponding to the plurality of particular CAUs 305 in the fixed allocation flag in step 2003, and simultaneously notifies the plurality of particular CAUs 305 for which the fixed allocation is to be made of the channel allocation information composed of the fixed allocation flag, the fixed allocation map, and the shared flag indicating that a fixedly allocated channel is shared at step 2005.

The operations in steps 2105 and 2106 of the operational flowchart shown in FIG. 21, which were referred to in the explanation of the fourth preferred embodiment, are the principal part of the control process implemented by the device (the CAU 305 or the TDMA 310) on the transmitting side.

If the frame assembling unit 504 or 403 determines that the fixedly allocated channel is shared (shared allocation) in step 2102, it further determines whether or not the data waiting to be transmitted exists in the transmission buffer 508 or 411 (step 2105).

If the frame assembling unit 504 or 403 determines that the data waiting to be transmitted exists, it ignores the setting state of the B-ch idle/busy map, inserts the data in the transmission buffer 508 or 411 onto the shared C channel which is fixedly allocated, and assembles an upstream or downstream transmission frame.

Thereafter, the frame assembling unit 504 or 403 transmits the assembled upstream or downstream transmission frame to the RF modem 503 or the downstream transmission line interface 406 in step 1513 of FIG. 15 or step 1412 of FIG. 14.

Seventh Preferred Embodiment According to the Present Invention

The basic configuration of the seventh preferred embodiment is similar to that of the fourth preferred embodiment.

The difference between the seventh and fourth preferred embodiments is that the maintenance console 314 attaches in advance either of the channel attributes such as a data/sound shared attribute or a data dedicated attribute to respective communication channels in downstream and upstream transmission frames via the channel attribute controlling unit 424 in the TDMA 310 in the CATV center 301. When the fixed allocation is made by the maintenance console 314, only the communication channels having the data dedicated attribute are fixedly allocated.

With this feature, the fixed allocation can be made without forcibly releasing the B channel being used or blocking all the B channels once a channel attribute is attached to the respective communication channels, according to the seventh preferred embodiment.

Figure 23:
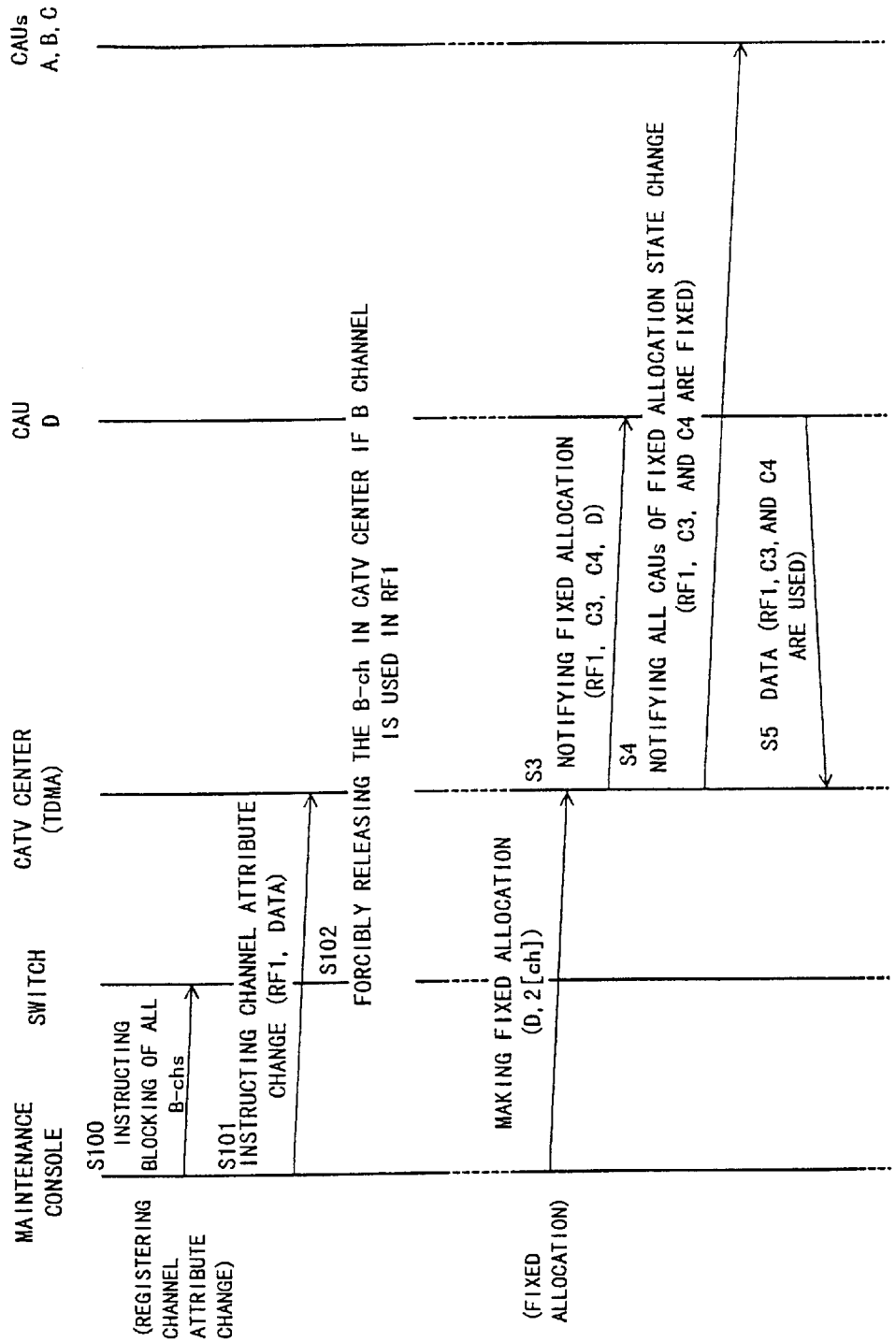
FIG. 23 shows the sequence of the seventh preferred embodiment.

FIG. 23 shows the sequence of the seventh preferred embodiment corresponding to that of the fourth preferred embodiment, which is shown in FIG. 19. The difference between FIGS. 23 and 19 is that the process for attaching a channel attribute, which is represented as steps S100 through S102, is performed in advance before the command for making fixed allocation is entered from the maintenance console 314 (S1 of FIG. 23) in the CATV center 301, and that the process for forcibly releasing the B channel being used (S2 of FIG. 19) is eliminated. The respective operations performed in steps S1 and S3 through S5 of FIG. 23 are the same as those performed in steps S1 and S3 through S5 of FIG. 19.

The operations performed in steps 2011 through 2013 of FIG. 20 correspond to the control process according to the fifth preferred embodiment, and are the operations performed instead of those in steps 2001 through 2002 in the fourth preferred embodiment.

First of all, the maintenance console 314 determines whether or not the channel attribute has been attached by referencing the channel attribute controlling unit 424 in the TDMA 310 (step 2014).

If the maintenance console 314 determines that the channel attribute has been set, it enters the command for permitting the use of a fixed C channel (S1 of FIG. 23 and step 2021 of FIG. 20). In response to this command, the fixed allocation controlling unit 425 in the TDMA 310 performs the process for changing the fixed allocation of the CAU 305 for the communication channel having the data dedicated attribute as a target by referencing the channel attribute controlling unit 424 (step 2003 of FIG. 20).

The operations in and after step 2003 of FIG. 20 according to the seventh preferred embodiment are similar to those according to the fourth preferred embodiment.

If the channel attribute is not determined to have been attached, either the process for forcibly releasing the B channel being used or the process for blocking all B channels is selected according to an instruction issued from the maintenance console 314, when the channel attribute is attached (step 2015).

When the process for blocking all B channels is selected according to the instruction issued from the maintenance console 314, the instruction for blocking all the B channels is issued from the maintenance console 314 to the switch 309 (shown in FIG. 3) (step 2016 and step S100 of FIG. 23).

Next, the maintenance console 314 waits for the completion of blocking all the B channels in the switch 309 (step 2017).

When the blocking of all the B channels is completed in the switch 309, the instruction for specifying the attribute of the communication channel for which the fixed allocation is made as a data dedicated attribute is issued from the maintenance console 314 to the channel attribute controlling unit 424 (step 2018 and S101 of FIG. 23).

Then, control is transferred to the above described operation in step 2021.

In the meantime, if the execution of the process for forcibly releasing the B channel being used is selected according to the instruction issued from the maintenance console 314, the instruction for specifying the attribute of the communication channel for which the fixed allocation is made as the data dedicated attribute is issued from the maintenance console 314 to the channel attribute controlling unit 424 (step 2019 and S101 of FIG. 23).

If the B channel whose attribute is specified as the data dedicated attribute is being used, the channel attribute controlling unit 424 instructs the channel managing unit 408 to forcibly release that B channel (S102 of FIG. 23 and step 2020 of FIG. 20).

Control is then transferred to the above described operation in step 2021.

Eighth Preferred Embodiment According to the Present Invention

The basic configuration of the eighth preferred embodiment is similar to that of the fourth preferred embodiment.

The difference between the eighth and fourth preferred embodiments is that the operation for making confirmation using an ACK, which is performed by the error detection code controlling unit 512 or 419 in step 1515/1516 of FIG. 15 or step 1414/1415 of FIG. 14, is not performed, when the frame assembling unit 504 or 403 performs a data communication by using a dedicated C channel which is fixedly allocated (in step 2104 or 2106 of FIG. 21).

In the data communication using a dedicated C channel which is fixedly allocated, the dedicated C channel is exclusively used by only one CAU 305. Therefore, the data transmitted from that CAU 305 never collides with the data transmitted from another CAU 305. As a result, even if data is sequentially transmitted without making confirmation using an ACK, the reliability of the communication can be secured. Note that if a data transmission error occurs, retransmission control is made according to an upper layer protocol (such as a TCP protocol).

Ninth Preferred Embodiment According to the Present Invention

The basic configuration of the ninth preferred embodiment is similar to that of the first preferred embodiment.

Figure 24A:
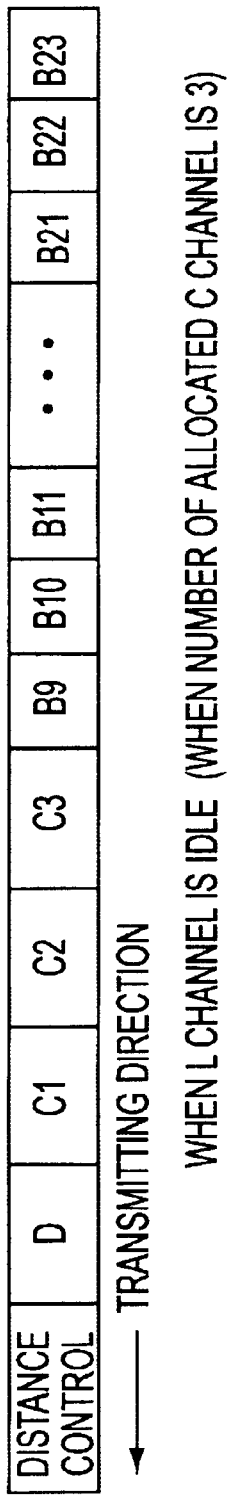
FIGS. 24A and 24B show the structures of an upstream transmission frame according to the ninth preferred embodiment.
Figure 24B:
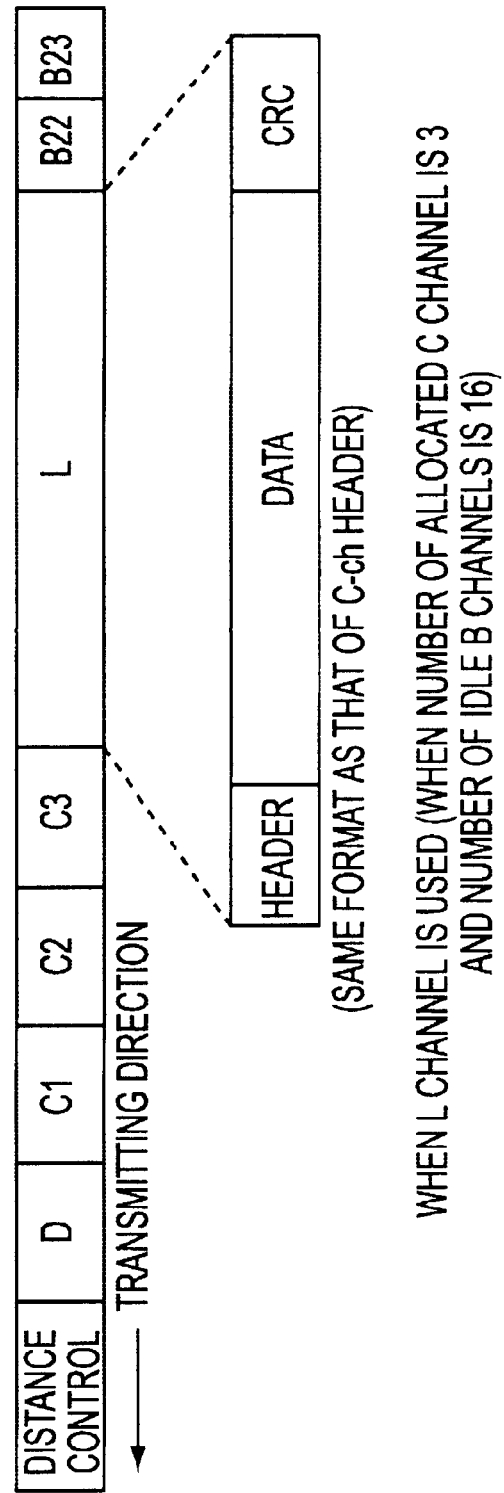

In the ninth preferred embodiment, when an upstream transmission frame is transmitted from the CAU 305 to the TDMA 310 in the CATV center 301, the format of the upstream transmission frame can be switched between the normal format shown in FIG. 24A or the above described FIGS. 7 and 8 and the format including an L channel, which is shown in FIG. 24B. The L channel is the channel dedicated to data which is dynamically generated in an area of an idle B channel. The use of the L channel allows long packet data to be efficiently transmitted from the CAU 305 to the TDMA 310.

FIGS. 25A and 25B, and 26A and 26B show the sequences of the ninth preferred embodiment.

In the TDMA 310, when the frame disassembling unit 404 receives the first data of a packet from the CAU 305 by using a C-ch (S1 of FIGS. 25B and 26B), the received packet length determining unit 418 references the packet size SIZE in the header of the C-ch (refer to FIG. 10A).

Figure 25A:
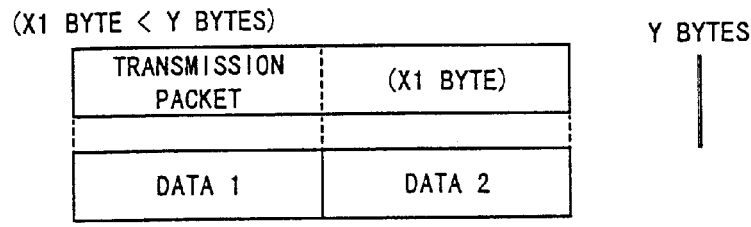
FIGS. 25A and 25B show the sequence of the ninth embodiment (when a short packet is transmitted)
Figure 25B:
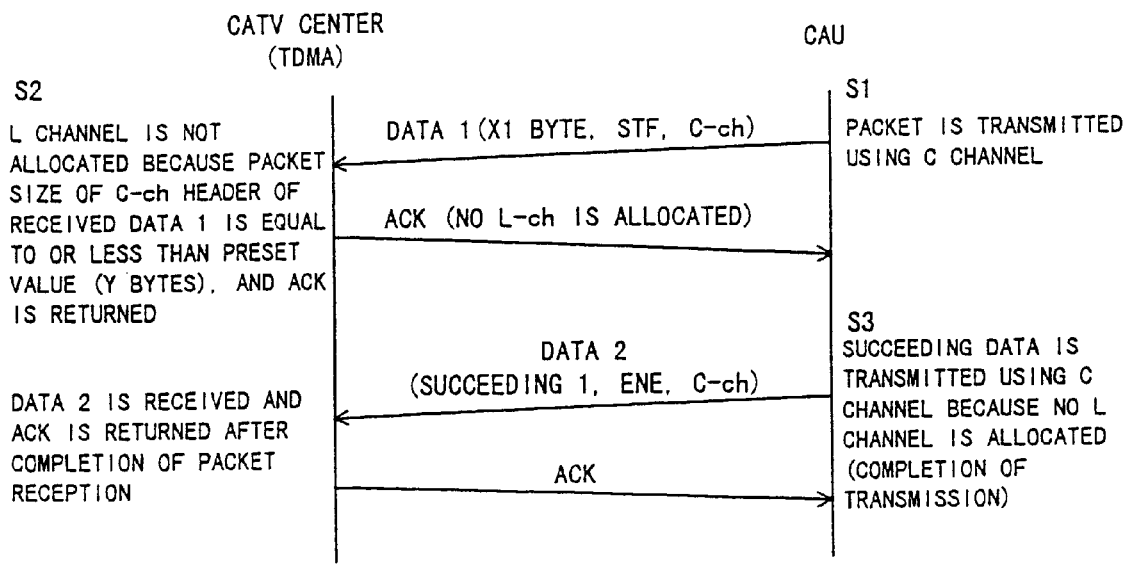

If the packet size SIZE is equal to or less than predetermined Y bytes, the received packet length determining unit 418 instructs the ACK returning unit 420 to return the C-ack whose L-ch use permission bit (refer to FIG. 10B) is set to 0 (S2 of FIG. 25B).

If the L-ch use permission bit of the C-ack returned from the TDMA 310 is set to 0, the frame assembling unit 504 in the CAU 305 transmits the succeeding data not by using the L channel but by using the C-ch (S3 of FIG. 25B).

If the packet size SIZE is equal to or more than the predetermined Y bytes, the received packet length determining unit 418 instructs the ACK returning unit 420 to return the C-ack whose L-ch use permission bit (refer to FIG. 10B) is set to 1 (S2 of FIG. 26B).

If the L-ch use permission bit of the C-ack returned from the TDMA 310 is set to 1, the frame assembling unit 504 in the CAU 305 allocates an L channel to all idle B channels based on the B-ch idle/busy map that the frame assembling unit 504 itself stores (refer to FIG. 24B), and returns the succeeding packet data by using the L channel (S3 of FIG. 26B). The allocation state of the L channel is managed by the channel managing unit 507. If the whole of packet data cannot be transmitted in one upstream transmission frame, that data is transmitted by using the L channel of the next upstream transmission frame.

Because the frame disassembling unit 404 in the TDMA 310 stores the same B-ch idle/busy map as that of the CAU 305 (refer to the explanation about the first preferred embodiment), the frame disassembling unit 404 recognizes that the L channels is allocated to all the idle B channels based on the B-ch idle/busy map that the frame disassembling unit 404 itself stores while the received packet length determining unit 418 makes the ACK returning unit 420 set the L-ch use permission bit to 1, and receives the packet data from the L channel. The allocation state of the L channel is managed by the L-ch managing unit 416 in the channel managing unit 408. Upon completion of properly receiving the packet data at the current frame timing, the error detection code controlling unit 419 instructs the ACK returning unit 420 to return a C-ack. As a result, the ACK for the above described packet data is returned.

The frame disassembling unit 404 recognizes the reception of the last packet data by determining the last frame indication bit in the header of the L channel (steps S4 to S5 of FIG. 26B). The data format of the L channel is the same as that of the C-ch, and the last frame indication bit is the same as an ENF bit of FIG. 10A. When the frame disassembling unit 404 recognizes that the last packet data is received, it instructs the ACK returning unit 420 to return the C-ack whose L-ch use permission bit (refer to FIG. 10B) is set to 0 (S5 of FIG. 26B).

The frame assembling unit 504 in the CAU 305 releases the L channel by recognizing that the value of the L-ch use permission bit of the C-ack returned from the TDMA 310 changes from 1 to 0 (S6 of FIG. 26B).

Tenth Preferred Embodiment According to the Present Invention

The basic configuration of the tenth preferred embodiment is the same as that of the ninth preferred embodiment.

The differences between the tenth and ninth preferred embodiments are that an ACK is not returned from the TDMA 310 to the CAU 305 after the communication from the CAU 305 to the TDMA 310 using the L channel is started, and that both the CAU 305 and the TDMA 310 release the L channel upon completion of processing the last packet data.

Since the L channel is exclusively used by only one CAU 305 in the data communication using the L channel, the packet data transmitted from the CAU 305 never collides with the packet data transmitted from another CAU 305. Accordingly, the reliability of the communication can be secured even if packet data is sequentially transmitted by using the L channel without making confirmation using an ACK. Note that if a data transmission error occurs, retransmission control is made according to an upper layer protocol (such as a TCP protocol).

Figure 27:
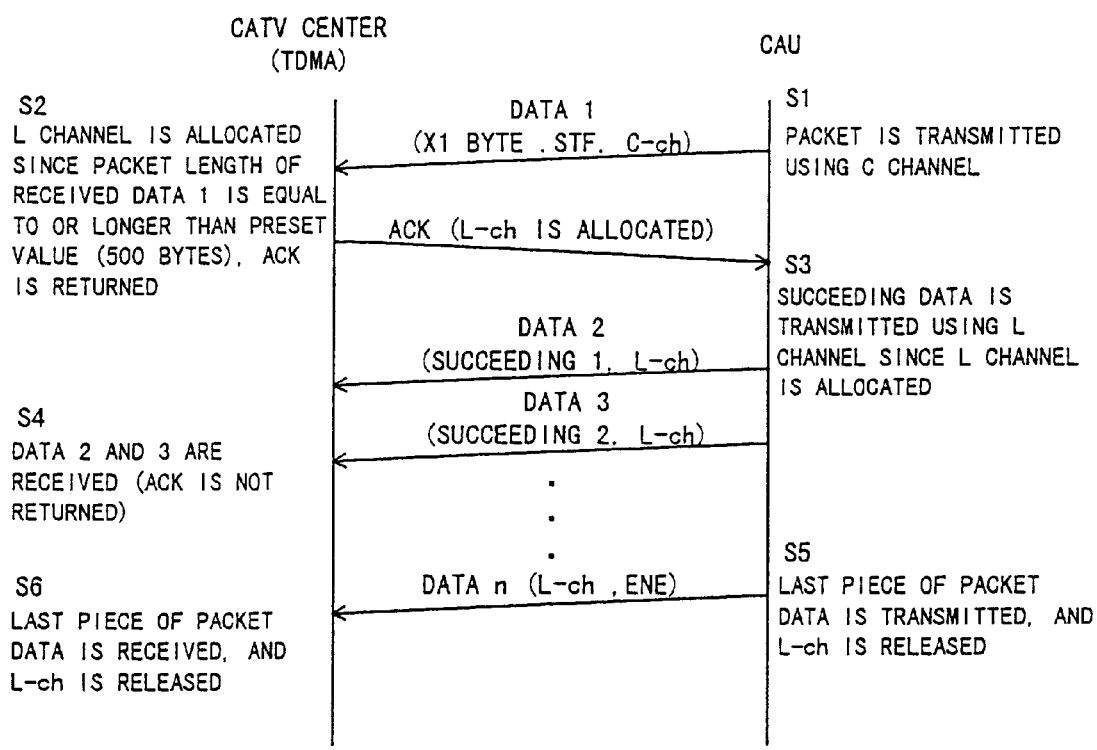
FIG. 27 shows the sequence of the tenth preferred embodiment.

FIG. 27 shows the sequence of the tenth preferred embodiment. Steps S1 through S3 of FIG. 27 are the same as those of FIG. 26B according to the ninth preferred embodiment.

An ACK is not returned from the TDMA 310 to the CAU 305 in the transmission of the packet data using the L channel, which is performed by the CAU 305 in steps S3 to S5 and the reception of the packet data using the L channel, which is performed by the TDMA 310 in steps S4 to S6.

The CAU 305 releases the L channel upon completion of transmitting the last packet data in step S5. Also the TDMA 310 releases the L channel upon completion of receiving the last packet data in step S6.

Eleventh Preferred Embodiment According to the Present Invention

The basic configuration of the eleventh preferred embodiment is similar to that of the first preferred embodiment.

In the eleventh preferred embodiment, the priority process capability performed by the TDMA 310 is added to the configuration of the first preferred embodiment shown in FIGS. 3 through 5.

The priority process capability is the capability for controlling the priority of data transmission from the TDMA 310 to the CAU 305 according to a predetermined standard.

This priority process capability is described below by referring to the schematic of the concept shown in FIG. 28 and the operational flowchart shown in FIG. 29.

First of all, the priority according to a predetermined decision standard is assigned from the maintenance console 314 in the CATV center 301 (shown in FIG. 3) to the priority controlling unit 423 in the TDMA 310 at arbitrary timing (step 2901).

One specific example of the decision standard of the priority in this case is: the priority is classified as a service class, and an IP (Internet Protocol) address assigned to each CAU 305 is registered to a desired service class.

Another specific example of the decision standard of the priority is: the priority is decided according to an upper layer protocol (such as a Telnet protocol, FTP, HTTP, etc.) of transmission packet data.

A further specific example of the decision standard of the priority is: the priority is decided according to an intermediate layer protocol (such as an IP, IPX, etc.) of the transmission packet data.

Next, a downstream communication packet is received from a LAN port which is not shown in the drawings or a reception data buffer (shown in FIG. 28) to the data interface 410 (shown in FIG. 4) in the TDMA 310 (step 2902).

In the TDMA 310, the downstream communication packet received by the data interface 410 is transmitted to the transmission buffer 411 via the switch controlling unit 426 (step 2903).

Next, in the TDMA 310, the priority controlling unit 423 determines whether or not a plurality of pieces of packet data waiting to be transmitted exist in the transmission buffer 411 (step 2904).

Figure 28:
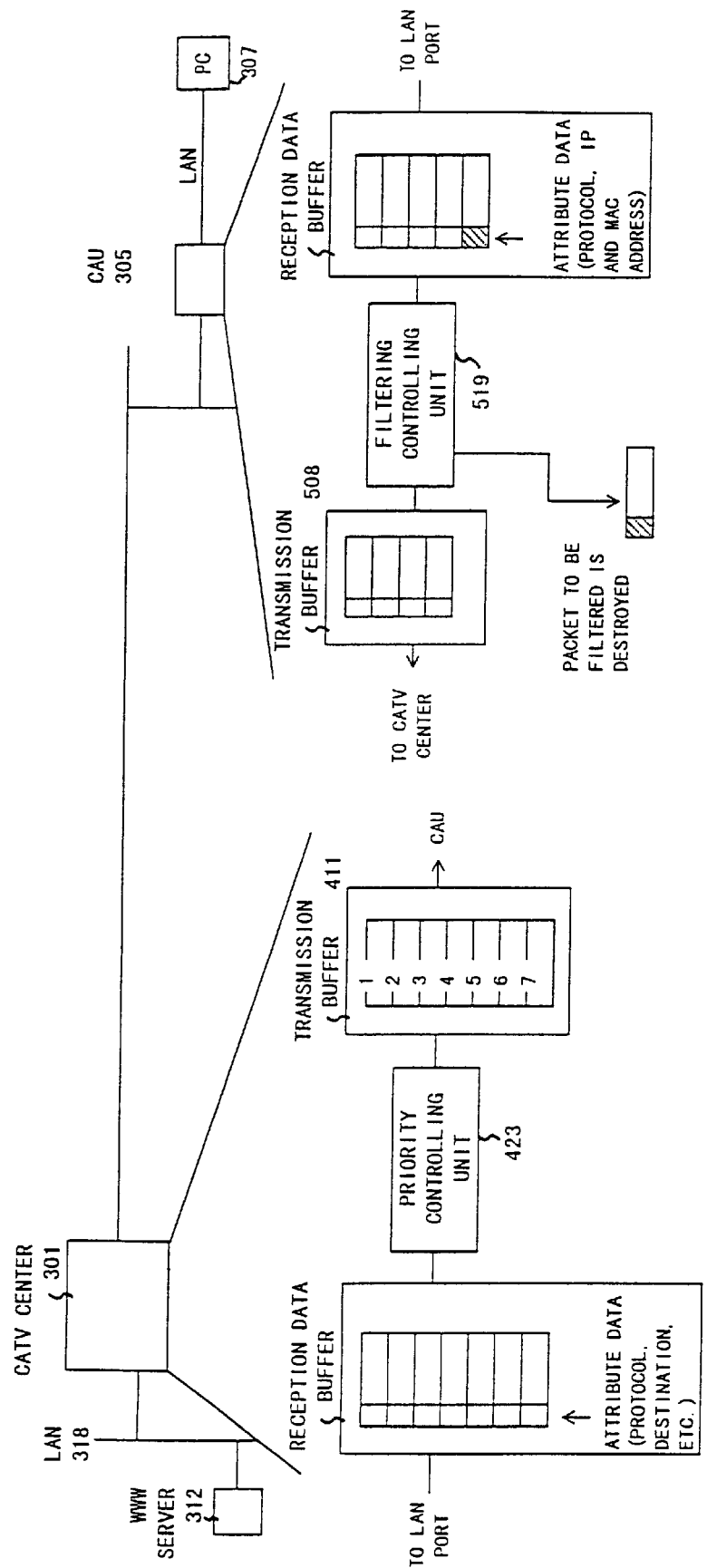
FIG. 28 shows the concept of eleventh and twelfth preferred embodiments.
Figure 29:
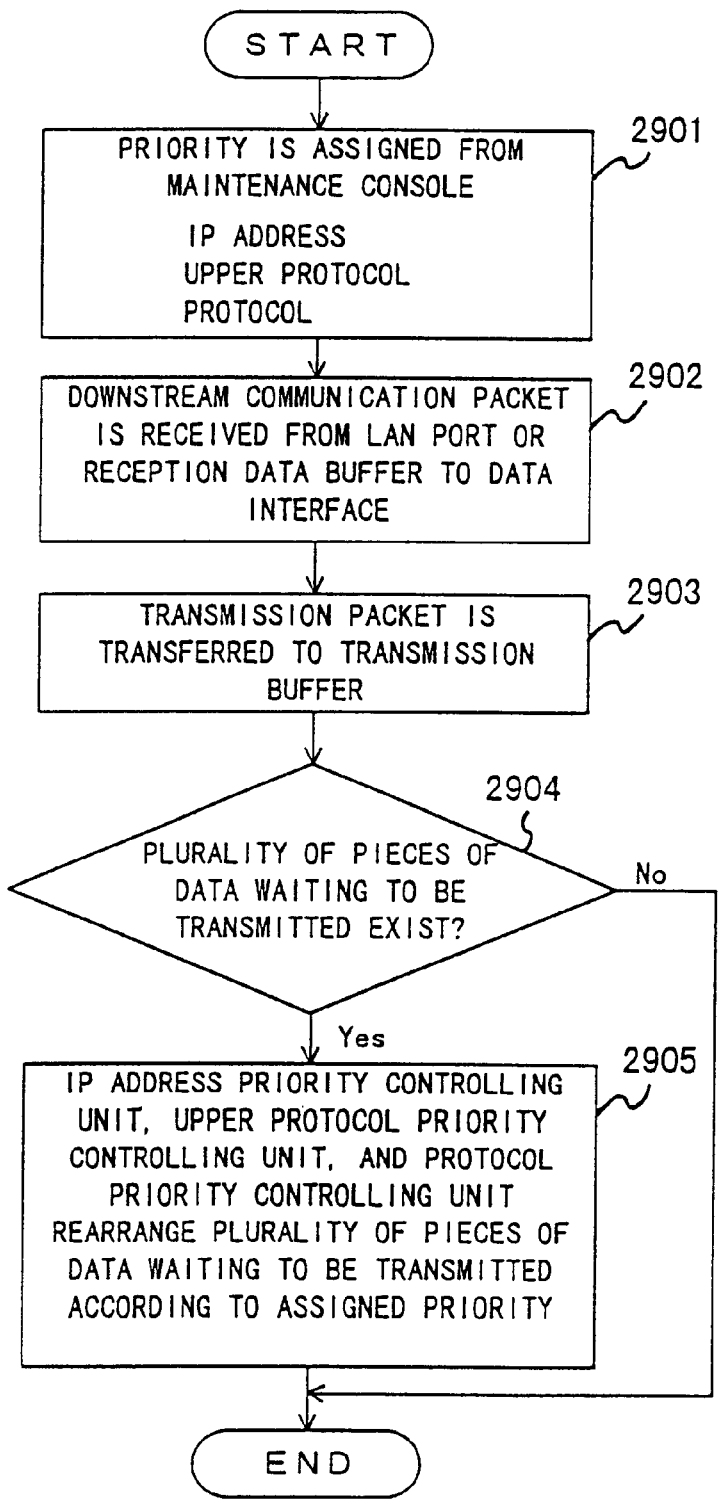
FIG. 29 is an operational flowchart showing a priority processes according to the eleventh preferred embodiment (CATV center)

If the priority controlling unit 423 determines that the plurality of pieces of packet data waiting to be transmitted exist in the transmission buffer 411, it rearranges the output order of the plurality of pieces of packet data waiting to be transmitted in the transmission buffer 411 according to the assigned priority (refer to step 2905 and FIG. 28).

Here, if the priority is decided according to an IP address and a service class as described above, the IP address control mechanism in the priority controlling unit 423 identifies the IP address of the CAU 305 at the destination attached to the header of the plurality of pieces of IP packet data waiting to be transmitted in the transmission buffer 411, so that the output order of the plurality of pieces of IP packet data is rearranged according to the priority of the service class to which the IP address is registered.

With this control, a packet to an IP address whose priority is high is preferentially transmitted. Consequently, the transmission rate of the destination CAU 305 whose priority is high can be controlled so that it is higher than the transmission rate of another CAU 305 even in a congested state. A service class can be therefore set based on speed guarantee for the downward transmission rate for each subscriber, and a quality of service (QOS) can be implemented.

If the priority is decided according an upper layer protocol as described above, the upper layer protocol control mechanism in the priority controlling unit 423 rearranges the output order of respective pieces of packet data based on the upper layer protocol information attached to the header of the upper layer protocol of the plurality of pieces of packet data waiting to be transmitted in the transmission buffer 411.

With this control, a packet of an upper layer protocol whose priority is high is preferentially transmitted. Consequently, the transmission rate of the upper layer protocol communication with higher priority even in a congested state can be controlled so that is it higher than the transmission rate of another upper layer protocol communication. The priority is therefore assigned so that, for example, an HTTP packet is preferentially transmitted. As a result, a service such as to make a faster Web access, etc. can be implemented.

If the priority is assigned according to the intermediate layer protocol (such as the IP, IPX, etc.) as described above, the intermediate layer protocol control mechanism in the priority controlling unit 423 rearranges the output order of respective pieces of packet data based on the intermediate layer protocol information attached to the header of the intermediate layer protocol of the plurality of pieces of packet data waiting to be transmitted in the transmission buffer 411.

With this control, a packet of an intermediate layer protocol, whose priority is high, is preferentially transmitted. Consequently, the transmission rate of the intermediate layer protocol communication, whose priority is high even in a congested state, can be controlled so that it is higher than the transmission rate of another intermediate layer protocol communication. The priority is assigned in the way, for example, that an IPX packet used by many company users is preferentially transmitted, thereby implementing a service such as to provide a high-speed data transmission to company users, etc.

In the meantime, if the priority controlling unit 423 determines that the plurality of pieces of packet data waiting to be transmitted do not exist in the transmission buffer 411, it performs the assigning operation in step 2901 at predetermined timing depending on need, and repeatedly performs the operations in steps 2902 through 2905.

The transmission process from the transmission buffer 411 is performed according to the above described operational flowchart of FIG. 14 referred to in the explanation about the first preferred embodiment.

Twelfth Preferred Embodiment According to the Present Invention

The basic configuration of the twelfth preferred embodiment is the same as that of the first preferred embodiment. In the twelfth preferred embodiment, a filtering capability performed by the CAU 305 is added to the configuration of the first preferred embodiment shown in FIGS. 3 through 5.

The filtering capability is the capability for restricting the data transmission from the CAU 305 to the TDMA 310 according to a predetermined standard.

This filtering capability is described below by referring to the schematic of the concept shown in FIG. 28 and the operational flowcharts shown in FIGS. 30 through 32.

Figure 30:
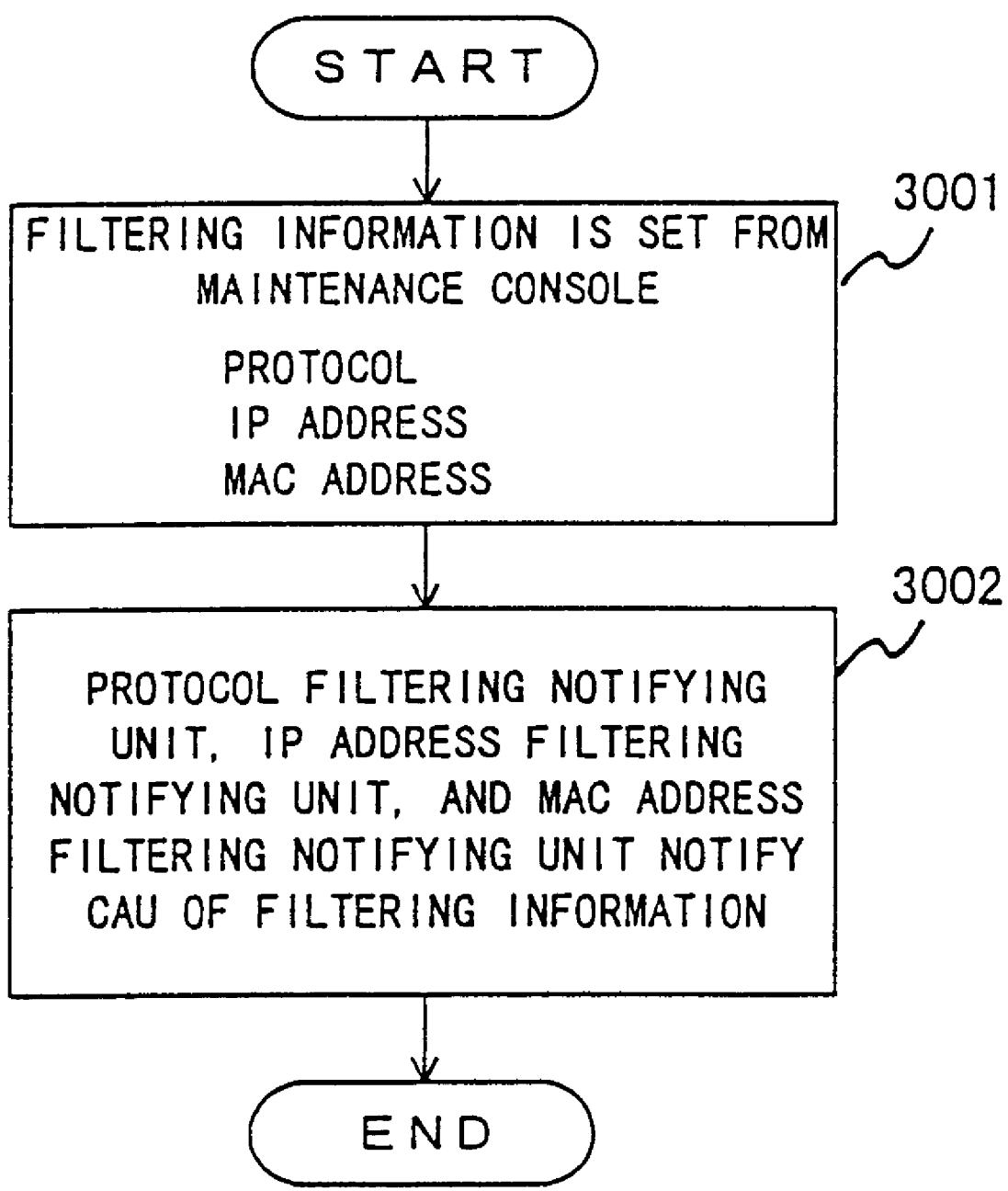
FIG. 30 is an operational flowchart showing a filtering process according to the twelfth preferred embodiment (CATV center)

FIG. 30 is an operational flowchart showing the control process performed by the filtering notifying unit 422 in the TDMA 310 in the CATV center 301.

The maintenance console 314 (shown in FIG. 3) in the CATV center 301 sets the filtering information conforming to a predetermined decision standard in the filtering notifying unit 422 in the TDMA 310 at arbitrary timing (step 3001).

One specific example of the filtering information in this case is: the information about the intermediate layer protocol (such as the IP, IPX, etc.) of packet data is set as the filtering information.

Another specific example of the filtering information is: the information of the IP (Internet Protocol) address assigned to each terminal or a server, which are not shown in this figure, in each CAU 305 or on the Internet is set as the filtering information.

A further specific example of the filtering information is: the information of the MAC address assigned to each terminal or a server in the LAN interface 318 in the CATV center 301, etc. is set as the filtering information.

The filtering notifying unit 422 in the TDMA 310 notifies the CAU 305 specified from the maintenance console 314 of the filtering information set in step 3001 by using a C-ch etc. in a downstream transmission frame.

FIG. 31 is an operational flowchart showing one principal part of the control process implemented by the CAU 305. They are a group of operations inserted between steps 1514 and 1515 of the operational flowchart according to the first preferred embodiment, which is shown in FIG. 15.

The filtering controlling unit 519 determines whether or not the filtering information is included in the downstream transmission frame received by the frame disassembling unit 505 (step 3101).

If the filtering controlling unit 519 determines that the filtering information is included in the downstream transmission frame received by the frame disassembling unit 505, it sets that filtering information inside the filtering controlling unit 519 (step 3102).

If the result of the determination made in step 3101 is NO or after the operation in step 3102 is performed, the operations in and after step 1515 of FIG. 15 are performed.

Figure 32:
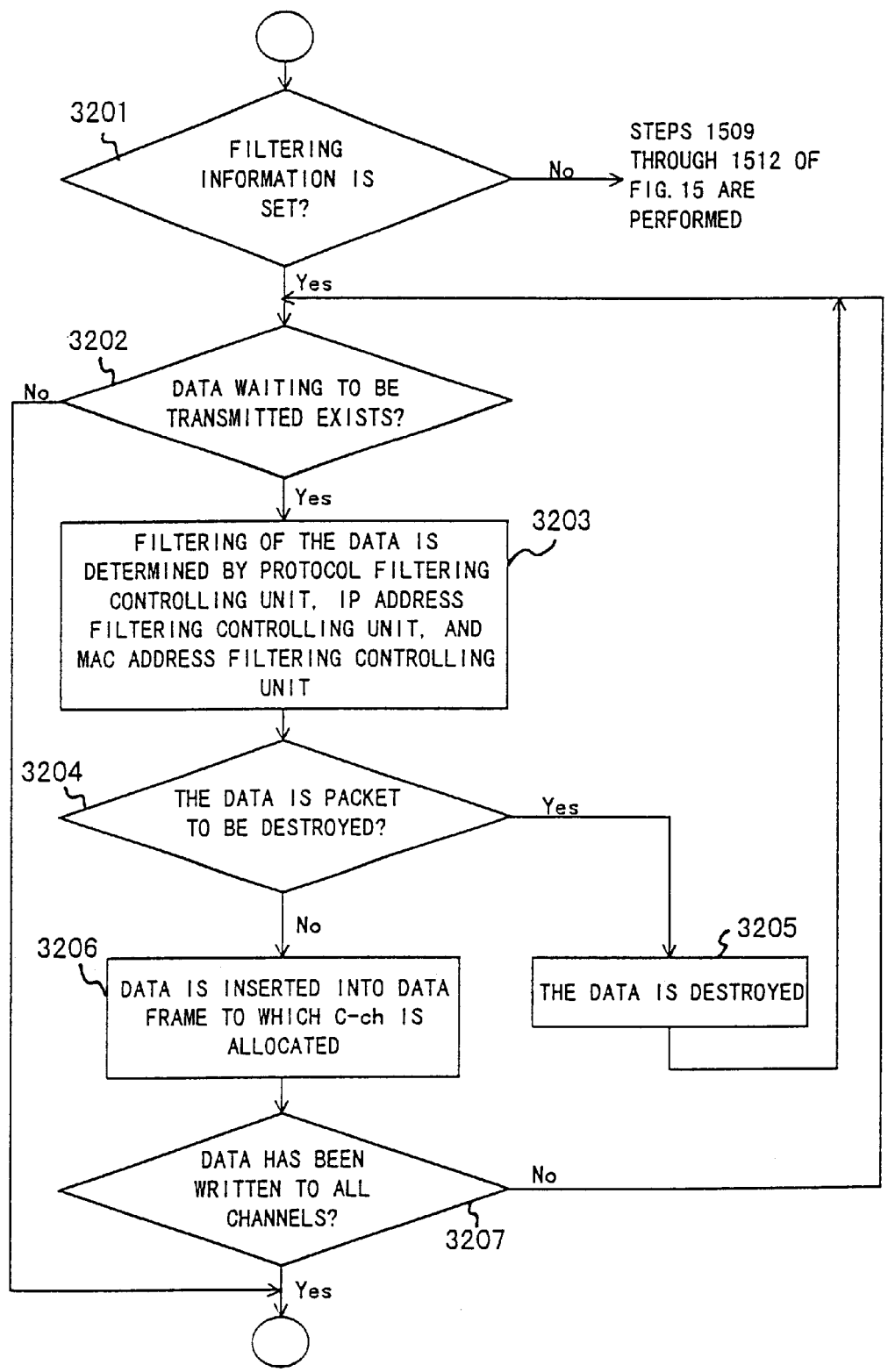
FIG. 32 is an operational flowchart showing the filtering process according to the twelfth preferred embodiment (CAU device/No.2)

FIG. 32 is an operational flowchart showing another principal part of the control process implemented by the CAU 305 according to the twelfth preferred embodiment. This principal part replaces the operations in steps 1509 through 1512 of the operational flowchart according to the first preferred embodiment, which are shown in FIG. 15.

The frame assembling unit 504 determines whether or not the filtering information is set in the filtering controlling unit 519 (step 3201).

If the frame assembling unit 504 determines that the filtering information is not set in the filtering controlling unit 519, it performs the operations in steps 1509 through 1512 of the operational flowchart according to the first preferred embodiment, which is shown in FIG. 15, instead of performing the operations in steps 3202 through 3207 of FIG. 32.

If the frame assembling unit 504 determines that the filtering information is set in the filtering controlling unit 519, it further determines whether or not the data waiting to be transmitted exists in the transmission buffer 508 (step 3202). Here, the communication packet data is received by the LAN interface 511 via the LAN port which is not shown in this figure or the reception data buffer (shown in FIG. 28). The packet data is then transmitted to the transmission buffer 508.

If the frame assembling unit 504 determines that the data waiting to be transmitted exists, it determines whether the data waiting to be transmitted in the transmission buffer 508 is either to be transmitted or to be destroyed based on the filtering information set in the filtering controlling unit 519 (refer to step 3202 and FIG. 28). Note that the filtering information includes the information for specifying data transmission, and the information for specifying data destruction.

Here, if the filtering information is the intermediate layer protocol (such as the IP, IPX, etc.) information as described above, the intermediate layer protocol control mechanism in the filtering controlling unit 519 decides whether the packet data waiting to be transmitted in the transmission buffer 508 is either to be transmitted or to be destroyed based on the intermediate layer protocol information attached to the header of the intermediate layer protocol of the packet data.

With this control, an upstream packet is filtered by the CAU 305 according to the intermediate layer protocol, thereby reducing the traffic of an unnecessary type of an upstream packet.

If the filtering information is the IP address information as described above, according to the destination IP address or the transmitting source IP address attached to the header of the IP packet data waiting to be transmitted in the transmission buffer 508, the IP address control mechanism in the filtering controlling unit 519 decides whether the packet data is either to be transmitted or to be destroyed.

With this control, an upstream packet is filtered, for example, by the CAU 305 based on the transmitting source IP address, thereby reducing the traffic of an unnecessary upstream packet at the transmitting source. Additionally, the use of an IP address other than the IP address that a common carrier assigns to a subscriber can be restricted, etc. Furthermore, the packet blocked by the CAU 305 can be restricted from being transmitted to the CATV center 301 when a print server, etc. is connected to the CAU 305.

If the filtering information is the information of a MAC address as described above, according to the MAC address attached to the header of the lower layer packet data waiting to be transmitted in the transmission buffer 508, the MAC address control mechanism in the filtering controlling unit 519 decides whether lower layer packet data is either to be transmitted or to be destroyed.

With this control, the filtering process in a lower layer is performed, thereby speeding up the filtering process.

The frame assembling unit 504 then determines whether or not the packet data waiting to be transmitted is the packet data to be destroyed as a result of the determination made in step 3203 (step 3204).

If the frame assembling unit 504 determines that the packet data waiting to be transmitted is the packet data to be destroyed, it reads the packet data from the transmission buffer 508 and destroys it. Control is then returned to the operation in step 3202 (steps 3204 to 3205 to 3202).

If the frame assembling unit 504 determines that the packet data waiting to be transmitted is not the packet data to be destroyed but the packet data to be transmitted, it inserts the packet data which is determined to be transmitted in the transmission buffer 508 onto a C channel (C-ch) while controlling the allocation of the C-ch based on the setting state of the B-ch idle/busy map that the frame assembling unit 504 itself stores (steps 3204 to 3206).

The frame assembling unit 504 repeatedly performs the above described C-ch insertion operation until it determines that the data is written to all channels that can be allocated in a current frame, or until it determines that there is no data waiting to be transmitted in the transmission buffer 508 (steps 3202 through 3207). Then, the frame assembling unit 504 transmits a generated upstream transmission frame to the RF modem 503 (step 3202 to step 1513 of FIG. 15, or step 3207 to step 1513 of FIG. 15).

Thirteenth Preferred Embodiment According to the Present Invention

The basic configuration of the thirteenth preferred embodiment is similar to that of the first preferred embodiment.

According to the thirteenth preferred embodiment, in the CAU 305, each piece of packet data in the transmission buffer 508 is assigned with the transmission sequence number SN (refer to FIG. 10A) by the packet consecutive transmission number assigning unit 516, and is transmitted to the TDMA 310 in the CATV center 301.

Figure 33:
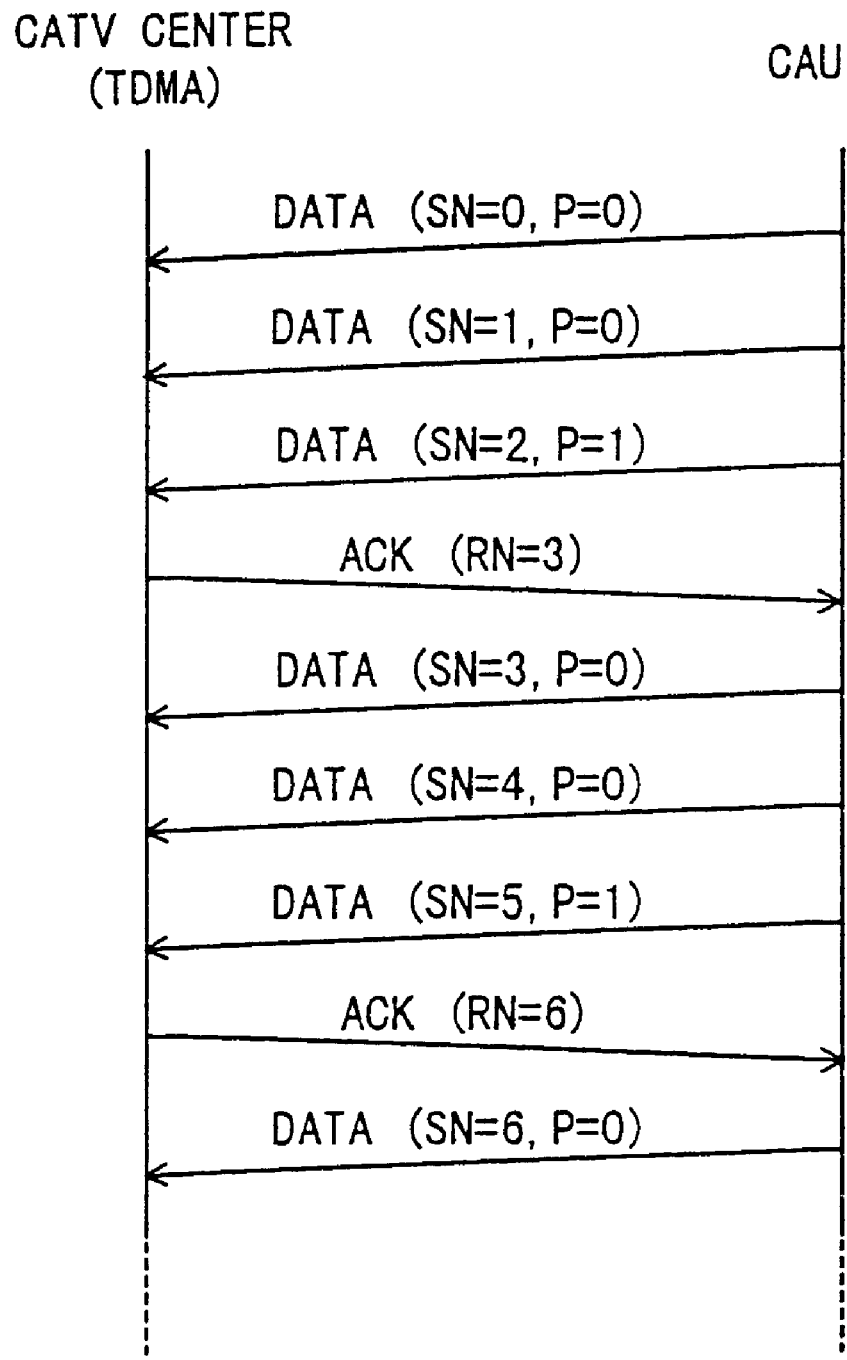
FIG. 33 shows the sequence of the thirteenth preferred embodiment (k=3)

In this case, as shown in the sequence diagram of FIG. 33, the frame assembling unit 504 consecutively transmits k pieces (3 pieces in the example of FIG. 33) of packet data without waiting for the reception of an ACK from the TDMA 310, sets the ACK signal request flag P (refer to FIG. 10A) for the kth packet data to be transmitted according to an instruction from the ACK request transmitting unit 517, and transmits the kth data.

After the frame disassembling unit 404 in the TDMA 310 receives the packet data in which the ACK signal request flag P is set, it notifies the CAU 305 of the next reception sequence number RN which is the sequence number to be received by the frame disassembling unit 404 next, as C-ack (refer to FIG. 10B).

The packet consecutive transmission number assigning unit 516 in the CAU 305 sequentially assigns the transmission sequence numbers SNs starting from the next reception sequence number RN set in the C-ack, which is notified from the TDMA 310.

As described above, the definite number k pieces of packet data can be consecutively transmitted without confirming a transmission using an ACK in the CAU 305 according to the thirteenth preferred embodiment, thereby improving transmission efficiency in an upstream direction.

Fourteenth Preferred Embodiment According to the Present Invention

The basic configuration of the fourteenth preferred embodiment is similar to that of the thirteenth preferred embodiment.

According to the fourteenth preferred embodiment, the collision detecting unit 514 in the CAU 305 makes a comparison between the next reception sequence number RN included in the C-ack received from the TDMA 310 and the transmission sequence number SN that the packet consecutive transmission number assigning unit 516 assigns next in addition to the operations according to the thirteenth preferred embodiment. If these sequence numbers do not match, the collision detecting unit 514 determines that a collision occurs on an upstream transmission line, and decreases the number of pieces of consecutive transmission data k by a preset number n after a predetermined period of protection time elapses. The collision recovery detecting unit 515 in the CAU 305 makes a comparison between the next reception sequence number RN included in the C-ack received from the TDMA 310 and the transmission sequence number SN that the packet consecutive transmission number assigning unit 516 assigns next. If these sequence numbers match, the collision recovery detecting unit 515 determines that no collision occurs on the upstream transmission line, and increases the number of pieces of consecutive transmission data k by a preset number m after a predetermined period of protection time elapses.

The above described control operation allows the transmission efficiency on an upstream transmission line to be improved when a collision occurs or when no collision occurs in a consecutive transmission which is not confirmed by using an ACK.

Figure 34:
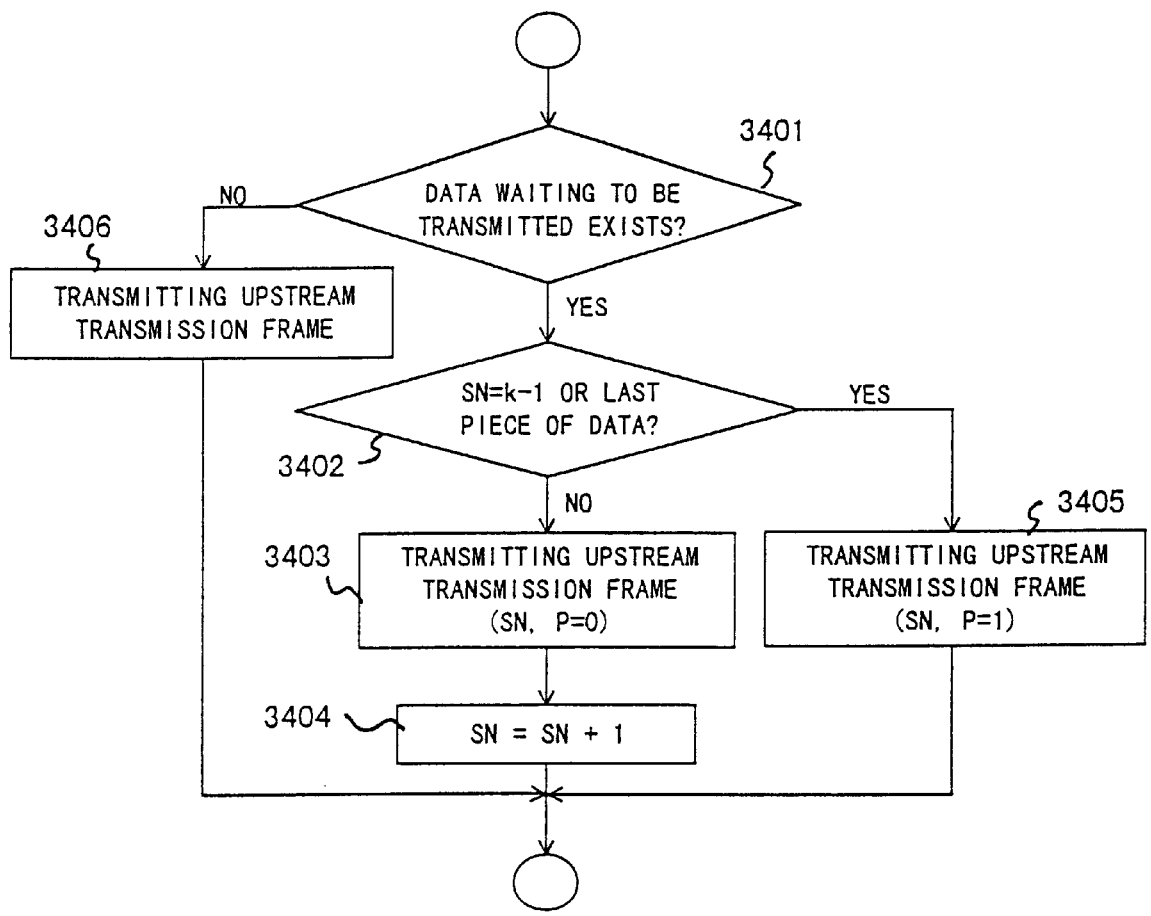
FIG. 34 is an operational flowchart of the fourteenth preferred embodiment (CAU device/No.1)

FIG. 34 is an operational flowchart showing the principal part of the control process implemented by the CAU 305 according to the fourteenth preferred embodiment. It replaces the operations in steps 1509 through 1513 of the operational flowchart according to the first preferred embodiment, which are shown in FIG. 15.

First of all, the transmission sequence number SN is initialized to 0 at the start of the operation of the CAU 305, although this is not shown in this figure.

In the CAU 305, the frame assembling unit 504 first determines whether or not the data waiting to be transmitted exists in the transmission buffer 508 (step 3401).

If the frame assembling unit 504 determines that no data waiting to be transmitted exists, it transmits an upstream transmission frame in order to transmit the data other than the packet data in step 3406, and performs the operations in and after step 1514 of FIG. 15.

If the frame assembling unit 504 determines that the data waiting to be transmitted exists, it determines whether or not the current transmission sequence number SN output from the packet consecutive transmission number assigning unit 516 is smaller than the number of pieces of consecutive transmission data k by 1, or whether or not the current data waiting to be transmitted is the last piece of data (step 3402).

If the transmission sequence number SN is not smaller than the number of pieces of consecutive transmission data k by 1 and the current data waiting to be transmitted is not the last piece of data, the frame assembling unit 504 attaches the ACK signal request flag P=0 (refer to FIG. 10A) to the header of the C-ch according to the current transmission sequence number SN and the instruction from the ACK request transmitting unit 517 while controlling the allocation of the C channel (C-ch) based on the setting state of the B-ch idle/busy map that the frame assembling unit 504 itself stores, inserts the data in the transmission buffer 508 onto the C-ch, assembles an upstream transmission frame, and transmits the assembled frame (steps 3402 to 3403).

Then, the frame assembling unit 504 instructs the packet consecutive transmission number assigning unit 516 to increment the transmission sequence number SN by 1 (step 3404). The operations in and after step 1514 of FIG. 15 are then performed. Note that the maximum value of the number of pieces of consecutive transmission data k is, for example, 8, and the transmission sequence number SN and the next reception sequence number RN range from 0 to 7 in this case.

If the transmission sequence number SN is smaller than the number of pieces of consecutive transmission data k by 1 or if the current data waiting to be transmitted is the last piece of data, the frame assembling unit 504 attaches the ACK signal request flag P=1 to the header of the C-ch according to the current transmission sequence number SN and the instruction from the ACK request transmitting unit 517 while controlling the allocation of the C channel (C-ch) based on the setting state of the B-ch idle/busy map that the frame assembling unit 504 itself stores, inserts the data in the transmission buffer 508 onto the C-ch, assembles an upstream transmission frame, and transmits the assembled frame (steps 3402 to 3405).

Then, the operations in and after step 1514 of FIG. 15 are performed.

With the above described control process shown in FIG. 34, the frame assembling unit 504 consecutively transmits k pieces of packet data which can be varied at every frame timing without waiting for the reception of an ACK from the TDMA 310, sets the ACK signal request flag P of the kth packet data to be transmitted to 1, and transmits the kth data.

Figure 35:
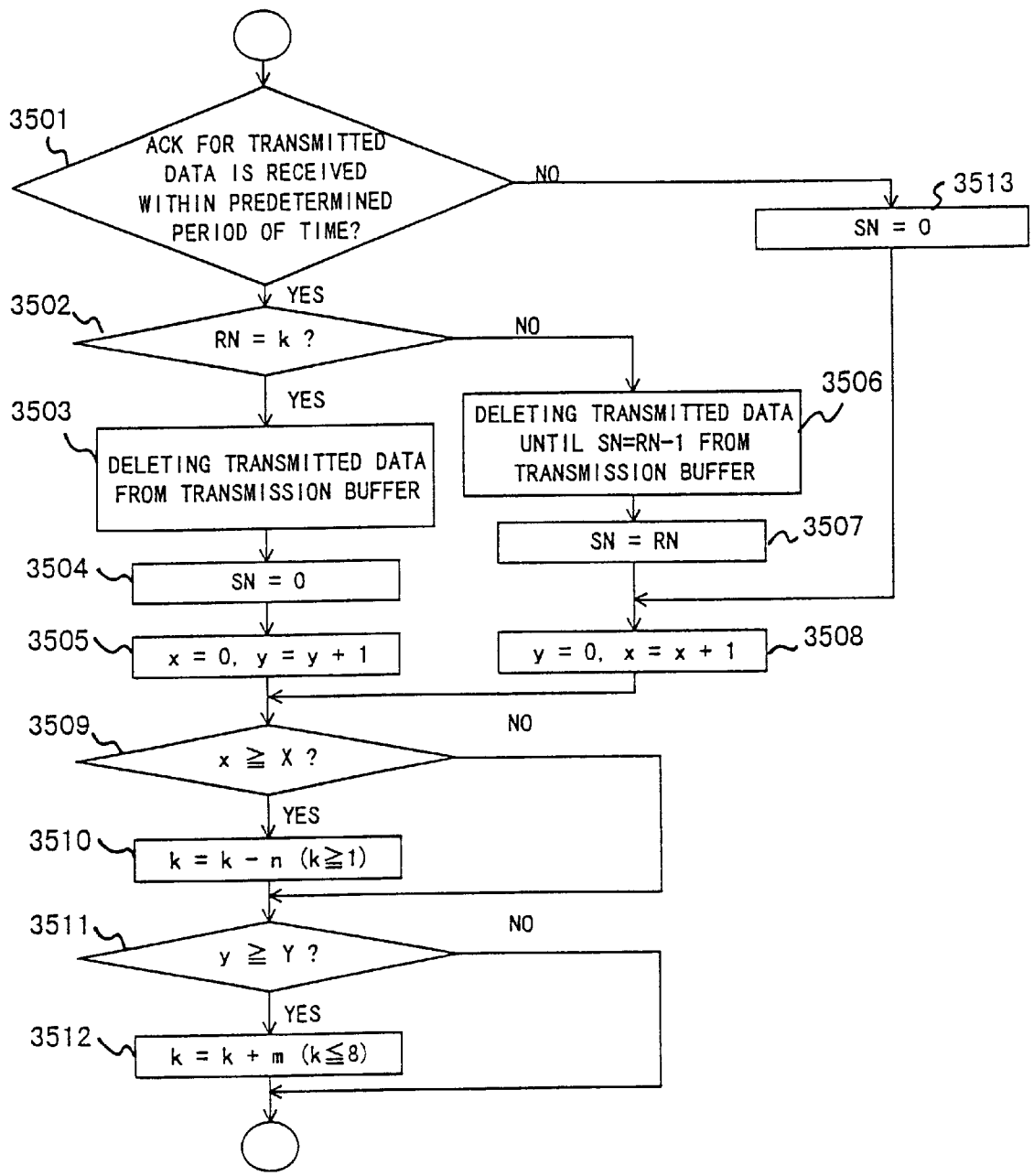
FIG. 35 is an operational flowchart of the fourteenth preferred embodiment (CAU device/No.2)

FIG. 35 is an operational flowchart showing another principal part of the control process implemented by the CAU 305 according to the fourteenth preferred embodiment. It replaces the operations in steps 1514 and 1515 according to the first preferred embodiment, which are shown in FIG. 15.

In the CAU 305, the packet consecutive transmission number assigning unit 516 first determines whether or not the frame disassembling unit 505 receives from the C-ack channel the ACK for the packet data that the frame assembling unit 504 sets the ACK signal request flag P=1 and transmits, within a predetermined period of time (step 3501).

If the packet consecutive transmission number assigning unit 516 determines that the frame disassembling unit 505 receives the above described ACK within the predetermined period of time, it determines whether or not the next reception sequence number RN (refer to FIG. 10B) attached to the ACK is equal to the number of pieces of consecutive transmission data k that the packet consecutive transmission number assigning unit 516 currently outputs (step 3502).

If the packet consecutive transmission number assigning unit 516 determines that the data transmission is properly performed and the next reception sequence number RN is equal to the number of pieces of consecutive transmission data k, it deletes the most recently transmitted k pieces of packet data that the transmission buffer 508 stores for retransmission (steps 3502 to 3503).

Then, the packet consecutive transmission number assigning unit 516 resets the transmission sequence number SN to 0 (step 3504).

Next, the packet consecutive transmission number assigning unit 516 resets the number of consecutive transmission failures x to 0 (initialized value is 0), and at the same time, it increments the number of consecutive transmission successes y by 1 (step 3505).

If the packet successive transmission number assigning unit 516 determines that the data transmission is not properly performed, and the next reception sequence number RN is not equal to the number of pieces of consecutive transmission data k, it deletes the packet data whose transmission sequence numbers SNs are 0 to RN-1 among the most recently transmitted k pieces of packet data that the transmission buffer 508 itself stores for retransmission (steps 3502 to 3506). Here, if a transmission error occurs, the next reception sequence number RN indicates the value of the transmission sequence number SN to be properly received next. Accordingly, the packet data whose transmission sequence numbers SNs are 0 to RN-1 are properly transmitted from the CAU 305 to the TDMA 310. That is, it means that the packet data whose transmission sequence number SN is RN is not properly transmitted.

Then, the packet consecutive transmission number assigning unit 516 sets the transmission sequence number SN to the value of the transmission sequence number RN to be properly received next (step 3507). Consequently, with the above described transmission process shown in FIG. 34, (k-RN) pieces of packet data to be retransmitted, which are left in the transmission buffer 508, are respectively assigned with the transmission sequence numbers SNs starting from the RN, and retransmitted.

Then, the packet consecutive transmission number assigning unit 516 increments the number of consecutive transmission failures x by 1, and at the same time, it resets the number of consecutive transmission successes y to 0 (initialized value is 0) (step 3508).

The packet consecutive transmission number assigning unit 516 determines whether or not the number of consecutive transmission failures x is equal to or larger than a threshold value X after the operation in step 3505 or 3508 (step 3509).

If the packet consecutive transmission number assigning unit 516 determines that the number of consecutive transmission failures x is equal to or larger than the threshold value X, it decreases the number of pieces of consecutive transmission data k by a preset number n (steps 3509 to 3510). Note that, however, the minimum value of the number of pieces of consecutive transmission data k is 1.

If the packet consecutive transmission number assigning unit 516 determines that the number of consecutive transmission failures x is not equal to or larger than the threshold value X in step 3509 or after it performs the operation in step 3510, it further determines whether or not the number of transmission successes y is equal to or larger than a threshold value Y (step 3511).

If the packet consecutive number assigning unit 516 determines that the number of consecutive transmission successes y is equal to or larger than the threshold value Y, it increases the number of pieces of consecutive transmission data k by a preset number m (steps 3511 to 3512). Note that, however, the maximum value of the number of pieces of consecutive transmission data k is 8.

The packet consecutive transmission number assigning unit 516 terminates the process at the current frame timing which is represented by the operational flowchart of FIG. 15, when it determines that the number of consecutive transmission successes y is not equal to or larger than the threshold value Y in step 3511, or after it performs the operation in step 3512.

If the packet consecutive transmission number assigning unit 516 determines that the frame disassembling unit 505 cannot receive the ACK for the packet data which is attached with the ACK signal request flag P=1 and transmitted within a predetermined period of time in step 3501, the packet consecutive transmission number assigning unit 516 resets the transmission sequence number SN to 0 and performs the above described operations in and after step 3508. This is because the most recently transmitted k pieces of packet data stored in the transmission buffer 508 for retransmission, whose transmission sequence numbers SNs are 0 to k−1, must be retransmitted in this case (step 3513). As a result, with the above described transmission process shown in FIG. 34, the k pieces of packet data to be retransmitted, which are left in the transmission buffer 508, are assigned with the transmission sequence numbers SNs starting from 0, and retransmitted.

Figure 36:
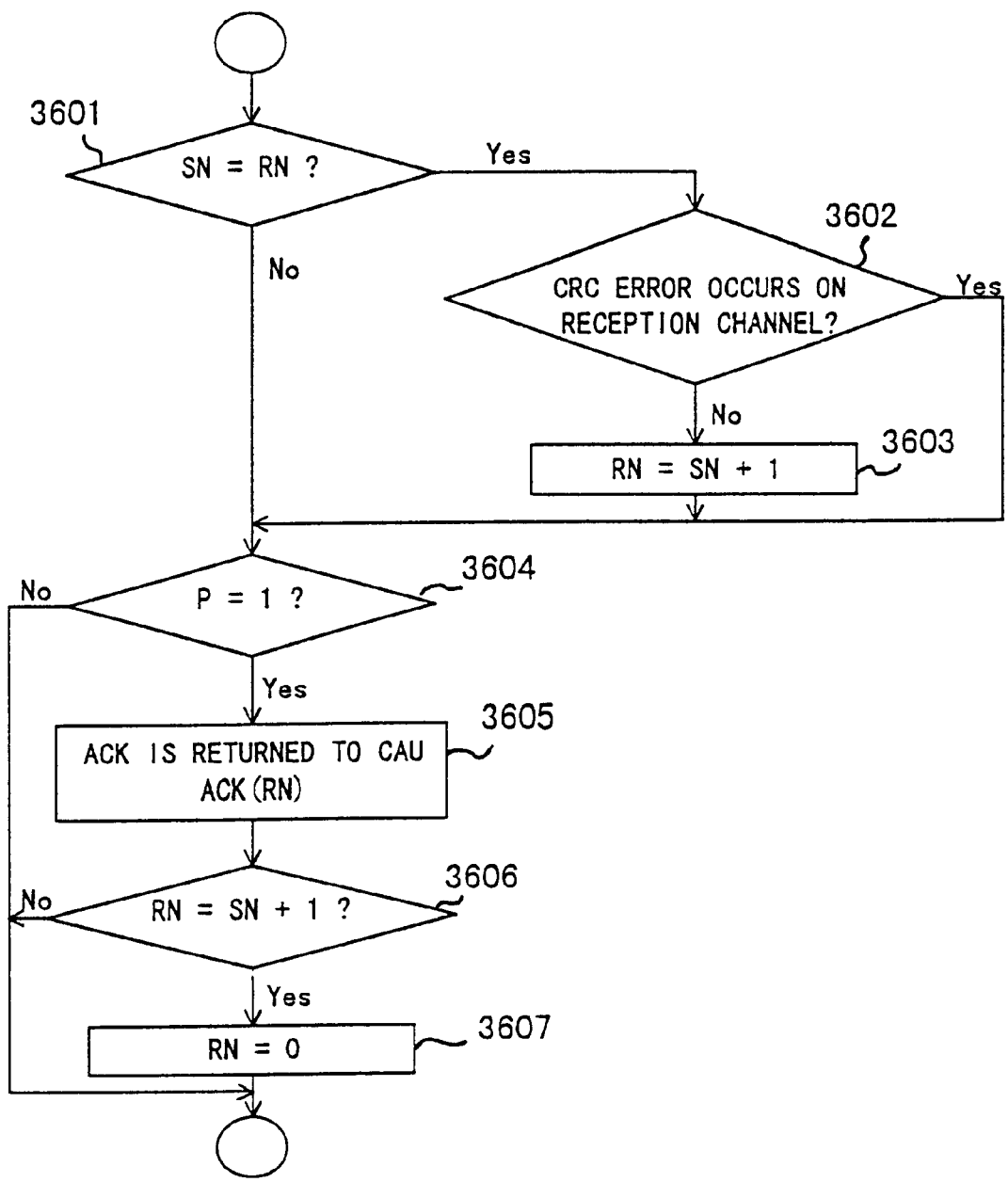
FIG. 36 is an operational flowchart of the fourteenth preferred embodiment (CATV center)

FIG. 36 is an operational flowchart showing the principal part of the control process implemented by the TDMA 310 according to the fourteenth preferred embodiment. It replaces the operations in steps 1416 through 1418 of the operational flowchart according to the first preferred embodiment, which are shown in FIG. 14.

The frame disassembling unit 404 determines whether or not the transmission sequence number SN (refer to FIG. 10A) assigned to the packet data of the C-ch, which is received in step 1413 of FIG. 14, is equal to the next reception sequence number RN that the frame disassembling unit 404 currently manages (step 3601).

If the frame disassembling unit 404 determines that the transmission sequence number SN of the received packet data is equal to the next reception sequence number RN due to the proper reception of the k pieces of consecutive packet data, the error detection code controlling unit 419 determines whether or not a transmission error occurs in the packet data by detecting the CRC (refer to FIG. 7) of the C-ch to which the above described packet data is transmitted (steps 3601 to 3602).

If the error detection code controlling unit 419 does not detect the transmission error, it sets the next reception sequence number RN that the frame disassembling unit 404 manages to the value obtained by adding 1 to the transmission sequence number SN of the received packet data (step 3603). Note that the packet data that the frame disassembling unit 404 properly receives is transmitted to the reception buffer 412.

If the error detection code controlling unit 419 detects the transmission error, it does not perform the operation in step 3603, that is, it does not change the next reception sequence number RN.

The frame disassembling unit 404 then determines whether or not the value of the ACK signal request flag P (refer to FIG. 10B) attached to the packet data of the C-ch, which is received in step 1413 of FIG. 14 is 1 (step 3604).

If the value of the ACK signal request flag P is not 1 but 0, the frame disassembling unit 404 terminates the control process shown in FIG. 36. This is because there is no need to return an ACK at the current frame timing (the result of the determination made in step 3604 is N0).

If the value of the ACK signal request flag P is 1, the frame disassembling unit 404 instructs the ACK returning unit 420 to attach the next reception sequence number RN to the header of the C-ack (refer to FIG. 10B) and to return the ACK to the CAU 305 that transmitted the received packet data (steps 3604 to 3605). As a result, the ACK including the next reception sequence number RN is returned to the corresponding CAU 305.

After the operation in step 3605, the frame disassembling unit 404 determines whether or not the value of the next reception sequence number RN is equal to the value obtained by adding 1 to the transmission sequence number SN assigned to the received packet data (step 3606). If the most recent k number of pieces of packet data have been consecutively and properly received, RN=SN+1 is satisfied.

If RN=SN+1 is satisfied, the frame disassembling unit 404 resets the next reception sequence number RN to 0, and terminates the control process of FIG. 36 (steps 3606 to 3607).

If RN=SN+1 is not satisfied, the frame disassembling unit 404 terminates the control process of FIG. 36 without resetting the next reception sequence number RN (the result of the determination made in step 3606 is N0).

With the above described control process shown in FIGS. 34 through 36, the packet consecutive transmission number assigning unit 516 controls the number of pieces of consecutive transmission data according to the current traffic state, thereby achieving optimum transmission efficiency according to a traffic state.

Fifteenth Preferred Embodiment According to the Present Invention

The basic configuration of the fifteenth preferred embodiment is similar to that of the first preferred embodiment.

Figure 37:
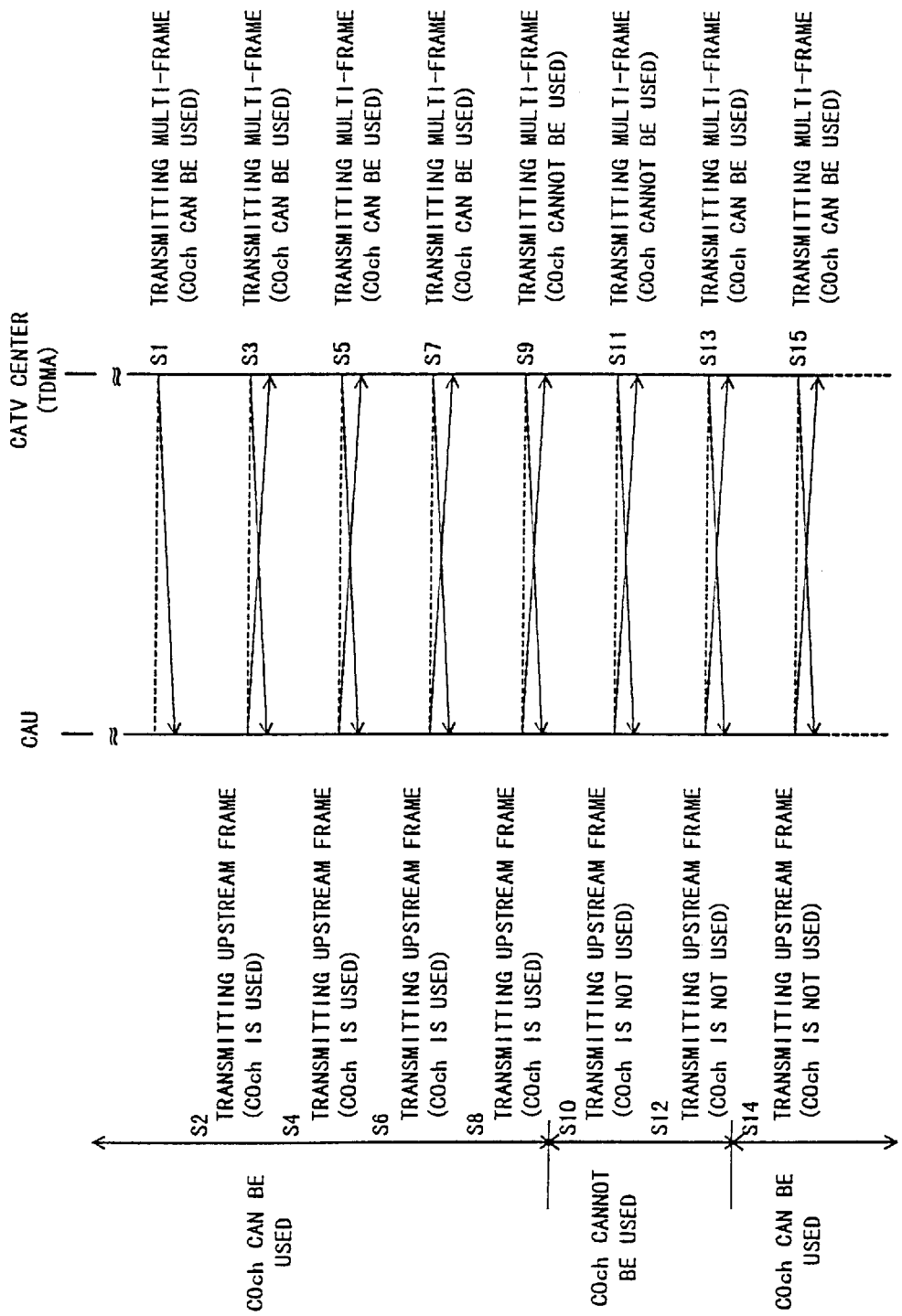
FIG. 37 shows the sequence of the fifteenth preferred embodiment.

FIG. 37 shows the sequence of the fifteenth preferred embodiment. FIG. 38 shows the format of an upstream transmission frame according to the fifteenth preferred embodiment. This format is the same as that shown in FIG. 7 in the first preferred embodiment.

According to the fifteenth preferred embodiment, distance control is performed twice each time four downstream transmission frames are transmitted.

Specifically, the distance control timing controlling unit 417 in the channel managing unit 408, which is included in the TDMA 310, notifies the CAU 305 that the use of the C0 channel of the upstream transmission frame to which an actual distance delay field of FIG. 38 is allocated is not permitted by using the C-ch of the downstream transmission frame (S9 and S11 of FIG. 37) by controlling the C-ch managing unit 415, twice each time four downstream transmission frames are transmitted. The distance control timing controlling unit 417 notifies that the C0 channel is permitted to be used at the timing other than the above described timing (S1, S3, S5, S7, S13, and S15 of FIG. 37).

The CAU 305 transmits the packet data using the C0 channel at the timing when the C0 channel is permitted to be used (S2, S4, S6, S8, and S14 of FIG. 37). At the timing when the C0 channel is not permitted to be used, the TDMA 310 performs the distance control by securing an actual distance delay field and a distance response field by using the distance control channel and the C0 channel, which are shown in FIG. 38.

With the above described control process, a C channel can be allocated to the distance control field at the frame timing when distance control is not performed, thereby improving the transmission efficiency in an upstream direction.

Sixteenth Preferred Embodiment According to the Present Invention

The basic configuration of the sixteenth preferred embodiment is similar to that of the first preferred embodiment.

According to the sixteenth preferred embodiment, the protocol determining unit 429 is used in the configuration of the TDMA 310 shown in FIG. 4, and the protocol determining unit 521 is used in the configuration of the CAU 305 shown in FIG. 5.

In the TDMA 310 shown in FIG. 4, the protocol type of the packet transmitted to a downstream transmission line is first notified from the transmission buffer 411 to the protocol determining unit 429.

The protocol determining unit 429 determines whether the notified protocol type is either a TCP (Transfer Control Protocol) or a UDP(User Datagram Protocol).

If the protocol determining unit 429 determines that the notified protocol type is the UDP, it notifies the ACK returning unit 420 not to return an ACK if the error detection code controlling unit 419 detects a transmission error from the data that the frame disassembling unit 404 receives.

In the meantime, if the protocol determining unit 429 determines that the notified protocol type is the TCP, it notifies the ACK returning unit 420 to return an ACK.

The operations of the CAU 305, which are shown in FIG. 5, are similar to those of the TDMA 310.

That is, the protocol type of the packet transmitted to an upstream transmission line is notified from the transmission buffer 508 to the protocol determining unit 521.

The protocol determining unit 521 determines whether the notified protocol type is either the TCP or the UDP.

If the protocol determining unit 521 determines that the notified protocol type is the UDP, it notifies the ACK returning unit 513 not to return an ACK even if the error detection code controlling unit 512 detects a transmission error from the data that the frame disassembling unit 505 receives.

If the protocol determining unit 521 determines that the notified protocol type is the TCP, it notifies the ACK returning unit 513 to return an ACK.

With the above described control process, the reliability is improved by verifying transmission confirmation using an ACK for the protocol requiring the reliability (such as the TCP), while the transmission rate is improved not by verifying transmission confirmation using an ACK for the protocol requiring a fast transmission rate (such as the UDP).

What is claimed is:

1. A communication method for simultaneously providing a bidirectional communication service from a center device to a plurality of terminals by using a 1-to-multiple broadcasting network configured between the center device and the plurality of terminals, comprising the steps of:

detecting an idle/busy state of a first medium signal in the center device;

managing the detected idle/busy state as first medium idle/busy information in the center device;

notifying the plurality of terminals of the first medium idle/busy information in the center device;

updating the first medium idle/busy information that the center device and the plurality of terminals respectively store in synchronization with each other in the center device and the plurality of terminals;

allocating an idle communication channel among communication channels to be allocated to the first medium signal based on the first medium idle/busy information that the center device and the plurality of terminals respectively store, in the center device and the plurality of terminals; and communicating a transmission frame including a group of communication channels to which the first and second medium signals are allocated between the center device and the plurality of terminals.

2. The communication method according to claim 1, further comprising the steps of:

adding an error detection code to the transmission frame communicated between the center device and the plurality of terminals;

detecting a transmission error of the transmission frame based on the error detection code in the received transmission frame in the center device and the plurality of terminals; and returning a response signal to a transmitting source of the received transmission frame based on a result of detection of the transmission error.

3. The communication method according to claim 1, further comprising the steps of:

adding the error detection code only to the transmission frame transmitted from the plurality of terminals to the center device;

detecting a transmission error of the transmission frame based on an error detection code of a received transmission frame in the center device; and returning a response signal to a terminal at a transmitting source of the received transmission frame based on a result of detection of the transmission error.

4. The communication method according to claim 1, further comprising the steps of:

sequentially allocating communication channels starting from a communication channel at a first end of the transmission frame to the first medium signal, and from a communication channel at a second end of the transmission frame to the second medium signal, based on the first medium idle/busy information that the center device and the plurality of terminals respectively store.

5. The communication method according to claim 1, further comprising the steps of:

allocating subsignals which are obtained by dividing the second medium signal and are respectively assigned with sequence numbers to a plurality of communication channels in the transmission frame, in the center device and the plurality of terminals; and extracting the subsignals obtained by dividing the second medium signal and the respectively assigned sequence numbers from the plurality of communication channels in a received transmission frame, in the center device and the plurality of terminals, and restructuring the second medium signal based on the extracted sequence numbers.

6. The communication method according to claim 1, further comprising the steps of:

allocating a particular communication channel in the transmission frame to a particular terminal as a fixed channel in the center device;

notifying the particular terminal of allocation information of the fixed channel in the center device;

setting information indicating in-use as the first medium idle/busy information corresponding to the fixed channel in the center device; and mutually communicating the second medium signal by using the fixed channel based on the allocation information of the fixed channel, in the center device and the particular terminal.

7. The communication method according to claim 6, further comprising the step of:

forcibly releasing a communication on the particular communication channel when the particular communication channel is being used by the first medium signal at the time of allocation of the fixed channel, in the center device.

8. The communication method according to claim 6, further comprising the step of:

instructing a switch for switching all communication channels of the first medium signal to block all the communication channels, and allocating the fixed channel after completion of blocking all the communication channels, in the center device.

9. The communication method according to claim 6, further comprising the steps of:

allocating the particular communication channel in the transmission frame to a plurality of particular terminals as a fixed channel in the center device; and making the plurality of particular terminals share the fixed channel.

10. The communication method according to claim 6, further comprising the steps of:

presetting either of a first medium/second medium sharing attribute and a second medium dedicated attribute for each communication channel in the transmission frame in the center device; and allocating a communication channel for which the second medium dedicated attribute is preset at the time of allocation of the fixed channel in the center device.

11. The communication method according to claim 6, further comprising the step of:

mutually communicating the second medium signal using the fixed channel without communicating a response signal in the center device and the particular terminal, if the particular communication channel in the transmission frame is allocated to one particular terminal as a fixed channel in the center device.

12. The communication method according to claim 1, further comprising the steps of:

detecting a length of the second medium signal, which is extracted from the transmission frame received from the plurality of terminals, in the center device;

allocating a plurality of idle communication channels among communication channels to be allocated to the first medium signal based on the first medium idle/busy information that the center device and the plurality of terminals respectively store, as channels dedicated to the second medium signal in the center device and the plurality of terminals, if the detected signal length is equal to or longer than a predetermined length; and communicating the second medium signal whose length is equal to or longer than the predetermined length by using the channel dedicated to the second medium signal, in the center device and the plurality of terminals.

13. The communication method according to claim 12, further comprising the step of:

communicating the second medium signal whose length is equal to or longer than the predetermined length by using the channel dedicated to the second medium signal without communicating a response signal, in the center device and the plurality of terminals.

14. The communication method according to claim 1, further comprising the steps of:

assigning a priority conforming to a predetermined decision standard to the second medium signal that the center device transmits to the plurality of terminals, in the center device; and transmitting the second medium signal to the plurality of terminals according to the assigned priority, in the center device.

15. The communication method according to claim 14, wherein the predetermined decision standard is network address information of the plurality of terminals.

16. The communication method according to claim 14, wherein the predetermined decision standard is upper protocol information of packet data which is the second medium signal.

17. The communication method according to claim 14, wherein the predetermined decision standard is intermediate protocol information of packet data which is the second medium signal.

18. The communication method according to claim 1, further comprising the steps of:

setting filtering information conforming to a predetermined decision standard for the second medium signal that the plurality of terminals transmit to the center device, from the center device to the plurality of terminals; and performing a filtering process for the second medium signal to be transmitted to the center device based on the set filtering information, in the plurality of terminals.

19. The communication method according to claim 18, wherein the predetermined decision standard is intermediate protocol information of packet data which is the second medium signal.

20. The communication method according to claim 18, wherein the predetermined decision standard is network address information of the plurality of terminals.

21. The communication method according to claim 18, wherein the predetermined decision standard is physical address information of the plurality of terminals.

22. The communication method according to claim 1, further comprising the steps of:
   assigning transmission sequence numbers for identifying a plurality of consecutive transmission frames together with the second medium signal, to communication channels of the plurality of consecutive transmission frames to be transmitted to the center device, in the plurality of terminals;
   extracting the transmission sequence numbers together with the second medium signal from the communication channels in the plurality of transmission frames received from the plurality of terminals, and consecutively receiving the second medium signal from the communication channels in the plurality of consecutive transmission frames based on the extracted transmission sequence numbers, in the center device; and
   returning a response signal to the plurality of terminals each time the second medium signal is consecutively received from the communication channels in the plurality of consecutive transmission frames, in the center device.

23. The communication method according to claim 22, further comprising the steps of:
   returning to the plurality of terminals the response signal including a next reception sequence number which is a transmission sequence number corresponding to the transmission frame to be received next by the center device, each time the second medium signal is consecutively received from the communication channels in the plurality of consecutive transmission frames, in the center device;
   detecting a collision of transmission frames that the plurality of terminals transmit to the center device by making a comparison between a transmission sequence number that the plurality of terminals themselves assign and a next reception sequence number included in the response signal received from the center device, in the plurality of terminals; and
   decreasing the number of consecutive transmission frames that the plurality of terminals consecutively transmit to the center device based on a result of detection of the collision, in the plurality of terminals.

24. The communication method according to claim 22, further comprising the steps of:
   returning to the plurality of terminals the response signal including a next reception sequence number which is the transmission sequence number corresponding to the transmission frame to be received next by the center device, each time the second medium signal is consecutively received from the communication channels in the plurality of consecutive transmission frames, in the center device;
   detecting recovery of a collision of transmission frames that the plurality of terminals transmit to the center device by making a comparison between a transmission sequence number that the plurality of terminals themselves assign and a next reception sequence umber included in the response signal received from the center device; and
   increasing the number of consecutive transmission frames that the plurality of terminals consecutively transmit to the center device based on a result of detection of the collision recovery.

25. The communication method according to claim 1, further comprising the steps of:
   controlling frame timing at which a distance is controlled in the center device; and
   allocating a communication channel of the second medium signal to an empty window area for controlling the distance in the transmission frame at frame timing other than the frame timing at which the distance is controlled, in the center device.

26. The communication method according to claim 1, further comprising the steps of:
   determining a protocol of the second medium signal to be transmitted in the center device and the plurality of terminals; and
   switching between presence and absence of a return of the response signal based on a result of determination of the protocol in the center device and the plurality of terminals.

27. A communication system for providing a bidirectional communication service simultaneously with a broadcasting communication service from a center device to a plurality of terminals by using a 1-to-multiple broadcasting network system configured between the center device and the plurality of terminals, wherein the center device comprises:
   a center-side first medium terminating unit for terminating a first medium signal;
   a center-side second medium terminating unit for terminating a second medium signal;
   a first medium idle/busy information managing unit for detecting an idle/busy state of the first medium signal in said center-side first medium terminating unit, and managing the idle/busy state as first medium idle/busy information;
   a first medium idle/busy information notifying unit for notifying the plurality of terminals of the first medium idle/busy information;
   a center-side first medium idle/busy information synchronously updating unit for updating the first medium idle/busy information that the center device itself stores in synchronization with the plurality of terminals according to the first medium idle/busy information that said first medium idle/busy information notifying unit notifies;
   a center-side channel managing unit for allocating an idle communication channel among communication channels to be allocated to the first medium signal, to the second medium signal based on the first medium idle/busy information that the center device itself stores; and
   a center-side frame communicating unit for communicating a transmission frame including a group of communication channels that said center-side channel managing unit allocates the first and second medium signals between the plurality of terminals and the center device, and wherein the plurality of terminals comprise:
   a terminal-side first medium terminating unit for terminating the first medium signal;
   a terminal-side second medium terminating unit for terminating the second medium signal;
   a first medium idle/busy information receiving unit for receiving the first medium idle/busy information from the center device;

a terminal-side first medium idle/busy information synchronously updating unit for updating the first medium idle/busy information that the plurality of terminals themselves store in synchronization with the center device according to the first medium idle/busy information that said first medium idle/busy information receiving unit receives;

a terminal-side channel managing unit for allocating an idle communication channel among communication channels to be allocated to the first medium signal, to the second medium signal based on the first medium idle/busy information that the plurality of terminals themselves store; and a terminal-side frame communicating unit for communicating a transmission frame including a group of communication channels to which the first and second medium signals are assigned by said terminal-side channel managing unit.

28. The communication system according to claim 27, wherein the center device further comprises:

a center-side error detection code adding unit for adding an error detection code to a transmission frame to be transmitted to the plurality of terminals;

a center-side error detecting unit for detecting a transmission error of the transmission frame based on the error detection code of the transmission frame received from the plurality of terminals; and a center-side response signal returning unit for returning a response signal to a terminal at a transmitting source of the received transmission frame based on a result of detection of the transmission error, and wherein the plurality of terminals further comprise:

a terminal-side error detection code adding unit for adding the error detection code to the transmission frame to be transmitted to the center device;

a terminal-side error detecting unit for detecting the transmission error of the transmission frame based on the error detection code of the transmission frame received from the center device; and a terminal-side response signal returning unit for returning the response signal to the center device at the transmitting source of the received transmission frame based on a result of detection of the transmission error.

29. The communication system according to claim 27, wherein the center device further comprises:

a center-side error detecting unit for detecting a transmission error of the transmission frame based on an error detection code of the transmission frame received from the plurality of terminals; and a center-side response signal returning unit for returning a response signal to a terminal at a transmitting source of the received transmission frame based on a result of detection of the transmission error, and wherein said plurality of terminals further comprise:

a terminal-side error detection code adding unit for adding the error detection code to the transmission frame to be transmitted to the center device.

30. The communication system according to claim 27, wherein:

said center-side channel managing unit includes a center-side channel order managing unit for sequentially allocating communication channels starting from a communication channel at a first end of the transmission frame to the first medium signal, and from a communication channel at a second end of the transmission frame to the second medium signal, based on the first medium idle/busy information that the center device itself stores; and said terminal-side channel managing unit includes a terminal-side channel order managing unit for sequentially allocating the communication channels starting from the communication channel at the first end of the transmission frame to the first medium signal, and sequentially allocating the communication channels starting from the communication channel at the second end of the transmission frame to the second medium signal, based on the first medium idle/busy information that the plurality of terminals themselves store.

31. The communication system according to claim 27, wherein the center device further comprises:

a center-side frame transmission order controlling unit for allocating subsignals which are obtained by dividing the second medium signal and are respectively assigned with sequence numbers, to a plurality of communication channels in the transmission frame; and a center-side frame reception order controlling unit for extracting the subsignals obtained by dividing the second medium signal and the respectively assigned sequence numbers from the plurality of communication channels in the received transmission frame, and restructuring the second medium signal based on the extracted sequence numbers, and wherein the plurality of terminals further comprise:

a terminal-side frame transmission order controlling unit for allocating subsignals which are obtained by dividing the second medium signal and are respectively assigned with sequence numbers to the plurality of communication channels in the transmission frame; and a terminal-side frame reception order controlling unit for extracting the subsignals obtained by dividing the second medium signal and the respectively assigned sequence numbers from the plurality of communication channels in the received transmission frame, and restructuring the second medium signal based on the extracted sequence numbers.

32. The communication system according to claim 27, wherein the center device further comprises:

a fixed allocation controlling unit for allocating a particular communication channel in the transmission frame to a particular terminal as a fixed channel;

a fixed channel allocation information notifying unit for notifying the particular terminal of allocation information of the fixed channel allocated by said fixed allocation controlling unit;

a fixed channel first medium idle/busy information setting unit for setting information indicating in-use as the first medium idle/busy information corresponding to the fixed channel; and a center-side fixed channel communicating unit for communicating the second medium signal by using the fixed channel between the plurality of terminals and the center device based on the allocation information of the fixed channel, and wherein said plurality of terminals further comprise:

a fixed channel allocation information receiving unit for receiving the allocation information of the fixed channel from the center device; and a terminal-side fixed channel communicating unit for communicating the second medium signal by using the fixed channel between the center device and the plurality of terminals based on the allocation information of the fixed channel, which is received by said fixed channel allocation information receiving unit.

33. The communication system according to claim 32, wherein said fixed allocation controlling unit forcibly releases a communication on the particular communication channel when the particular communication channel is being used by the first medium signal at the time of allocation of the fixed channel.

34. The communication system according to claim 32, wherein said fixed allocation controlling unit instructs a switch for switching all communication channels of the first medium signal to block all the communication channels, and allocates the fixed channel after completion of blocking all the channels.

35. The communication system according to claim 32, wherein:
   said fixed allocation controlling unit allocates the particular communication channel in the transmission frame to a plurality of particular terminals as a fixed channel; and
   the fixed channel is shared by the plurality of particular terminals.

36. The communication system according to claim 32, wherein:
   the center device further comprises a channel attribute controlling unit for presetting either of a first medium/second medium sharing attribute and a second medium dedicated attribute for each communication channel in the transmission frame; and
   said fixed allocation controlling unit allocates the communication channel for which the second medium dedicated attribute is preset as a fixed channel at the time of allocation of the fixed channel.

37. The communication system according to claim 32, wherein said center-side fixed channel communicating unit and said terminal-side fixed channel communicating unit communicate the second medium signal by using the fixed channel without communicating a response signal, if said fixed allocation controlling unit allocates the particular communication channel in the transmission frame to one particular terminal as a fixed channel.

38. The communication system according to claim 27, wherein the center device further comprises:
   a received second medium signal length detecting unit for detecting a length of the second medium signal extracted from the transmission frame received from the plurality of terminals, in the center device; and
   a second medium dedicated channel allocating unit for allocating a plurality of idle communication channels among communication channels to be allocated to the first medium signal as channels dedicated to the second medium signal based on the first medium idle/busy information that the center device and the plurality of terminals respectively store in the center device and the plurality of terminals, if the signal length detected by said received second medium signal length detecting unit is equal to or longer than a predetermined length, and wherein:
      the center device and the plurality of terminals communicate the second medium signal whose length is equal to or longer than the predetermined length by using the channels dedicated to the second medium signal.

39. The communication system according to claim 38, wherein the second medium signal whose length is equal to or longer than the predetermined length is communicated by using the channels dedicated to the second medium signal without communicating the response signal in the center device and the plurality of terminals.

40. The communication system according to claim 27, wherein the center device further comprises:
   a priority assigning unit for assigning a priority conforming to a predetermined decision standard to the second medium signal that the center device transmits to the plurality of terminals; and
   a priority controlling unit for transmitting the second medium signal to the plurality of terminals according to the assigned priority.

41. The communication system according to claim 40, wherein the predetermined decision standard is network address information of the plurality of terminals.

42. The communication system according to claim 40, wherein the predetermined decision standard is upper protocol information of packet data which is the second medium signal.

43. The communication system according to claim 40, wherein the predetermined decision standard is intermediate protocol information of packet data which is the second medium signal.

44. The communication system according to claim 27, wherein the center device further comprises:
   a filtering setting unit for setting filtering information conforming to a predetermined decision standard for the second medium signal that the plurality of terminals transmit to the center device, and wherein the plurality of terminals comprise:
      a filtering controlling unit for performing a filtering process for the second medium signal to be transmitted to the center device according to the filtering information set by said filtering setting unit.

45. The communication system according to claim 44, wherein the predetermined decision standard is intermediate protocol information of packet data which is the second medium signal.

46. The communication system according to claim 44, wherein the predetermined decision standard is network address information of the plurality of terminals.

47. The communication system according to claim 44, wherein the predetermined decision standard is physical address information of the plurality of terminals.

48. The communication system according to claim 27, wherein the plurality of terminals further comprise:
   a transmission sequence number assigning unit for assigning transmission sequence numbers for identifying a plurality of consecutive transmission frames together with the second medium signal to communication channels in a plurality of consecutive transmission frames transmitted to the center device, and wherein the center device further comprises:
      a second medium signal consecutively receiving unit for extracting the transmission sequence numbers together with the second medium signal from the communication channels in the plurality of consecutive transmission frames received from the plurality of terminals, and consecutively receiving the second medium signal from the communication channels in the plurality of consecutive transmission frames based on the extracted transmission sequence numbers; and
      a per-multiple-frames response signal returning unit for returning a response signal to the plurality of terminals each time the second medium signal is consecutively received from the communication channels in the plurality of consecutive transmission frames.

49. The communication system according to claim 48, wherein:
   said per-multiple-frames response signal returning unit returns to the plurality of terminals the response signal including a next reception sequence number which is the transmission sequence number corresponding to the transmission frame to be received next by the center device each time the second medium signal is consecutively received from the communication channels in the plurality of consecutive transmission frames, and wherein the plurality of terminals further comprise:
 a collision detecting unit for detecting a collision of transmission frames that the plurality of terminals transmit to the center device by making a comparison between the transmission sequence number that the plurality of terminals themselves assign and the next reception sequence number included in the response signal received from the center device; and
 a consecutive frame transmission number decreasing unit for decreasing the number of consecutive transmission frames that the plurality of terminals consecutively transmit to the center device based on a result of detection of the collision.

50. The communication system according to claim 48, wherein said per-multiple-frames response signal returning unit returns to the plurality of terminals the response signal including a next reception sequence number which is the transmission sequence number corresponding to the transmission frame to be received next by the center device, each time the second medium signal is consecutively received from the communication channels in the plurality of consecutive transmission frames, and wherein the plurality of terminals further comprise:
 a collision recovery detecting unit for detecting a recovery of a collision of transmission frames that the plurality of terminals transmit to the center device by making a comparison between a transmission sequence number that the plurality of terminals themselves assign and a next reception sequence number included in the response signal received from the center device; and
 a consecutive frame transmission number increasing unit for increasing the number of consecutive transmission frames among the transmission frames that the plurality of terminals transmit to the center device based on a result of detection of the recovery of the collision.

51. The communication system according to claim 27, wherein:
 the center device further comprises a distance control timing controlling unit for controlling frame timing at which a distance is controlled; and
 said center-side channel managing unit allocates a communication channel of the second medium signal to an empty window area for controlling the distance in the transmission frame at frame timing other than the frame timing at which the distance is controlled.

52. The communication system according to claim 27, wherein:
 the center device further comprises a center-side protocol determining unit for determining a protocol of the second medium signal to be transmitted;
 the plurality of terminals further comprise a terminal-side protocol determining unit for determining the protocol of the second medium signal to be transmitted; and
 the center device and the plurality of terminals switch between presence and absence of a return of a response signal based on a result of determination of the protocol.

53. A center device for use in a communication system for providing a bidirectional communication service from the center device to a plurality of terminals by using a one-to-n broadcasting network system configured between the center device and the plurality of terminals simultaneously with a broadcasting communication service, comprising:
 a center-side first medium terminating unit for terminating a first medium signal;
 a center-side second medium terminating unit for terminating a second medium signal;
 a first medium idle/busy information managing unit for detecting an idle/busy state of the first medium signal in said terminal-side first medium terminating unit, and managing the idle/busy state as first medium idle/busy information;
 a first medium idle/busy information notifying unit for notifying the plurality of terminals of the first medium idle/busy information;
 a center-side first medium idle/busy information synchronously updating unit for updating the first medium idle/busy information that the center device itself stores according to the first medium idle/busy information that said first medium idle/busy information notifying unit notifies, in synchronization with the plurality of terminals;
 a center-side channel managing unit for allocating an idle communication channel among communication channels to be allocated to the first medium signal to the second medium signal based on the first medium idle/busy information that the center device itself stores; and
 a center-side frame communicating unit for communicating a transmission frame including a group of communication channels to which the first and second medium signals are allocated by said center-side channel managing unit between the plurality of terminals and the center device itself.

54. A terminal for use in a communication system for providing a bidirectional communication service from a center device to a plurality of terminals by using a 1-to-multiple broadcasting network system configured between the center device and the plurality of terminals simultaneously with a broadcasting communication service, comprising:
 a terminal-side first medium terminating unit for terminating a first medium signal;
 a terminal-side second medium terminating unit for terminating a second medium signal;
 a first medium idle/busy information receiving unit for receiving first medium idle/busy information from the center device;
 a terminal-side first medium idle/busy information synchronously updating unit for updating the first medium idle/busy information that the plurality of terminals themselves store according to the first medium idle/busy information that said terminal-side first medium idle/busy information receiving unit receives, in synchronization with the center device;
 a terminal-side channel managing unit for allocating an idle communication channel among communication channels to be allocated to the first medium signal to the second medium signal based on the first medium idle/busy information that the plurality of terminals themselves store; and
 a terminal-side frame communicating unit for communicating a transmission frame including a group of communication channels to which the first and second medium signals are allocated by said terminal-side channel managing unit between the center device and the plurality of terminals.

* * * * *